US009612445B2

(12) United States Patent
Wittek et al.

(10) Patent No.: US 9,612,445 B2
(45) Date of Patent: Apr. 4, 2017

(54) LENS ELEMENT

(71) Applicant: MERCK PATENT GMBH, Darmstadt (DE)

(72) Inventors: Michael Wittek, Erzhausen (DE); Helmut Haensel, Muehltal (DE)

(73) Assignee: Merck Patent GmbH, Darmstadt (DE)

( * ) Notice: Subject to any disclaimer, the term of this patent is extended or adjusted under 35 U.S.C. 154(b) by 21 days.

(21) Appl. No.: 14/647,688

(22) PCT Filed: Oct. 29, 2013

(86) PCT No.: PCT/EP2013/003246
§ 371 (c)(1),
(2) Date: May 27, 2015

(87) PCT Pub. No.: WO2014/082699
PCT Pub. Date: Jun. 5, 2014

(65) Prior Publication Data

US 2015/0301344 A1 Oct. 22, 2015

(30) Foreign Application Priority Data

Nov. 27, 2012 (EP) .................................... 12007965

(51) Int. Cl.

| | |
|---|---|
| ***H04N 13/04*** | (2006.01) |
| ***C09K 19/02*** | (2006.01) |
| ***C09K 19/20*** | (2006.01) |
| ***C09K 19/34*** | (2006.01) |
| ***G02B 27/22*** | (2006.01) |
| ***C09K 19/04*** | (2006.01) |
| ***G02F 1/00*** | (2006.01) |
| ***G02F 1/1343*** | (2006.01) |
| ***G02F 1/139*** | (2006.01) |
| *G02F 1/137* | (2006.01) |

(52) U.S. Cl.
CPC ...... *G02B 27/2214* (2013.01); *C09K 19/0275* (2013.01); *C09K 19/04* (2013.01); *C09K 19/2007* (2013.01); *C09K 19/3402* (2013.01); *C09K 19/3458* (2013.01); *C09K 19/3466* (2013.01); *C09K 19/3469* (2013.01); *G02F 1/0045* (2013.01); *G02F 1/1393* (2013.01); *G02F 1/134363* (2013.01); *C09K 2019/0448* (2013.01); *C09K 2019/0466* (2013.01); *C09K 2019/2035* (2013.01); *C09K 2019/2064* (2013.01); *C09K 2019/3422* (2013.01); *C09K 2019/3425* (2013.01); *G02F 2001/13793* (2013.01); *H04N 13/042* (2013.01); *H04N 13/0452* (2013.01)

(58) Field of Classification Search
CPC ............ H04N 13/0402; C09K 19/0275; C09K 19/2007; C09K 19/3402; C09K 19/3469; C09K 19/3466; C09K 2019/0448; C09K 2019/0466; C09K 2019/2064; C09K 2019/2035; C09K 2019/3422; C09K 2019/3425; G02F 1/1393; G02F 1/134636
See application file for complete search history.

(56) References Cited

U.S. PATENT DOCUMENTS

| | | | | |
|---|---|---|---|---|
| 6,069,650 | A | 5/2000 | Battersby et al. | |
| 8,377,331 | B2 | 2/2013 | Gauza et al. | |
| 8,475,887 | B2 | 7/2013 | Haseba et al. | |
| 8,537,293 | B2 | 9/2013 | Van Der Horst | |
| 8,659,737 | B2 * | 2/2014 | Wittek | C09K 19/0275 252/299.61 |
| 9,120,969 | B2 * | 9/2015 | Wittek | C09K 19/0275 |
| 9,315,729 | B2 * | 4/2016 | Wittek | C09K 19/542 |
| 2007/0008617 | A1 | 1/2007 | Shestak et al. | |
| 2008/0116419 | A1 * | 5/2008 | Kirsch | C09K 19/0403 252/299.63 |
| 2011/0069245 | A1 | 3/2011 | Haseba et al. | |
| 2011/0075074 | A1 | 3/2011 | Gauza et al. | |
| 2011/0253935 | A1 * | 10/2011 | Jansen | C09K 19/20 252/299.61 |
| 2012/0154697 | A1 | 6/2012 | Van Der Horst | |
| 2013/0201228 | A1 | 8/2013 | Krijn et al. | |
| 2013/0306908 | A1 | 11/2013 | Jansen et al. | |

FOREIGN PATENT DOCUMENTS

| | | | |
|---|---|---|---|
| CN | 1886691 | A | 12/2006 |
| CN | 102007197 | A | 4/2011 |
| CN | 102031121 | A | 4/2011 |
| CN | 102450024 | A | 5/2012 |
| CN | 102540558 | A | 7/2012 |
| DE | 102011122559 | A1 | 7/2012 |
| EP | 2302015 | A1 | 3/2011 |
| JP | 2011118168 | A | 6/2011 |
| TW | 201233787 | A | 8/2012 |
| WO | 2010136951 | A1 | 12/2010 |
| WO | 2011145045 | A1 | 11/2011 |

OTHER PUBLICATIONS

International Search Report for PCT/EP2013/003246 dated Feb. 13, 2014.
Cheng, H. et al., "Blue-Phase Liquid Crystal Displays with Vertical Field Switching," Journal of Display Technology, Feb. 2012, vol. 8, No. 2, pp. 98-101.
English Abstract of JP2011118168, Publication Date: Jun. 16, 2011.
English Translation of Office Action for related Chinese Patent Application No. 201380061022.2 dated Jul. 6, 2016.
English Abstract of CN102540558, Publication Date: Jul. 4, 2012.
English Abstract of CN1886691, Publication Date: Dec. 27, 2006.

* cited by examiner

*Primary Examiner* — Shean C Wu
(74) *Attorney, Agent, or Firm* — Millen White Zelano & Branigan, P.C.

(57) ABSTRACT

The invention provides a switchable lens element comprising an inverse lens structure formed by an isotropic material and an isotropic cover sheet wherein the resulting lens structure comprises an electrically switchable polymer stabilized blue phase LC medium having the same refractive index in its isotropic state. Furthermore, the present invention relates to the use of such a lens element in an electro-optical device i.e. an autostereoscopic display device operable in a 2D mode or a 3D mode, in which a lens arrangement directs the output from different pixels to different spatial positions to enable a stereoscopic image to be viewed and wherein the lens arrangement comprises a plurality of said switchable lens elements.

21 Claims, No Drawings

LENS ELEMENT

TECHNICAL FIELD OF THE INVENTION

The invention provides a lens element comprising a replica structure, a lens structure, wherein either the lens structure or the replica structure comprises a blue phase LC material. Furthermore, the present invention relates to the use of such a lens element in an electro-optical device i.e. an autostereoscopic display device operable in a 2D mode or a 3D mode, in which a lens arrangement directs the output from different pixels to different spatial positions to enable a stereoscopic image to be viewed and wherein the lens arrangement comprises a plurality of said switchable lens elements.

BACKGROUND OF THE INVENTION

Lens elements are used, for example, in order to realize autostereoscopic display devices. Such devices comprise a liquid crystal display panel for example of the active matrix type that acts as a spatial light modulator to produce the display image. The display panel has an orthogonal array of display pixels arranged in rows and columns. In practice, the display panel comprises about one thousand rows and several thousand columns of display pixels.

The structure of the liquid crystal display panel is entirely conventional. In particular, the panel comprises a pair of spaced transparent glass substrates, between which for example an aligned twisted nematic or another liquid crystal medium is provided. The substrates carry patterns of transparent indium tin oxide (ITO) electrodes on their facing surfaces. Polarizing layers are also provided on the outer surfaces of the substrates.

Each display pixel comprises opposing electrodes on the substrates, with the intervening liquid crystal medium there between. The shape and layout of the display pixels are determined by the shape and layout of the electrodes. The display pixels are regularly spaced from one another by gaps. Each display pixel is associated with a switching element, such as a thin film transistor (TFT) or thin film diode (TFD). The display pixels are operated to produce the display image by providing addressing signals to the switching elements, and those skilled in the art will know suitable addressing schemes.

The display panel is illuminated by a light source comprising, in this case, a planar backlight extending over the area of the display pixel array. Light from the light source is directed through the display panel, with the individual display pixels being driven to modulate the light and produce the display image.

The display device of prior art also comprises a lenticular sheet, arranged over the front side of the display panel, which performs a view forming function. The lenticular sheet comprises a row of lens elements extending parallel to one another. The lens elements are in a form of planoconvex lenses, and they act as a light output directing means to provide different images, or views, from the display panel to the eyes of a user positioned in front of the display device.

The autostereoscopic display devices of prior art are capable of providing several different perspective views in different directions. In particular, each lenticular element overlies a small group of display pixels in each row. Accordingly, the lens element projects each display pixel of a group in a different direction, to form the several different views. As the user's head moves from left to right, his/her eyes will receive different ones of the several views, in turn.

It has also been proposed to provide electrically switchable lens elements, which enable the display to be operated in a 2D or 3D mode.

In this connection, the array of electrically switchable lenticular elements, which can be employed in such device, comprises a pair of transparent glass substrates with transparent electrodes formed of indium tin oxide (ITO) provided on their facing surfaces. An inverse lens structure formed using a replication technique, is provided between the substrates adjacent to an upper one of the substrates. A liquid crystal medium is provided between the substrates adjacent to the lower one of the substrates. Surfaces of the inverse lens structure and the lower substrate that are in contact with the liquid crystal material are provided with an orientation layer for orientating the liquid crystal material.

When no electric potential is applied to the electrodes, the refractive index of the liquid crystal material is substantially higher than that of the inverse lens array, and the lenticular shapes therefore provide a light output directing function.

When an alternating electric potential of approximately 50 to 100 volts is applied to the electrodes, the refractive index of the liquid crystal material is substantially the same as that of the inverse lens array, so that the light output directing function of the lenticular shapes is cancelled. Thus, in this state, the array effectively acts in a "pass through" mode.

Further details of such a structure and the operation of arrays of switchable lenticular elements suitable for the use in such display devices can be found in U.S. Pat. No. 6,069,650 A1.

An example of an autostereoscopic display device, which has both 2D and 3D modes of operation, is known from WO 2010/136951 A1, which disclosure is incorporated by reference to this application.

This device comprises a display panel having an array of display pixels for producing a display image and the display pixels being arranged in rows and columns. A lens arrangement covers thereby the display panel and comprises switchable lens elements, which are formed of a blue phase LC medium, and a replica structure, which are formed of a non-switchable isotropic material. The disclosed lens arrangement directs the output from different pixels to different spatial positions and enables an autostereoscopic image to be viewed. The device further comprises a controller adapted to switch the blue phase material to an isotropic state for the 2D mode and to a birefringent state for the 3D mode, and wherein in the 2D mode, the refractive index of the blue phase material matches the refractive index of the non-switchable isotropic material.

As described above, the isotropic state is used for the 2D mode, which highly improves the 2D mode in comparison to the electric-field aligned mode described before because the residual diffraction in the 2D mode is reduced to a minimum, by using the optically isotropic phase of the blue phase medium.

The existence of the so-called blue phase of a liquid crystal medium has been recognized for many decades. However, this phase was associated with a very narrow temperature range. The blue phase is caused by defects that occur at regular distances in three spatial dimensions form a cubic lattice. A regular three-dimensional lattice of defects within a chiral liquid crystal thus forms blue phases. Since the spacing between the defects of a blue phase are in the range of the wavelength of light (several hundred nanometers), for certain wavelength ranges of the light reflected from the lattice constructive interference occurs (Bragg reflection) and the blue phase reflects colored light (note that only some of the blue phases actually reflect blue light). The blue phase arises when the chiral LC material is warmed from the cholesteric phase or cooled from the isotropic phase.

In 2005, researchers from the Centre of Molecular Materials for Photonics and Electronics at the University of Cambridge reported their discovery of a class of blue-phase liquid crystals that remain stable over a range of temperatures as wide as 16-60 Celsius, as published in Nature, 436, pages 997-1000. It has been shown that these ultrastable blue phases could be used to switch the color of the reflected light by applying an electric field to the material, and that this could eventually be used to produce three-color (red, green, and blue) pixels for full-color displays. The new blue phases are made from molecules in which two stiff, rod-like segments are linked by a flexible chain.

In addition, a prototype of a blue phase LCD panel has been produced and publicized. The blue phase mode does not require LC alignment layers, unlike conventional TFT LCD technologies such as Twisted Nematic (TN), In-Plane Switching (IPS) or Vertical Alignment (VA). The blue phase mode can make its own alignment, eliminating the need for any mechanical alignment and rubbing processes. This reduces the number of required manufacturing steps, resulting in savings on production costs.

In a blue phase based LC-display for TV applications it is not the selective reflection of light according to the lattice pitch (as a result of Bragg reflection) that is used for display of visual information, but an external electric field induces a birefringence in the LC via the Kerr effect. That field-induced birefringence becomes apparent as a change of transmission when the blue phase Mode LC layer is placed between crossed polarizers.

By applying a blue phase LC medium to a switchable lens element, the need for alignment layers is avoided, as well as the need for LC rubbing, because the isotropic mode is angle and polarization independent. The structure and manufacturing process of such a lens element is therefore simplified.

In this regard, some compounds and media have been reported which possess a blue phase between the cholesteric phase and the isotropic phase that can usually be observed by optical microscopy. These compounds or compositions, for which the blue phases are observed, are typically single mesogenic compounds or mixtures showing a high chirality. Generally, the blue phases observed only extend over a very small temperature range, which is typically less than 1 degree centigrade wide, and/or the blue phase is located at rather inconvenient temperatures.

The autostereoscopic display device according to WO 2010/136951 A1 suggests e.g. the disclosed media in WO 2005/075603 A1 or WO 2007/147516 A1 as a suitable media.

Modern lens element applications require fast switching times, which can be achieved by higher values for the dielectric anisotropy and favourably lower viscosities of the blue phase LC media. In addition to that, the media have to exhibit a high UV stability, since they are directly exposed to sunlight. Moreover, the needed light modulation media have to exhibit a blue phase, which is as wide as possible and which is conveniently located for the mentioned applications together with a good stability at deep temperatures for outdoor applications, i.e. in cameras.

Thus, there is a need for further liquid crystal media, which can be operated in a switchable lens element, which are operated at a broad range of temperatures where the media is in the blue phase, which provide besides high absolute values for Δn, good thermal and UV stability and a blue phase over a wide temperature range, and which also provide the following technical improvements:

- a reduced operating voltage,
- a reduced temperature dependency of the operating voltage and
- high values for the dielectric anisotropy together with favourably low viscosities.

SUMMARY OF THE INVENTION

Surprisingly the inventors have found that a lens element comprising a lens structure, a replica structure wherein either the lens structure or the replica structure comprises a blue phase LC material is suitable to provide the above-mentioned requirements.

Said blue phase liquid crystal medium thereby exhibits a wide range of the blue phase, a high value of the dielectric anisotropy together with a favourable low viscosity, a good UV stability, and a good stability at deep temperatures.

The present invention also relates to the use of such lens element in an electro-optical device i.e. an autostereoscopic display device and to other electro-optical devices comprising the lens elements and using the switchable lens effect according to the present invention.

The present invention relates also to the method of production of such lens elements.

DETAILED DESCRIPTION OF THE EMBODIMENTS

In one preferred embodiment, the lens element comprises a lens structure, which comprises the blue phase LC material, and a replica structure, which comprises an isotropic material having a constant refractive index.

Accordingly, the lens element comprises a replica structure of an isotropic material with a constant refractive index, which has a defined cavity, and which corresponds to an inverse lens structure. The resulting lens structure comprises an electrically switchable blue phase LC medium having the same refractive index in its isotropic state. The lens element comprises also a transparent substrate, which covers the inverse lens structure, and a transparent electrode structure provided on said cover sheet that is connected with the electrically switchable blue phase LC medium.

In a preferred embodiment, the transparent substrate is the same isotropic material as used for the replica structure, but also other suitable transparent materials known to the skilled person are possible.

The polymer stabilized blue phase LC medium can be electrically switched between its isotropic state and its birefringent state by applying an electrical field to the medium. In the isotropic state, the refractive index of the blue phase LC medium preferably matches the refractive index of the isotropic material of the replica structure.

By choosing the isotropic material of the replica structure to have one of the three possible refraction indices, i.e. $n_O$ (the ordinary ray refractive index perpendicular to the axis of anisotropy), $n_e$ (the extraordinary ray refractive index parallel to the axis of anisotropy), $n_{iso}$ (the isotropic blue phase refractive index), and by choosing a certain light polarization and choosing negative or positive air focal distance of the isotropic material of the replica structure, a lens effect can be associated with the birefringent or optical anisotropic blue phase.

The blue phase LC medium is defined by its $n_o$ and $n_e$ values. When no electric field is applied, the medium exhibits an isotropic refraction index ($n_{iso}$) determined by:

$$n_{iso}=((n_e^2+2n_o^2)/3)^{1/2}$$

It is furthermore a matter of routine skill to approximately match the appropriate refractive index ($n_{iso}$, $n_o$ or $n_e$) of a blue phase medium with the refractive index of the isotropic material of the replica structure.

Many transparent polymers, e.g. (functionalized) polycarbonates (n≈1.58); polyimides; fluorinated polyimides (n≈1.52-1.54) such as the OPI series polyimides from the Hitachi company; fluorocarbons such as Teflon®, Teflon AF® and Cytop® (n≈1.34-1.38), silicon polymers such as Sylgard® 184 (n≈1.43); acrylic glass (n≈1.49); polycarbonate (n≈1.58) such as Makrolon®; PMMA (n≈1.48); PET (n≈1.57); mixtures of such polymers, as for instance disclosed in U.S. Pat. No. 6,989,190 A1; flint glass (n≈1.52-1.92); crown glass (n≈1.48-1.75) and many more are readily available to the skilled person. Furthermore, some polymers can be mixed to achieve an averaged effective refractive index, and this can be used to enable the desired refractive index to be obtained.

In a preferred embodiment, the replica structure forms an inverse planoconvex or elliptical-concentric lens structure, preferably an inverse planoconvex lens structure.

The refractive index match is such that difference between the isotropic refractive index of the blue phase LC medium and the refractive index of isotropic material of the replica structure (i.e. the error in the match) is smaller than 5%. More preferably, the error in the match is less than 2% or most preferably less than 1%.

A lens effect is provided by generating a difference in refractive index between the isotropic material of the replica structure and the visible refractive index of the blue phase LC medium. Preferably, the refractive index difference should be as large as possible, so that the lens structure formed by the replica is as shallow as possible, and thus the least amount of blue phase LC medium is required.

Low depth lenses can be achieved using an in-plane switching electrode structure. The axis of the anisotropic mode of the blue phase LC medium in this case can be electrically aligned parallel to the polarization of the light, so that $n_e$ then is visible. By choosing the isotropic material of the replica structure to have a refractive index $n_r$, equal to $n_{iso}$, the resulting refractive index difference is formed by $\Delta n_{i(replica)}-n_e$. The refractive index difference and the required focus then determine directly the required shape of the lens structure. In case of a preferred inverse planoconvex lens structure with a focal distance (f), the radius (r) of such a lens would be chosen as:

$$r=f\Delta n/n_o$$

As the profile depth of a lens increases when the radius becomes shorter, a larger Δn means lower depth. As $\Delta n_{i(replica)}-n_e$ is bigger then $\Delta n_{i(replicar)}-n_o$, the preferred embodiment is when $n_r$, is equal to $n_{iso}$.

In another preferred embodiment, the blue phase LC medium is part of the lens structure. However, an alternative approach uses a passive lens arrangement in combination with a switchable polarization modifying arrangement. The passive lens arrangement has birefringent lenses and non-birefringent lens replica portions (or these can be arranged with the lenses non-birefringent and the replica portions birefringent). The replica portions have a refractive index matched to one of the refractive indices of the birefringent lenses, for example the extraordinary refractive index. The switchable polarization-modifying device enables selection between a polarization state in which there is an index change between the lens and replica, and a state in which there is no change. Thus, the direction of polarization of the light entering the passive lens dictates whether the lens function is implemented or if the lens operates as a pass through device. This system is described in detail in WO 03/015424 A1 which disclosure in incorporated by reference. The switchable polarization-modifying device of such an arrangement can comprise the blue phase LC medium, in accordance with the invention. The birefringence of the birefringent mode of the blue phase LC medium, in combination with the blue phase LC medium thickness, then give rise to the desired polarization modification. For example, the birefringent cell can function as a half wave plate, resulting in an orthogonal polarization change between the input and output of the cell when in the birefringent mode, and no change in polarization when in the isotropic mode of the blue phase LC medium.

In another embodiment, the lens element according to the present invention comprises a replica structure, which comprises the blue phase LC material and the lens structure, which comprises the isotropic material having a constant refractive index. Not all other parameters of this embodiment will be described in detail, as these are obvious from the above given specification and are well known to those skilled in the art.

In a preferred embodiment of the present invention, the blue phase LC medium comprises one or more chiral compounds and one or more mesogenic compounds.

In a preferred embodiment of the present invention, the blue phase LC medium comprises one or more chiral compounds, one or more polymerisable compounds, and one or more mesogenic compounds, which are selected from the compounds of formula I

I

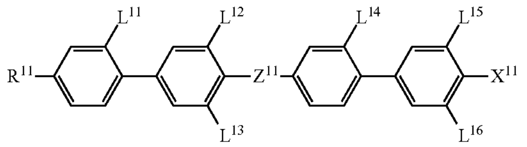

wherein $L^{11}$ to $L^{16}$ are independently of each other H or F, $R^{11}$ is alkyl group, which is straight chain or branched, is unsubstituted, mono- or poly-substituted by F, Cl or CN, preferably by F, and in which one or more $CH_2$ groups are optionally replaced, in each case independently from one another, by —O—, —S—, —$NR^{01}$—, —$SiR^{01}R^{02}$—, —CO—, —COO—, —OCO—, —OCO—O—, —S—CO—, —CO—S—, —$CY^{01}$═$CY^{02}$— or —C≡C— in such a manner that O and/or S atoms are not linked directly to one another, $Y^{01}$ and $Y^{02}$ are, independently of each other, F, Cl, or CN, and alternatively one of them may be H, $R^{01}$ and $R^{02}$ are, independently of each other, H, or alkyl with 1 to 12 C-atoms, $Z^{11}$ is -COO—, —OCO— or —$CF_2O$—, $X^{11}$ Halogen, an mono-, di- or polyhalogenated alkyl-, or alkoxy group having 1 to 6 C-atoms or a mono-, di- or polyhalogenated alkenyl group having 2 to 6 C-atoms, preferably F, Cl, $CF_3$, $CHF_2$, $OCF_3$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH═$CF_2$, particular preferably F, $CF_3OCHF_2$ or $OCF_3$.

In a preferred embodiment of the present invention the blue phase LC medium comprises one more compounds of formula I, preferably selected from the group of compounds of its sub-formulae I-1 and I-2, preferably of formula I-2,

I-1

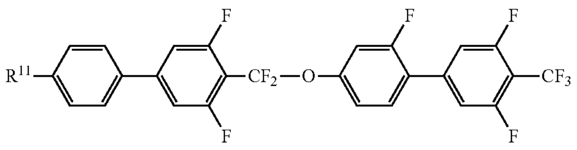

I-2

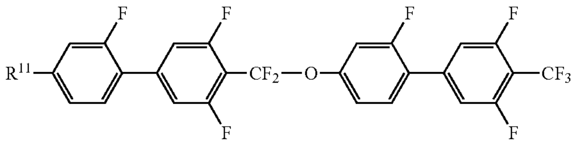

wherein $R^{11}$ has the meaning given under formula I above and preferably is n-alkyl, most preferably ethyl, n-propyl, n-butyl, n-pentyl, or n-hexyl.

In a preferred embodiment of the present invention, the blue phase LC medium comprises one or more compounds of formula II

II

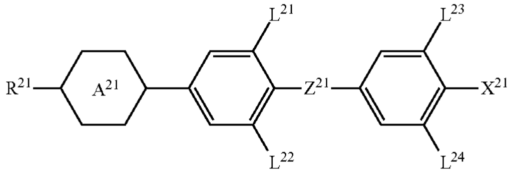

$L^{21}$ to $L^{24}$ are independently of each other H or F, $R^{21}$ has one of the meanings as indicated above for $R^{11}$ in formula I,

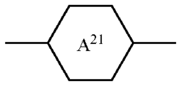

denotes a diradical group selected from the following groups:

a) the group consisting of trans-1,4-cyclohexylene, 1,4-cyclohexenylene and 1,4"-bicyclohexylene, in which, in addition, one or more non-adjacent $CH_2$ groups may be replaced by —O— and/or —S— and in which, in addition, one or more H atoms may be replaced by F, b) the group consisting of 1,4-phenylene and 1,3-phenylene, in which, in addition, one or two CH groups may be replaced by N and in which, in addition, one or more H atoms may be replaced by F, $Z^{21}$ is —COO—, —OCO— or —$CF_2O$—, and $X^{21}$ denotes halogen, CN, a mono- or polyhalogenated alkyl-, or alkoxy group having 1 to 6 C-atoms or a mono- or polyhalogenated alkenyl group having 2 to 6 C-atoms, preferably F, Cl, CN, $CF_3$, $CHF_2$, $OCF_3$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH{=}CF_2$, particular preferably F, CN or $CF_3$.

In a preferred embodiment of the present invention, the blue phase LC medium comprises one more compounds of formula II selected from the group of compounds of formulae II-1 to II-5

II-1

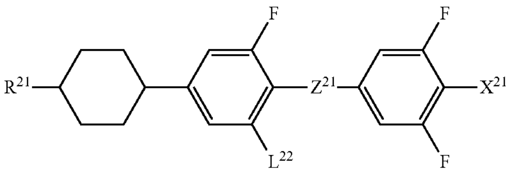

II-2

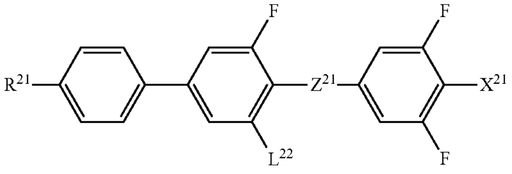

II-3

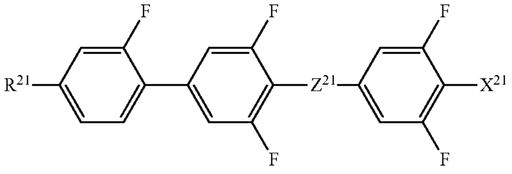

II-4

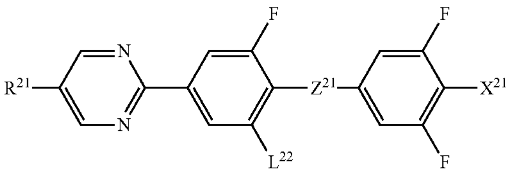

II-5

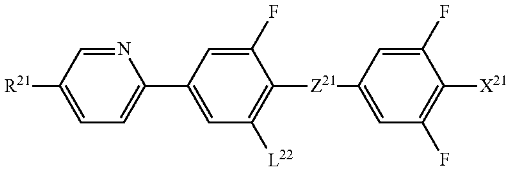

wherein the parameters have one of the meanings as indicated under formula II.

In a preferred embodiment of the present invention the blue phase LC the compounds of formula II-1 to II-5 are preferably selected from the group of compounds of the sub-formulae II-1a to II-5f, more preferably from the group of compounds of formula II-3-c and/or II-2f, II-1a

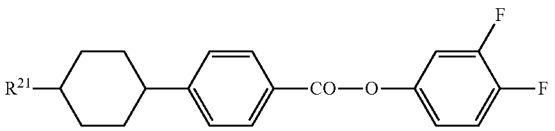

-continued
II-1b
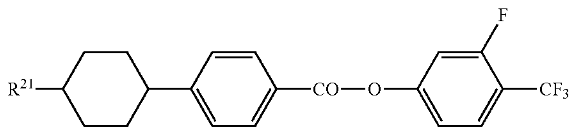
II-1c
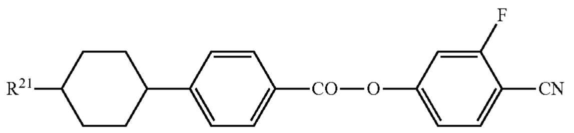
II-2a
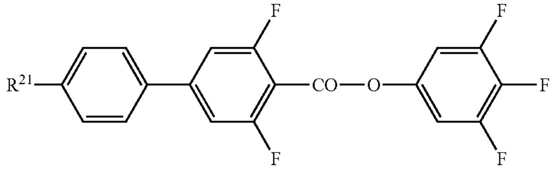
II-2b
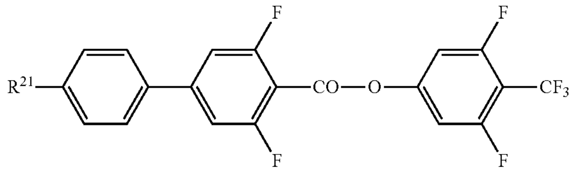
II-2c
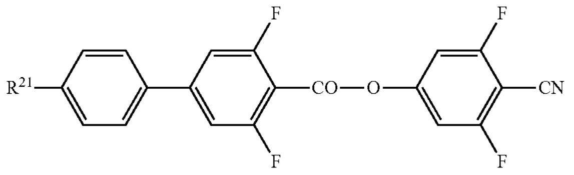
II-2d
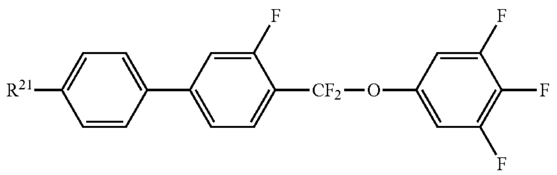
II-2e
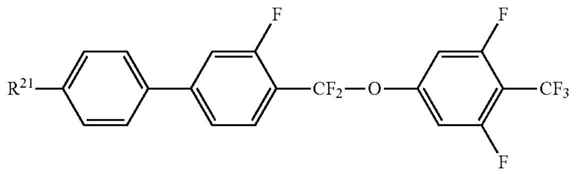
II-2f
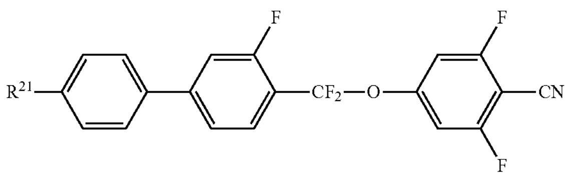
-continued
II-3a
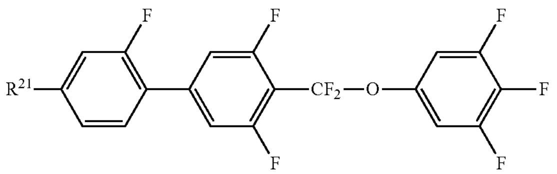
II-3b
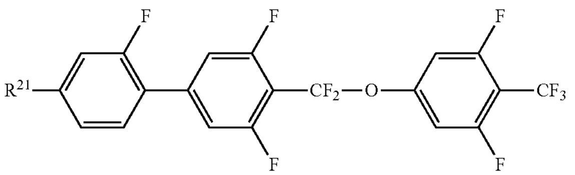
II-3c
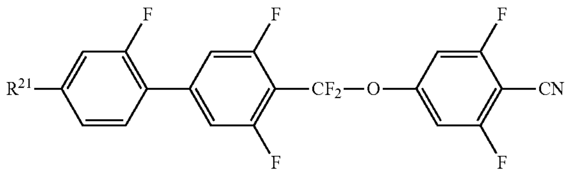
II-4a
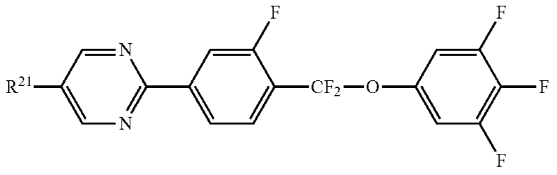
II-4b
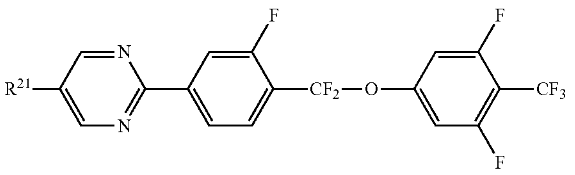
II-4c
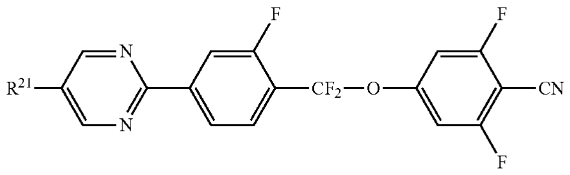
II-4d
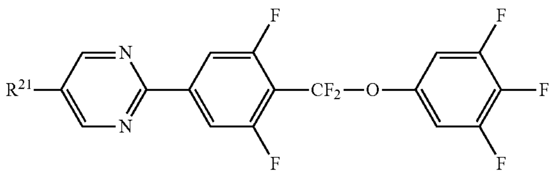
II-4e
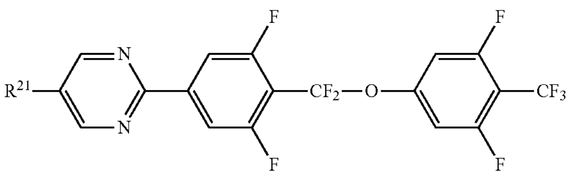

-continued

II-4f

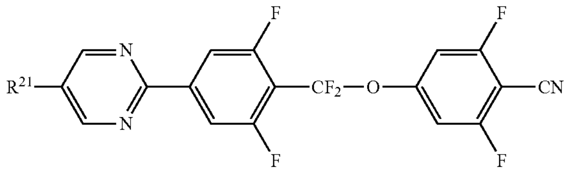

II-5a

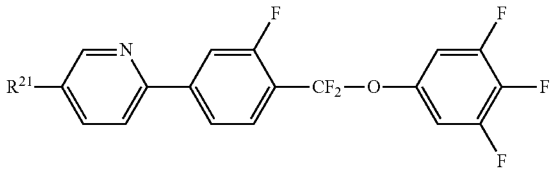

II-5b

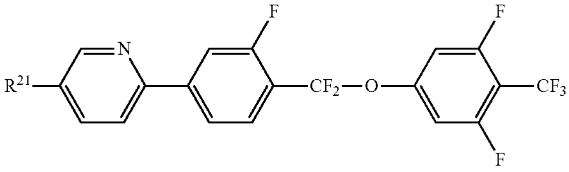

II-5c

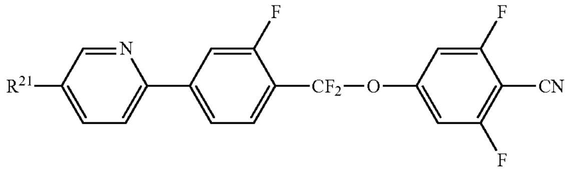

II-5d

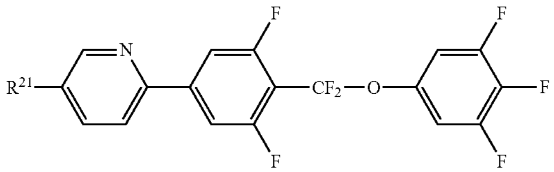

II-5e

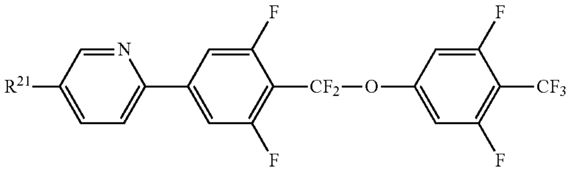

II-5f

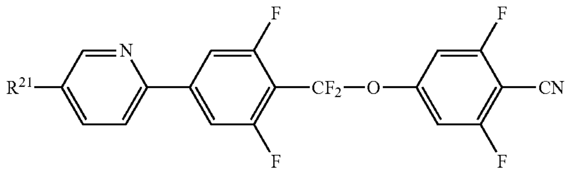

wherein $R^{21}$ has one of the meanings as indicated above in formula II and preferably is n-alkyl, most preferably ethyl, n-propyl, n-butyl, n-pentyl or n-hexyl.

In a preferred embodiment of the present invention, the blue phase LC medium comprises one or more compounds of formula III,

III

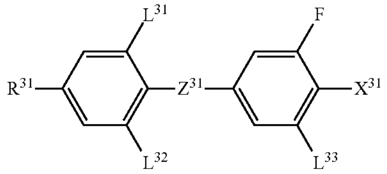

wherein $L^{31}$ to $L^{33}$ are independently of one another H or F, $Z^{31}$ is —COO— or —$CF_2O$—, $R^{31}$ is an alkyl group, which is straight chain or branched, is unsubstituted, mono- or poly-substituted by F, Cl or CN, preferably by F, and in which one or more $CH_2$ groups are optionally replaced, in each case independently from one another, by —O—, —S—, —$NR^{01}$—, —$SiR^{02}$—, —CO—, —COO—, —OCO—, —OCO—O—, —S—CO—, —CO—S—, —$CY^{01}$=$CY^{02}$— or —C≡C— in such a manner that O and/or S atoms are not linked directly to one another, $Y^{01}$ and $Y^{02}$ are, independently of each other, F, Cl or CN, and alternatively one of them may be H, and $R^{01}$ and $R^{02}$ are, independently of each other, H or alkyl with 1 to 12 C-atoms, and $X^{31}$ denotes halogen, CN, a mono- or polyhalogenated alkyl-, or alkoxy group having 1 to 6 C-atoms or a mono- or polyhalogenated alkenyl group having 2 to 6 C-atoms, preferably F, Cl, CN, $CF_3$, $CHF_2$, $OCF_3$—$OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH=$CF_2$, particular preferably F, CN or $CF_3$.

In a further preferred embodiment the compounds of formula III are preferably selected from compounds of formulae III-1 and/or III-2

III-1

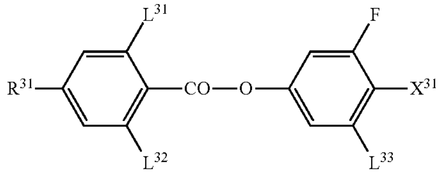

III-2

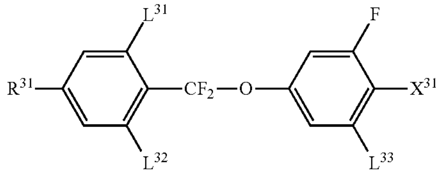

wherein the parameters $R^{31}$, $L^{31}$ to $L^{33}$ and $X^{31}$ have one of corresponding meanings given above in formula III.

In another preferred embodiment of the present invention, the blue phase LC medium comprises one or more compounds of formula III-1 selected from the group of compounds of its sub-formulae III-1a to III-1d, more preferably of the compounds of formula III-1a III-1a

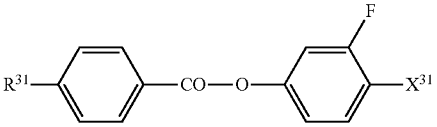

III-1b

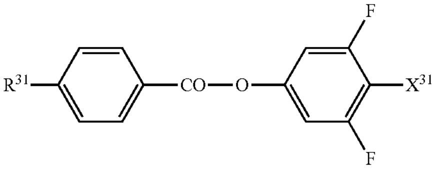

III-1c

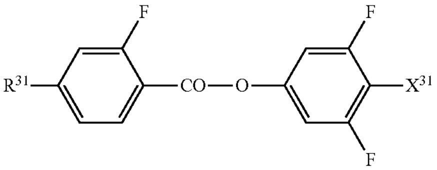

III-1d

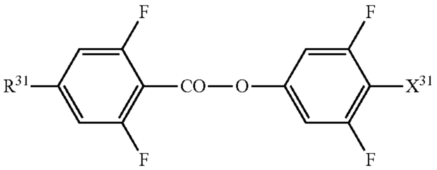

wherein $R^{31}$ and $X^{31}$ have one of the meanings given under formula III above.

In an especially preferred embodiment of the present invention the blue phase LC medium comprises one more compounds of formula III-1a to III-1d, which are preferably selected from the group of compounds of the following sub-formulae III-1a-1

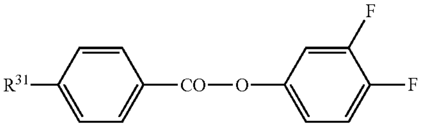

III-1a-2

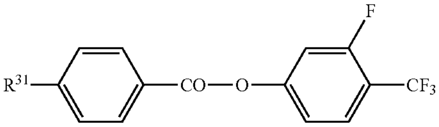

III-1a-3

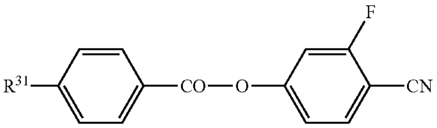

III-1b-1

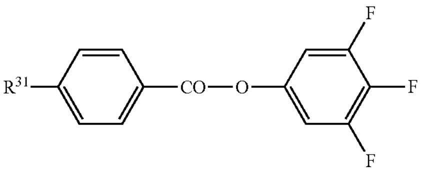

-continued

III-1b-2

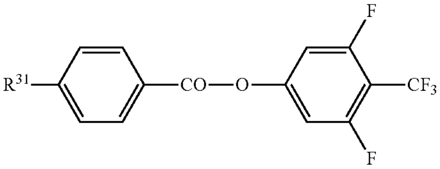

III-1b-3

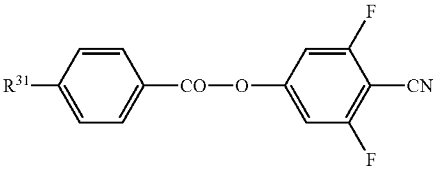

III-1c-1

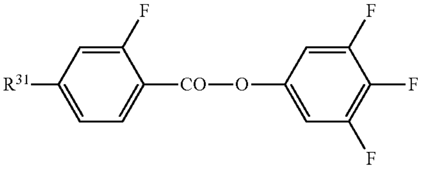

III-1c-2

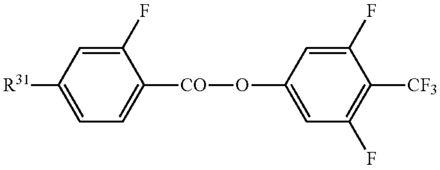

III-1c-3

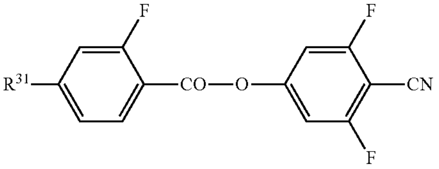

III-1d-1

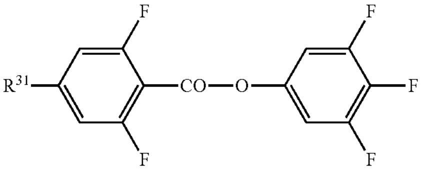

III-1d-2

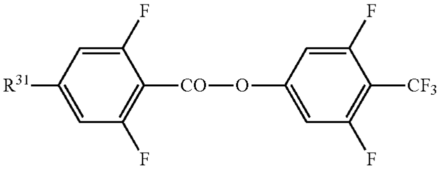

III-1d-3

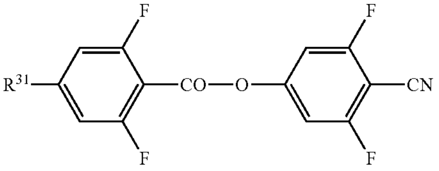

wherein $R^{31}$ has the meaning given under formula III above and preferably is n-alkyl, most preferably ethyl, n-propyl, n-butyl, n-pentyl or n-hexyl.

In another preferred embodiment of the present invention the blue phase LC medium comprises one or more compounds of formula III-2 selected from the group of compounds of its sub-formulae III-2a to III-2d, III-2a

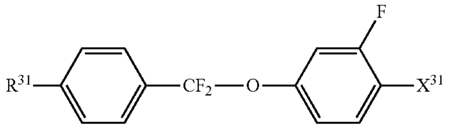

III-2b

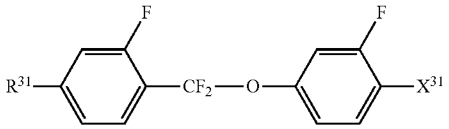

III-2c

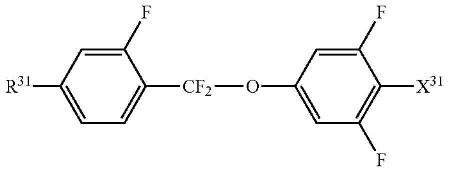

III-2d

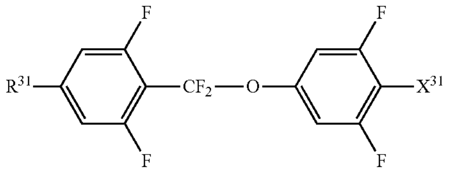

wherein $R^{31}$ and $X^{31}$ have one of the meanings given under formula III above.

In an especially preferred embodiment of the present invention the blue phase LC medium comprises one more compounds of formula III-2a to III-2d, which are preferably selected from the group of compounds of the following sub-formulae III-2a-1

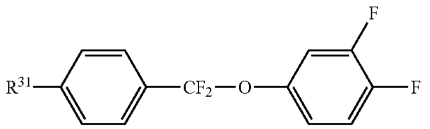

III-2a-2

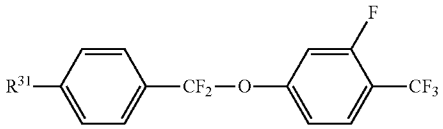

III-2a-3

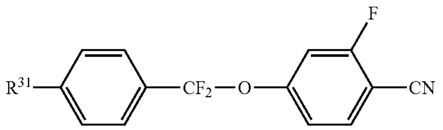

III-2b-1

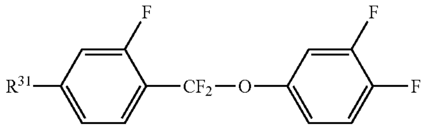

III-2b-2

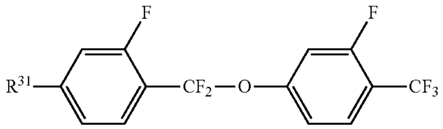

-continued

III-2b-3

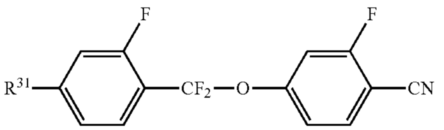

III-2c-1

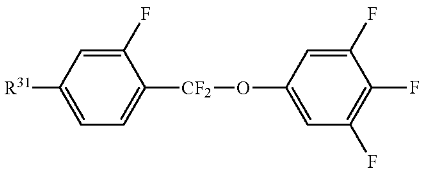

III-2c-2

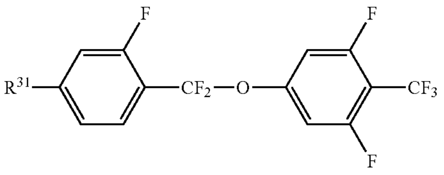

III-2c-3

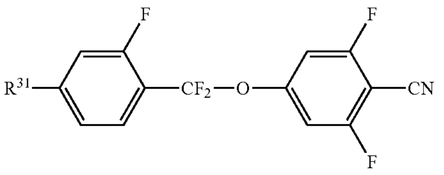

III-2d-1

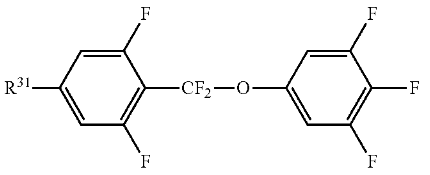

III-2d-2

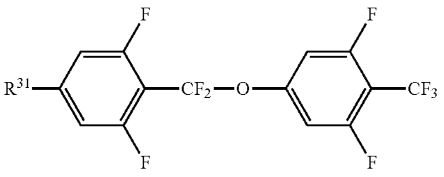

III-2d-3

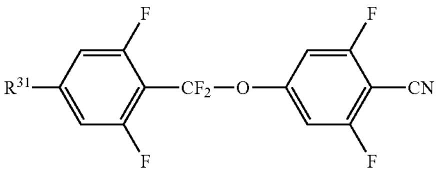

wherein $R^{31}$ has the meaning given under formula III above and preferably is n-alkyl, most preferably ethyl, n-propyl, n-butyl, n-pentyl or n-hexyl.

In a preferred embodiment, the blue phase LC medium according to the present invention comprises one more compounds of formula IV

VI

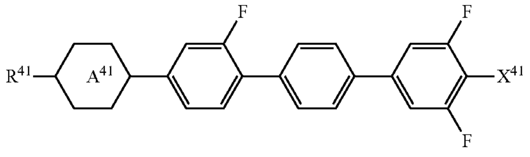

wherein $R^{41}$ has one of the meanings given for $R^{11}$ under formula I above,

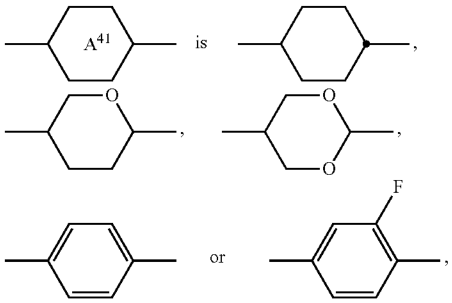

preferably

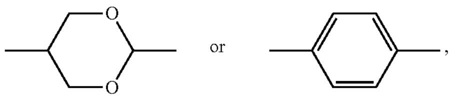

and $X^{41}$ denotes F or $CF_3$, preferably F.

In a preferred embodiment of the present invention, the blue phase LC medium comprises one more compounds of formula V,

V

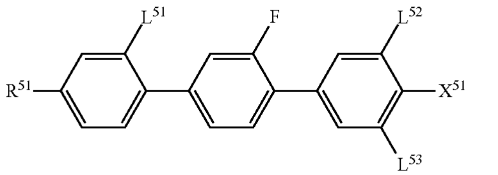

wherein $L^{51}$ to $L^{53}$ are, independently of each other, H or F $R^{51}$ is an alkyl group, which is straight chain or branched, preferably has 1 to 20 C-atoms, is unsubstituted, mono- or poly-substituted by F, Cl or CN, preferably by F, and in which one or more $CH_2$ groups are optionally replaced, in each case independently from one another, by —O—, —S—, —$NR^{01}$—, —$SiR^{01}R^{02}$—, —CO—, —COO—, —OCO—, —OCO—O—, —S—CO—, —CO—S—, —$CY^{01}$=$CY^{02}$— or —C≡C— in such a manner that O and/or S atoms are not linked directly to one another, preferably n-alkyl, n-alkoxy with 1 to 9 C-atoms, preferably 2 to 5 C-atoms, alkenyl, alkenyloxy or alkoxyalkyl with 2 to 9 C-atoms, preferably with 2 to 5 C-atoms or halogenated alkyl, halogenated alkenyl or halogenated alkoxy, preferably mono fluorinated, di-fluorinated or oligofluorinated alkyl, alkenyl or alkoxy, most preferably n-alkyl, n-alkoxy, alkenyl, alkenyloxy or alkoxyalkyl, $Y^{01}$ and $Y^{02}$ are, independently of each other, F, Cl, or CN, and alternatively one of them may be H, $R^{01}$ and $R^{02}$ are, independently of each other, H or alkyl with 1 to 12 C-atoms, and $X^{51}$ denotes F or $CF_3$ In a preferred embodiment of the present invention the blue phase LC medium comprises one more compounds of formula V, preferably selected from the group of compounds of its sub-formulae V-1 to V-8,

V-1

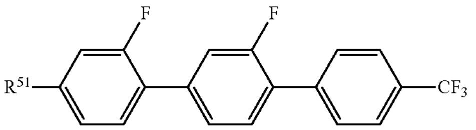

V-2

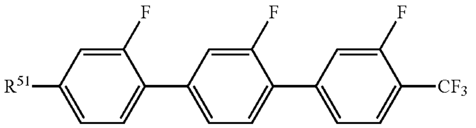

V-3

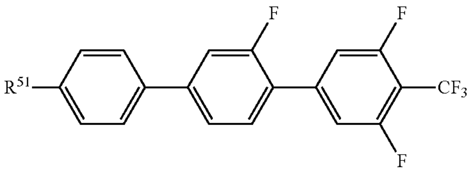

V-4

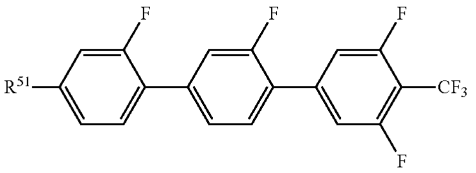

V-5

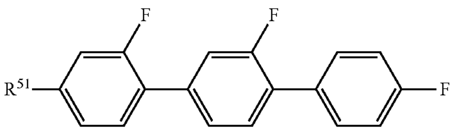

V-6

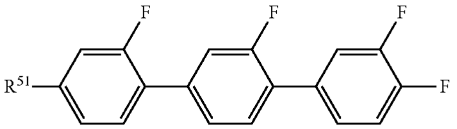

V-7

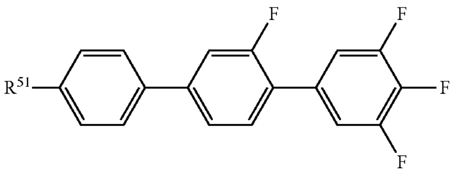

V-8

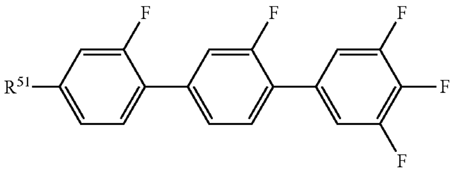

wherein $R^{51}$ has the meaning given under formula II above and preferably is n-butyl or n-pentyl.

Preferably, the blue phase LC medium according to the present invention comprises one more compounds formula VI

VI

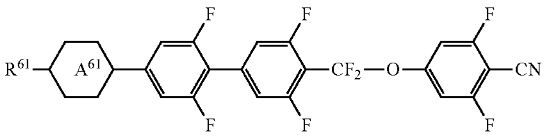

wherein $R^{61}$ is an alkyl group, which is straight chain or branched, preferably has 1 to 20 C-atoms, is unsubstituted, mono- or poly-substituted by F, Cl or CN, preferably by F, and in which one or more $CH_2$ groups are optionally replaced, in each case independently from one another, by —O—, —S—, —CO—, —COO—, —OCO—, —OCO—O—, —S—CO—, —CO—S— or —C≡C— in such a manner that O and/or S atoms are not linked directly to one another, preferably n-alkyl, n-alkoxy with 1 to 9 C-atoms, preferably 2 to 5 C-atoms, alkenyl, alkenyloxy or alkoxyalkyl with 2 to 9 C-atoms, preferably with 2 to 5 C-atoms, most preferably n-alkyl, n-alkoxy, alkenyl, alkenyloxy or alkoxyalkyl,

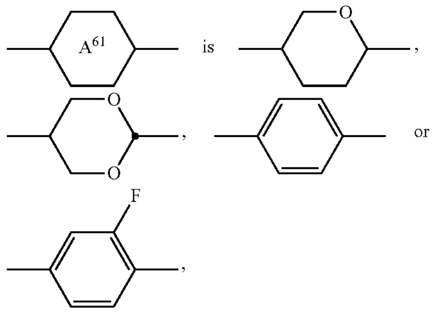

preferably

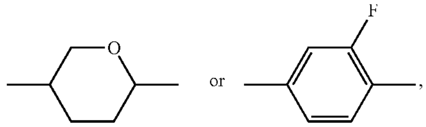

In a preferred embodiment of the present invention the blue phase LC medium comprises one more compounds of formula VI, preferably selected from the group of compounds of its sub-formulae VI-1 to VI-4,

VI-1

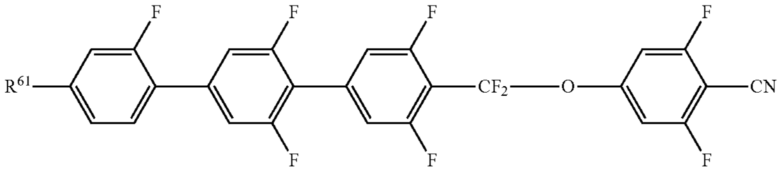

VI-2

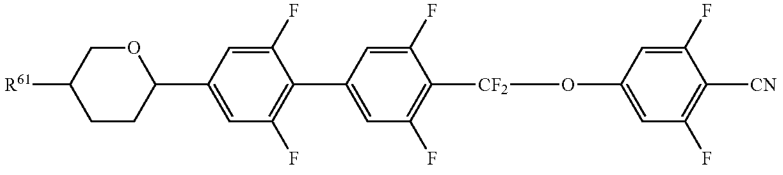

VI-3

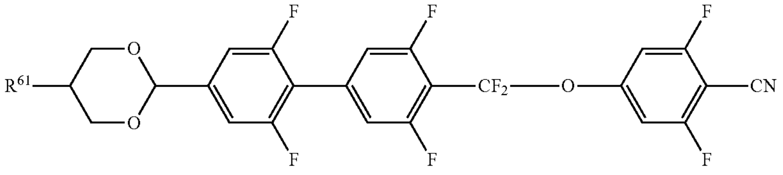

wherein $R^{61}$ has one of the meanings given above under formula VI.

Preferably, the blue phase LC medium according to the present invention comprises one more compounds formula VII

VII

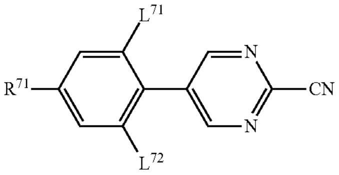

wherein $R^{71}$ is alkyl, which is straight chain or branched, preferably has 1 to 20 C-atoms, is unsubstituted, mono- or poly-substituted by F, Cl or CN, preferably by F, and in which one or more $CH_2$ groups are optionally replaced, in each case independently from one another, by —O—, —S—, —$NR^{01}$—, —$SiR^{01}R^{02}$—, —CO—, —COO—, —OCO—, —OCO—O—, —S—CO—, —CO—S—, —$CY^{01}$═$CY^{02}$— or —C≡C— in such a manner that O and/or S atoms are not linked directly to one another, preferably n-alkyl or n-alkoxy with 1 to 9 C-atoms, preferably with 2 to 5 C-atoms, alkenyl, alkenyloxy or alkoxyalkyl with 2 to 9 C-atoms, preferably with 2 to 5 C-atoms or halogenated alkyl, halogenated alkenyl or halogenated alkoxy with preferably up to 9 C-atoms, preferably mono fluorinated, di-fluorinated or oligofluorinated alkyl, alkenyl or alkoxy with preferably up to 9 C-atoms, most preferably n-alkyl, n-alkoxy, alkenyl, alkenyloxy or alkoxyalkyl with preferably up to 9 C-atoms, $L^{71}$ and $L^{72}$ are, independently of each other, H or F, preferably one is F sand the other H or F and most preferably both are F, $Y^{01}$ and $Y^{02}$ are, independently of each other, F, Cl or CN, and alternatively one of them may be H, and $R^{01}$ and $R^{02}$ are, independently of each other, H or alkyl with 1 to 12 C-atoms.

Preferably, the compounds of formula VII are selected from the compounds of formula VII-1 and VII-2, preferably from formula VII-2

VII-1

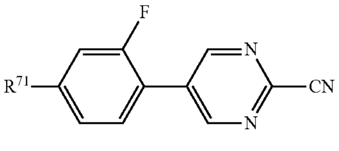

VII-2

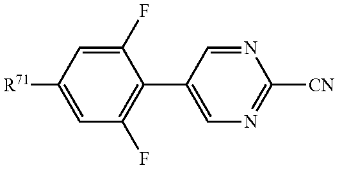

wherein $R^{71}$ has the meaning given under formula VII above.

An alkyl group or an alkoxy group, i.e. an alkyl group where the terminal $CH_2$ group is replaced by —O—, in this application may be straight chain or branched. It is preferably straight-chain, has 1, 2, 3, 4, 5, 6, 7 or 8 carbon atoms and accordingly is preferably methyl, ethyl, propyl, butyl, pentyl, hexyl, heptyl, octyl, ethoxy, propoxy, butoxy, pentoxy, hexoxy, heptoxy, or octoxy, furthermore nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. an alkyl group in which one non-terminal $CH_2$ group is replaced by —O—, is preferably straight-chain 2-oxapropyl (=methoxy-methyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkenyl group, i.e. an alkyl group wherein one or more $CH_2$ groups are replaced by —CH═CH—, may be straight chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C-atoms are generally preferred.

In an alkyl group, wherein one $CH_2$ group is replaced by —O— and one by —CO—, these radicals are preferably neighboured. Accordingly, these radicals together form a carbonyloxy group —CO—O— or an oxycarbonyl group —O—CO—. Preferably, such an alkyl group is straight chain and has 2 to 6 C atoms.

It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxy-carbonyl) ethyl, 3-(methoxycarbonyl)propyl, 3-(ethoxycarbonyl) propyl, 4-(methoxycarbonyl)-butyl.

An alkyl group wherein two or more $CH_2$ groups are replaced by —O— and/or —COO—, it can be straight chain or branched. It is preferably straight chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight chain. The substitution by CN or $CF_3$ can be in any desired position.

An alkyl or alkenyl group that is at least monosubstituted by halogen, it is preferably straight chain. Halogen is preferably F or Cl, in case of multiple substitutions preferably F. The resulting groups include also perfluorinated groups. In case of monosubstitution, the F or CI substituent can be in any desired position, but is preferably in ω-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl, and 7-fluoroheptyl. Other positions of F are not excluded.

Halogen means F, Cl, Br and I and is preferably F or Cl, most preferably F.

Each of R may be a polar or a non-polar group. In case of a polar group, it is preferably selected from CN, $SF_5$, halogen, $OCH_3$, SCN, $COR^5$, $COOR^5$ or a mono- oligo- or polyfluorinated alkyl or alkoxy group with 1 to 4 C atoms. $R^5$ is optionally fluorinated alkyl with 1 to 4, preferably 1 to 3 C atoms. Especially preferred polar groups are selected of F, Cl, CN, $OCH_3$, $COCH_3$, $COC_2H_5$, $COOCH_3$, $COOC_2H_5$, $CF_3$, $CHF_2$, $CH_2F$, $OCF_3$, $OCHF_2$, $OCH_2F$, $C_2F_5$ and $OC_2F_5$, in particular F, Cl, CN, $CF_3$, $OCHF_2$ and $OCF_3$. In case of a non-polar group, it is preferably alkyl with up to 15 C atoms or alkoxy with 2 to 15 C atoms.

Each of $R^1$ to $R^5$ may be an achiral or a chiral group. In case of a chiral group, it is preferably of formula I*:

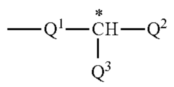

I* wherein $Q^1$ is an alkylene or alkylene-oxy group with 1 to 9 C atoms or a single bond, $Q^2$ is an alkyl or alkoxy group with 1 to 10 C atoms which may be unsubstituted, mono- or polysubstituted by F, Cl, Br or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another, $Q^3$ is F, Cl, Br, CN, or an alkyl or alkoxy group as defined for $Q^2$ but being different from $Q^2$.

In case $Q^1$ in formula I* is an alkylene-oxy group, the O atom is preferably adjacent to the chiral C atom.

Preferred chiral groups of formula I* are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups I* are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral-branched alkyl group may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

The polymer stabilized blue phase LC medium according to the present invention comprises one or more reactive compounds, respectively polymerisable compounds, each comprising one, two or more reactive groups, respectively polymerisable groups. This is obvious, as the blue phase LC medium is stabilized in the blue phase by the formation of a polymer, which may have the form of a matrix or of a network.

The temperature range of typical LC media, which are exhibiting a pure blue phase (BP) on their own, generally is not wide enough. Such media typically have a blue phase, which extends over a small temperature range of only some degrees, e.g. about 3 to 4°. Thus, an additional stabilisation, extending the temperature range of the blue phase, is needed in order to make such media suitable for practical applications such as in displays.

In order to stabilise the blue phase by the formation of a polymer, the formulated blue phase host mixture is conveniently combined with an appropriate chiral dopant (one or more suitable chiral compounds) and with one or more polymerisable compounds, preferably reactive mesogenic compounds (RMs). The resultant mixture is filled into the inverse lens structure formed by the isotropic material of the replica structure and held at a certain temperature at which the mixture is in the blue phase, e.g. it is heated or cooled until blue phase can be observed at a certain temperature. This temperature is maintained during the whole polymerisation process. The polymerisation process is typically controlled by UV irradiation of a typical medium-pressure mercury-vapour lamp. A standard condition is e.g. use of 3 $mW/cm^2$ for 180 sec. at a wavelength of 380 nm. To avoid damage to the LC medium appropriate optical filters can be used additionally.

In the following the criteria for stability of the obtained polymer stabilized blue phase are briefly be explained.

Ensuring an excellent quality of the polymer stabilisation is critical for use of PS-BP in an autostereoscopic display device. The quality of polymer stabilization is the judged by several criteria. Optical inspection ensures a good polymerisation. Any defect and/or haziness observed in the test cell/panel is an indication of a suboptimal polymer stabilisation. Electro-optical inspection under various load/stress conditions ensures long-time stability of the polymer stabilized blue phase LC medium.

Accordingly, in a preferred embodiment of the present invention the blue phase LC medium is preferably polymer stabilized and comprises one or more chiral compounds, one or more mesogenic compounds, and one or more polymerisable compounds.

The polymer stabilized blue phase LC medium comprises in another preferred embodiment, one or more compounds of the formula I, one or more chiral compounds and one or more polymerisable compounds, preferably selected from compounds of the formula P $$P^a\text{-}(Sp^a)_{s1}\text{-}(A^1\text{-}Z^1)_{n1}\text{-}A^2\text{-}Q\text{-}A^3\text{-}(Z^4\text{-}A^4)_{n2}\text{-}(Sp^b)_{s2}\text{-}P^b \qquad \text{P}$$

wherein the individual radicals have the following meanings:

$P^a$, $P^b$ each, independently of one another, are a polymerisable group, $Sp^a$, $Sp^b$ each, independently of one another, denote a spacer group, s1, s2 each, independently of one another, denote 0 or 1, n1, n2 each, independently of one another, denote 0 or 1, preferably 0, $Q^1$ denotes —$CF_2O$—, —$OCF_2$—, —$CH_2O$—, —$OCH_2$—, —(CO)O—, —O(CO)—, —$(CH_2)_4$—, —$CH_2CH_2$—, —$CF_2$—$CF_2$—, —$CF_2$—$CH_2$—, —$CH_2$—$CF_2$—, —CH═CH—, —CF═CF—, —CF═CH—, —$(CH_2)_3$O—, —O$(CH_2)_3$—, —CH═CF—, —C≡C—, —O—, —$CH_2$—, —$(CH_2)_3$—, —$CF_2$—, preferably —$CF_2O$—, $Z^1$, $Z^4$ denote a single bond, —$CF_2O$—, —$OCF_2$—, —$CH_2O$—, —$OCH_2$—, —(CO)O—, —O(CO)—, —$(CH_2)_4$—, —$CH_2CH_2$—, —$CF_2$—$CF_2$—, —$CF_2$—$CH_2$—, —$CH_2$—$CF_2$—, —CH═CH—, —CF═CF—, —CF═CH—, —$(CH_2)_3$O —, —O$(CH_2)_3$—, —CH═CF—, —C≡C—, —O—, —$CH_2$—, —$(CH_2)_3$—, —$CF_2$—, where $Z^1$ and $Q^1$ or $Z^2$ and $Q^1$ do not simultaneously denote a group selected from —$CF_2O$— and —$OCF_2$—, $A^1$, $A^2$, $A^3$, $A^4$ each, independently of one another, denotes a diradical group selected from the following groups:

a) the group consisting of trans-1,4-cyclohexylene, 1,4-cyclohexenylene and 1,4"-bicyclohexylene, in which, in addition, one or more non-adjacent $CH_2$ groups may be replaced by —O— and/or —S— and in which, in addition, one or more H atoms may be replaced by F, b) the group consisting of 1,4-phenylene and 1,3-phenylene, in which, in addition, one or two CH groups may be replaced by N and in which, in addition, one or more H atoms may be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

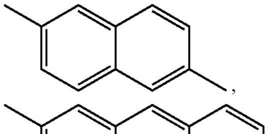

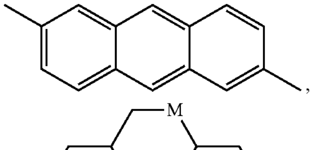

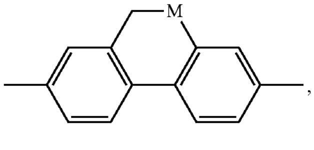

-continued

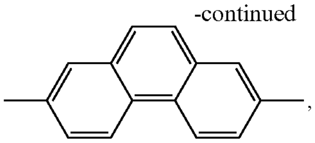

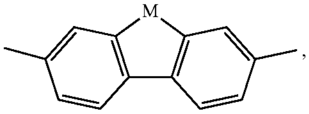

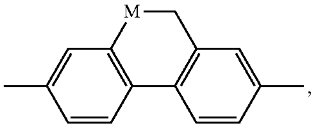

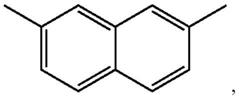

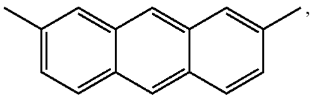

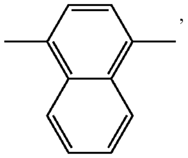

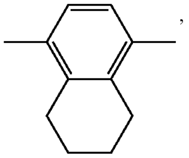

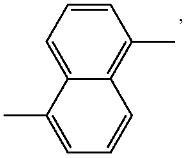

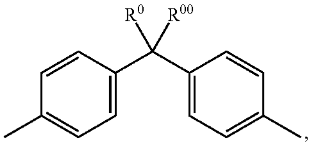

where, in addition, one or more H atoms in these radicals may be replaced by L, and/or one or more double bonds may be replaced by single bonds, and/or one or more CH groups may be replaced by N, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or al koxycarbonyloxy having 1 to 12 C atoms, $R^0$, $R^{00}$ each, independently of one another, denote H, F or straight-chain or branched alkyl having 1 to 12 C atoms, in which, in addition, one or more H atoms may be replaced by F, M denotes —O—, —S—, —$CH_2$—, —$CHY^1$— or —$CY^1Y^2$—, and $Y^1$ and $Y^2$ each, independently of one another, have one of the meanings indicated above for $R^0$, or denote Cl or CN, and one of the groups $Y^1$ and $Y^2$ alternatively denotes —$OCF_3$, preferably H, F, Cl, CN or $CF_3$, In another preferred embodiment, the present invention not only relates to a polymer stabilized system obtainable by polymerisation of one or more compounds of the formula P alone, but also in another preferred embodiment, to a combination of compounds of formula P with one or more further polymerisable compounds in a respective mixture, and to the use of such stabilized systems in a lens element.

Compounds of the formula P preferably used in the polymer stabilized blue phase LC medium are selected from the group consisting of the following formulae:

P1
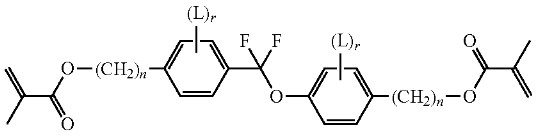
P2
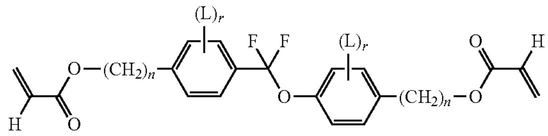
P3
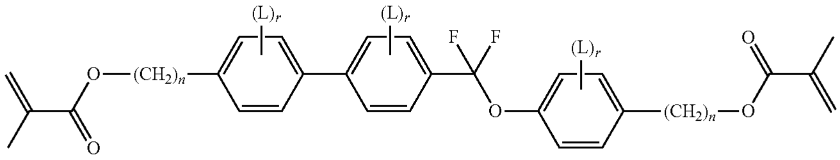
P4
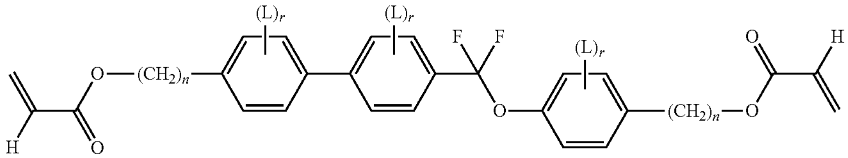
P5
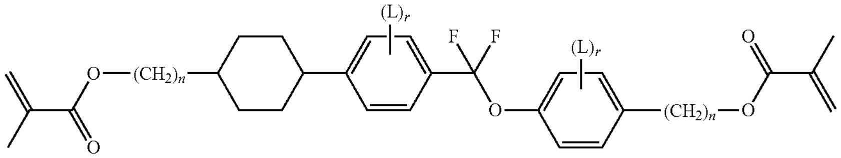
P6
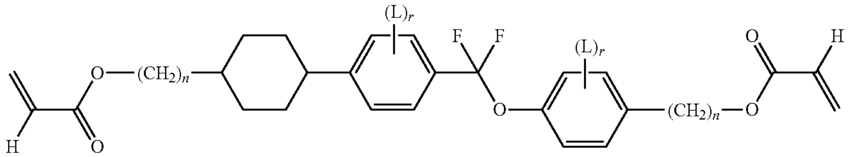
P7
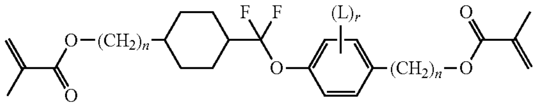
P8
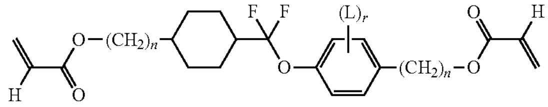
P9
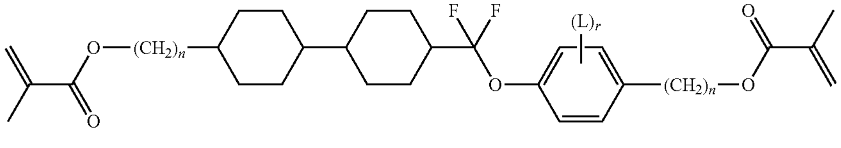
P10
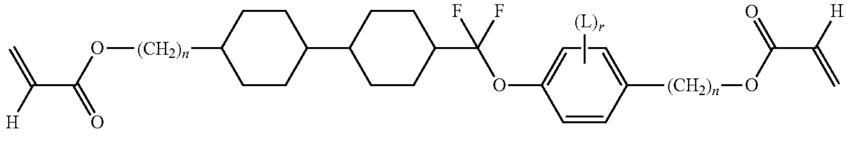
P11
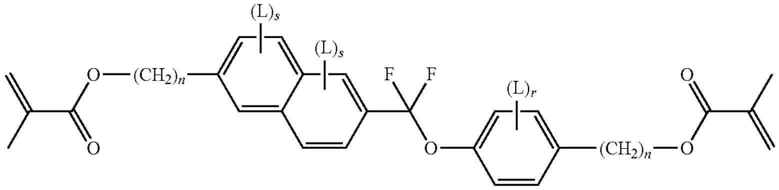

-continued
P12
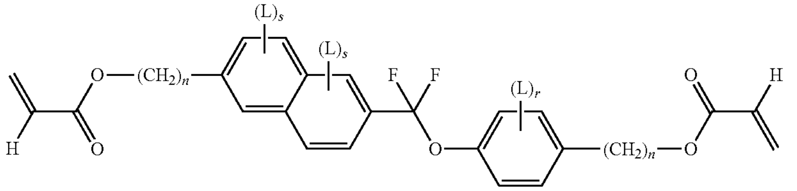
P13
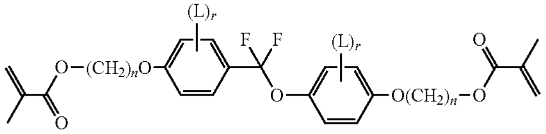
P14
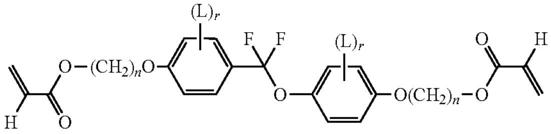
P15
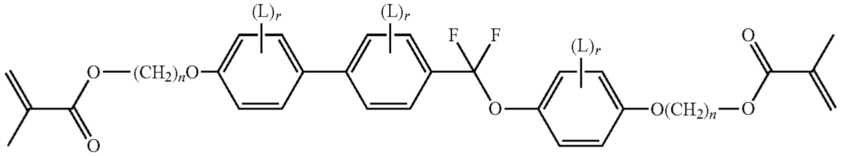
P16
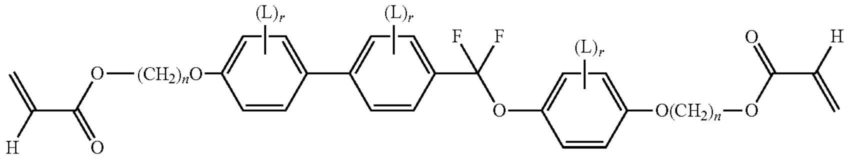
P17
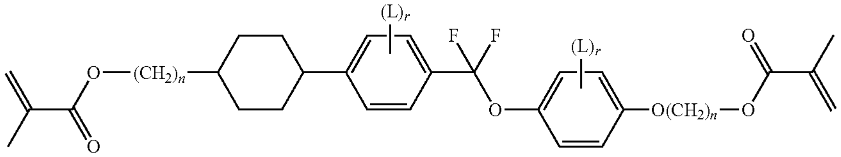
P18
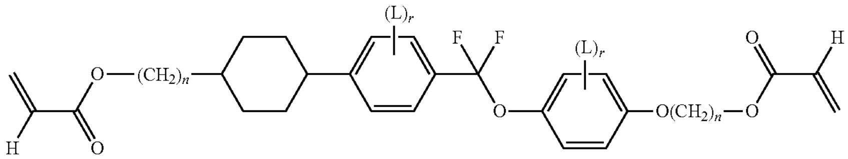
P19
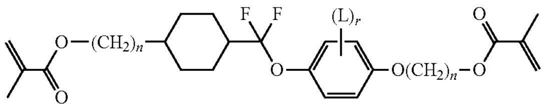
P20
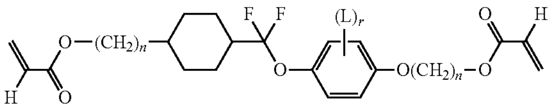
P21
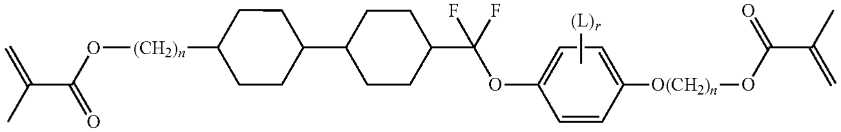
P22
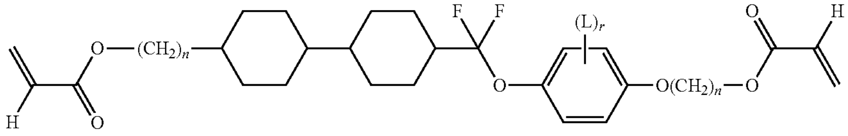

-continued

P23

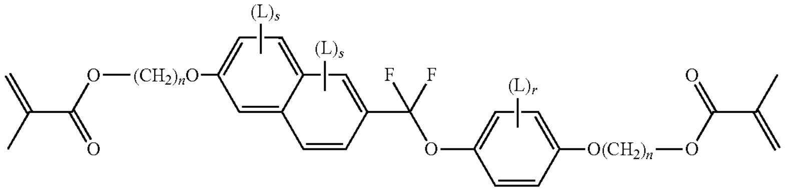

P24

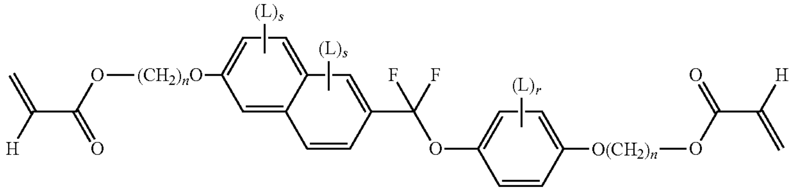

in which L in each occurrence, identically or differently, has one of the meanings indicated above and below, r denotes 0, 1, 2, 3 or 4, s denotes 0, 1, 2 or 3, and n denotes an integer between 1 and 24, preferably between 1 and 12, very particularly preferably between 2 and 8, and in which, if a radical is not indicated at the end of a single or double bond, it is a terminal $CH_3$ or $CH_2$ group.

In the formulae P1 to P24,

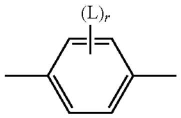

preferably denotes a group selected from the group consisting of the following formulae:

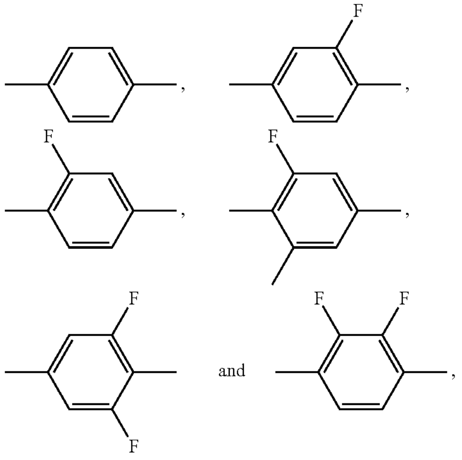

particularly preferably

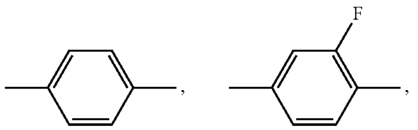

-continued

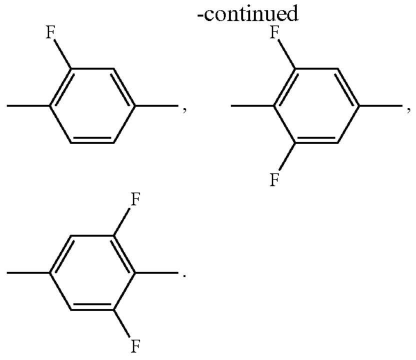

The group $A^2$-Q-$A^3$ preferably denotes a group of the formula

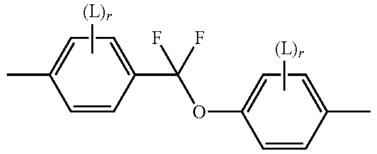

in which one or more of the rings is substituted by one or more group L=F. r here is in each case, independently, preferably 0, 1 or 2.

$P^a$ and $P^b$ in the compounds of the formula P and the sub-formulae thereof preferably denote acrylate or methacrylate, furthermore fluoroacrylate.

$Sp^a$ and $Sp^b$ in the compounds of the formula I and the sub-formulae thereof preferably denote a radical selected from the group consisting of —$(CH_2)_{p1}$—, —$(CH_2)_{p1}$—O—, —$(CH_2)_{p1}$—O—CO— and —$(CH_2)_{p1}$—O—CO—O— and mirror images thereof, in which p1 denotes an integer from 1 to 12, preferably from 1 to 6, particularly preferably 1, 2 or 3, where these groups are linked to $P^a$ or $P^b$ in such a way that O atoms are not directly adjacent.

Of the compounds of the formula P, particular preference is given to those in which the radicals $P^a$ and $P^b$ are selected from the group consisting of vinyloxy, acrylate, methacrylate, fluoroacrylate, chloroacrylate, oxetane and epoxide groups, particularly preferably acrylate or methacrylate groups, the radicals $Sp^a$ and $Sp^b$ are selected from the group consisting of —$(CH_2)_{p1}$—, —$(CH_2)_{p1}$—O—, —$(CH_2)_{p1}$—O—CO— and —$(CH_2)_{p1}$—O—CO—O— and mirror images thereof, in which p1 denotes an integer from 1 to 12, preferably from 1 to 6, particularly preferably 1, 2 or 3, and where these radicals are linked to $P^a$ or $P^b$ in such a way that O atoms are not directly adjacent, Compounds of formula P preferably used according to a preferred embodiment of the instant invention are those comprising exactly two rings (n1=n2=0), which are preferably 6-membered rings. Especially preferred are compounds selected from the group of compounds of the following formulae:

Pa

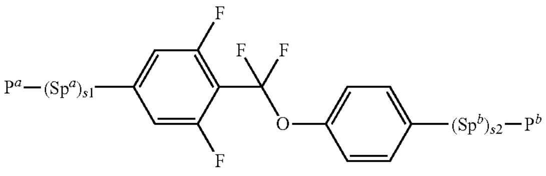

Pb

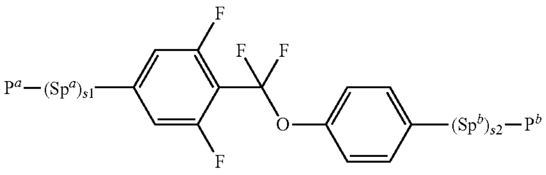

Pc

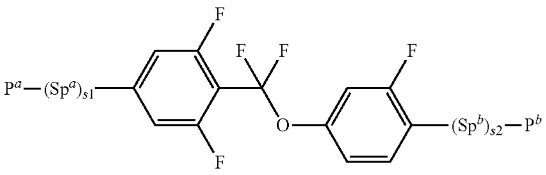

Pd

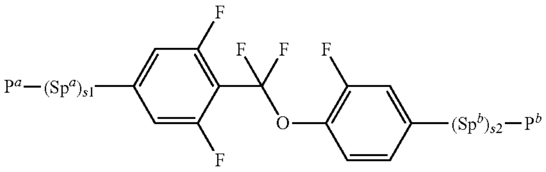

Pe

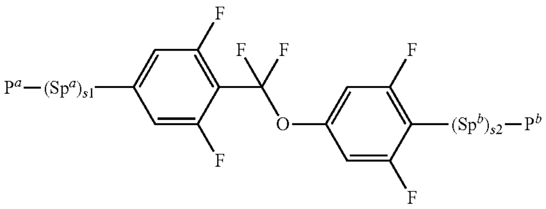

Pf

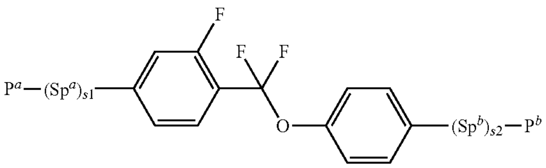

-continued

Pg

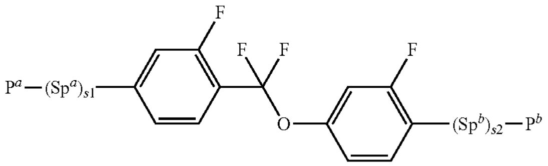

Ph

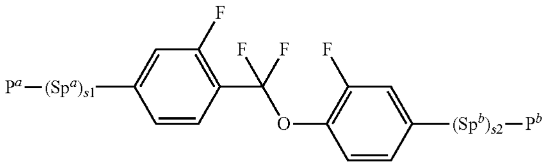

Pi

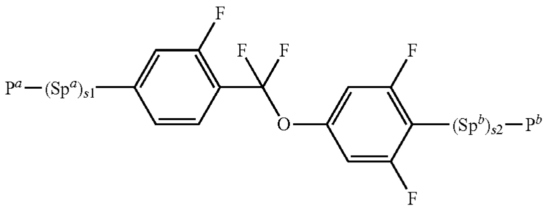

Pk

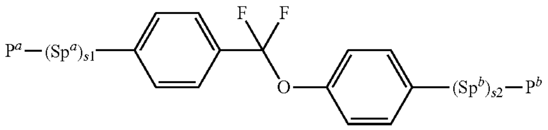

Pl

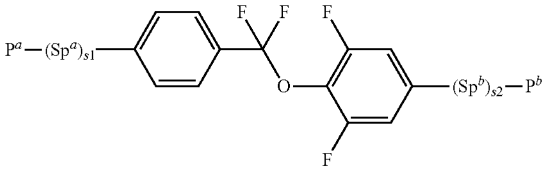

Pm

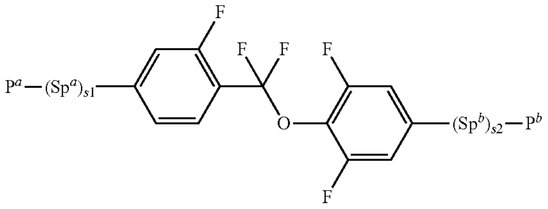

Pn

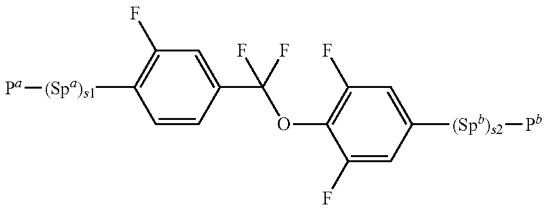

-continued

Po

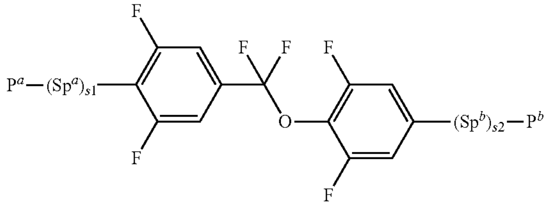

Pp

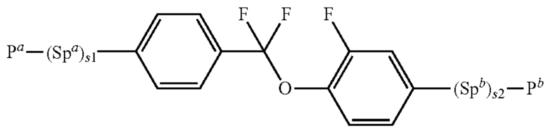

Pq

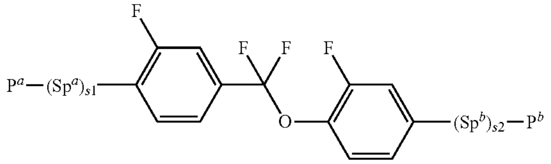

Pr

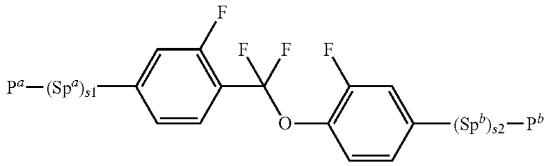

Ps

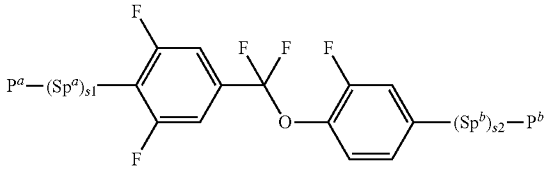

wherein $P^a$, $P^b$, $Sp^a$, $Sp^b$, s1 and s2 are as defined under formula P above, and preferably $Sp^{a/b}$ is alkylene $—(CH_2)_n—$ wherein n preferably is 3, 4, 5, 6 or 7 and $P^{a/b}$) a methacrylat- or acrylate moiety. Especially preferred is the use of compounds selected from the group of formulae Pa, Pb, Pc, Pd, Pe, Pf, Pg, Ph and Pi and, in particular the compounds of formula Pa.

The moiety "$A^2$-$Q^1$-$A^3$" preferably is a moiety of formula

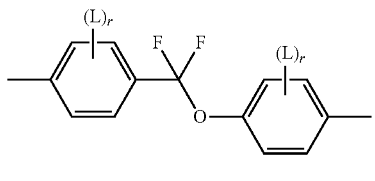

wherein preferably at least one of the two phenylene rings is substituted by one or more L, which is different from H, wherein r is independently for each ring, and preferably it is for each ring 0, 1 or 2.

For the compounds of formula P, as well as for its respective sub-formulae, preferably $P^a$ and $P^b$ are, independently from each other, acrylate or methacrylate, but also fluoroacrylate, $Sp^a$ and $Sp^b$ are, independently from each other, $—(CH_2)_{p1}—$, $—(CH_2)_{p1}—O—$, $—O—(CH_2)_{p1}—$, $—(CH_2)_{p1}—O—CO—$, $—CO—O—(CH_2)_{p1}—$, $—(CH_2)_{p1}—O—CO—O—$ or $—(CH_2)_{p1}—O—CO—O—$, wherein p1 is an integer from 1 to 12, preferably from 1 to 6, particularly preferred 1, 2 or 3, and wherein these moieties are liked with $P^a$ or $P^b$ in such a way that no O-atoms are linked directly to one another.

Especially preferred is the use of compounds of formula P, wherein $P^a$ and $P^b$ are vinyleoxy-, acrylate-, methacrylata-, fluoroacrylate-, chloroacrylate-, oxetane- or an epoxy-group, particularly preferred acrylate- or methacrylate, $Sp^a$ and $Sp^b$ are $—(CH_2)_{p1}—$, $—(CH_2)_{p1}—O—$, $—O—(CH_2)_{p1}—$, $—(CH_2)_{p1}—O—CO—$, $—CO—O—(CH_2)_{p1}—$, $—(CH_2)_{p1}—O—CO—O—$ or $—(CH_2)_{p1}—O—CO—O—$, wherein p1 is an integer from 1 to 12, preferably from 1 to 6, particularly preferred 1, 2 or 3, and wherein these moieties are liked with $P^a$ or $P^b$ in such a way that no O-atoms are linked directly to one another.

The polymerisable compounds are polymerised or crosslinked, in case one compound contains or more compounds contain two or more polymerisable groups, by in-situ polymerisation in the blue phase LC medium between the replica structure and the cover sheet of the lens element with application of a voltage. The polymerisation can be carried out in one step. It is preferable to carry out the polymerisation at a temperature at which the material, i.e. the mesogenic mixture comprising the chiral compounds and the polymer precursor are in the blue phase.

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such as, for example, lower material costs and in particular less contamination of the blue phase LC medium by possible residual amounts of the initiator or degradation products thereof. The polymerisation can thus also be carried out without the addition of an initiator. In a preferred embodiment, the blue phase LC medium thus comprises no polymerisation initiator.

The polymerisable component or the blue phase LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component, is preferably in the range from 10 to 10,000 ppm, particularly preferably in the range from 50 to 2.000 ppm, most preferably 0.2% or about 0.2%.

The polymerisable compounds of formula P used preferably according to the present invention can be polymerised individually, but it is also possible to polymerise mixtures which comprise two or more polymerisable compounds according to the invention, or mixtures comprising one or more polymerisable compounds according to the invention and one or more further polymerisable compounds (comonomers), which are preferably mesogenic or liquid-crystalline. In the case of polymerisation of such mixtures, copolymers form. A mixture of two or more compounds according to the invention or a mixture comprising one or more compounds according to the invention with one or more further polymerisable compounds is preferably used. The invention furthermore relates to the polymerisable mixtures mentioned above and below. The polymerisable compounds and comonomers are mesogenic or non-mesogenic, preferably mesogenic or liquid-crystalline.

Suitable and preferred co-monomers for use in polymer precursors for polymer stabilised displays according to the invention are selected, for example, from the following formulae:

M1

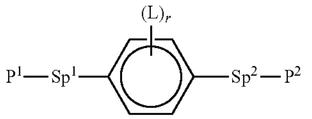

M2

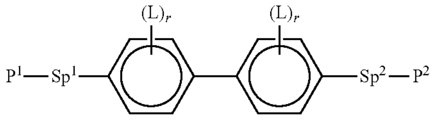

M3

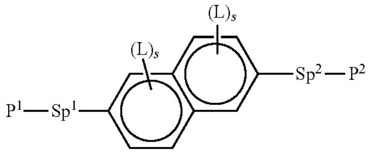

M4

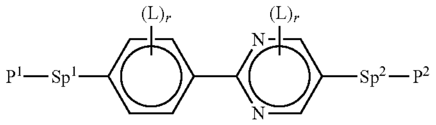

M5

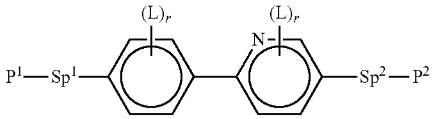

M6

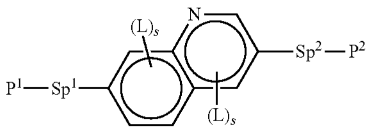

M7

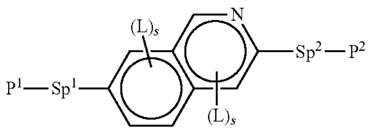

M8

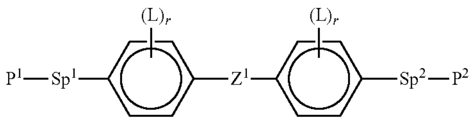

-continued

M9

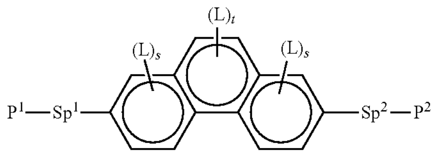

M10

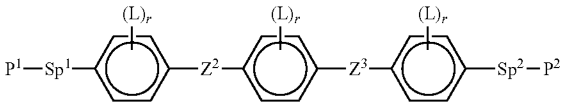

M11

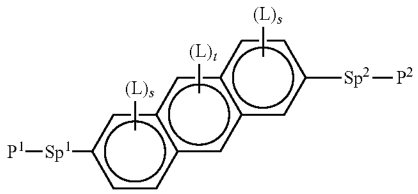

M12

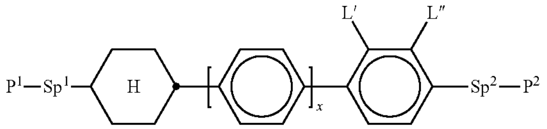

M13

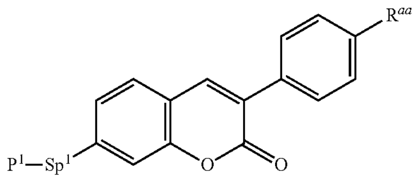

M14

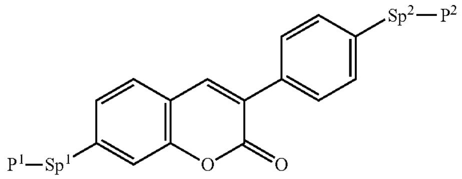

M15

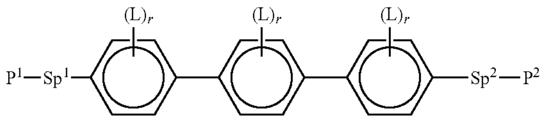

M16

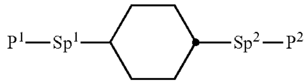

M17

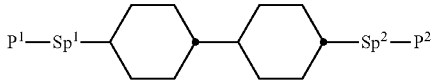

M18

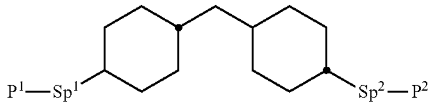

M19

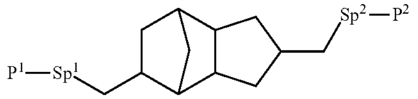

-continued

M20

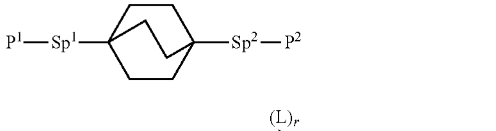

M21

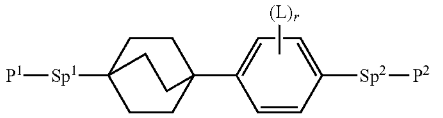

M22

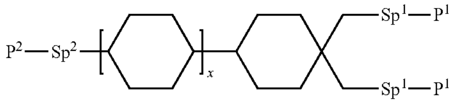

M23

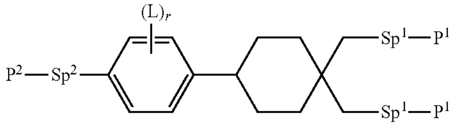

M24

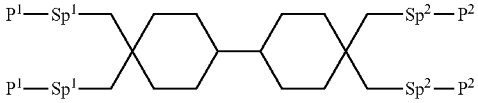

M25

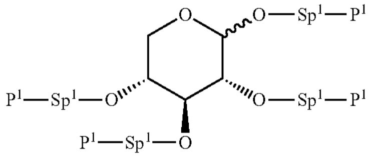

M26

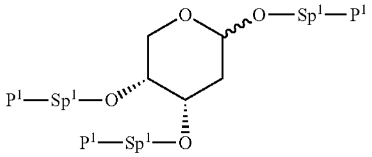

M27

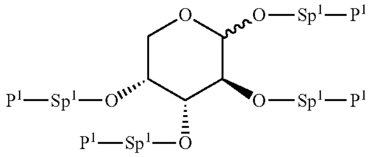

M28

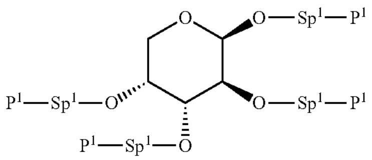

M29

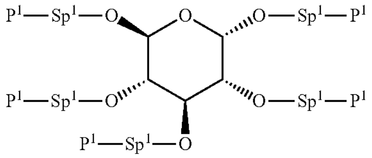

wherein the parameters have the following meanings:

$P^1$ and $P^2$ each, independently of one another, a polymerisable group, preferably having one of the meanings given above or below for $P^a$, particularly preferred an acrylate, methacrylate, fluoroacrylate, oxetane, vinyloxy- or epoxy group, $Sp^1$ and $Sp^2$ each, independently of one another, a single bond or a spacer group, preferably having one of the meanings given above or below for $Sp^a$, particularly preferred an —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, and wherein the groups mentioned last are linked to the adjacent ring via the O-atom, and, wherein alternatively also one or more of $P^1$-$Sp^1$- and $P^2$-$Sp^2$- may be $R^{aa}$, provided that at least one of $P^1$-$Sp^1$- and $P^2$-$Sp^2$- present in the compound is not $R^{aa}$, $R^{aa}$ H, F, Cl, CN or linear or branched alkyl having 1 to 25 C-atoms, wherein one or more non-adjacent —$CH_2$— groups, independently of each another, may be replaced by)) —C($R^0$═C($R^{00}$—, —C≡C—, —N($R^0$—, —O—, —S—, —CO—, —OO—O—, —O—CO—, —O—CO—O— in such a way that neither O- nor S-atoms are directly linked to one another, and wherein also one or more H-atoms may be replaced by F, Cl, CN or $P^1$-$Sp^1$-, particularly preferred linear or branched, optionally single- or polyfluorinated, alkyl, alkoxy, alkenyl, alkinyl, alkylcarbonyl, alkoxycarbonyl, or alkylcarbonyloxy having 1 to 12 C-atoms, wherein the alkenyl- and alkinyl groups have at least two and the branched groups have at least three C-atoms, $R^0$, $R^{00}$ each, at each occurrence independently of one another, H or alkyl having 1 to 12 C-atoms, $R^y$ and $R^z$ each, independently of one another, H, F, $CH_3$ or $CF_3$, $Z^1$—O—, —CO—, —C($R^yR^z$)—, or —$CF_2CF_2$—, $Z^2$ and $Z^3$ each, independently of one another, —OO—O—, —O—CO—, —$CH_2O$—, —$OCH_2$—, —$CF_2O$—, —$OCF_2$—, or —$(CH_2)_n$—, wherein n is 2, 3 or 4, L at each occurrence independently of one another, F, Cl, CN, SCN, $SF_5$ or linear or branched, optionally mono- or polyfluorinated, alkyl, alkoxy, alkenyl, alkinyl, alkylcarbonyl, alkoxycarbonyl, alkylcarbonyloxy or al koxycarbonyloxy having 1 to 12 C-atoms, preferably F, L' and L" each, independently of one another, H, F or Cl, r 0, 1, 2, 3 or 4, s 0, 1, 2 or 3, t 0, 1 or 2, and x 0 or 1.

Suitable and preferred co-monomers for use in autostereoscopic display devices according to the present application operable and/or operating at a temperature where the LC medium is in the blue phase are for example selected from the group of mono-reactive compounds, which are present in the precursor of the polymer stabilised systems in a concentration in the range from 1 to 9 wt.-%, particularly preferred from 4 to 7 wt.-%. Preferred mono-reactive compounds are the compounds of formulae M1 to M29, wherein one or more of $P^1$-$Sp^1$- and $P^2$-$Sp^2$- are Rest $R^{aa}$, such that the compounds have a single reactive group only.

Particularly preferred mono-reactive compounds are the compounds of the following formulae

M16-A

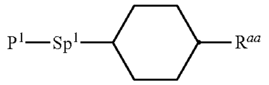

M17-A

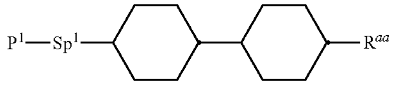

wherein $P^1$, $Sp^1$ and $R^{aa}$ have the respective meanings given above.

Amongst these the compounds of the formula

M17-A'

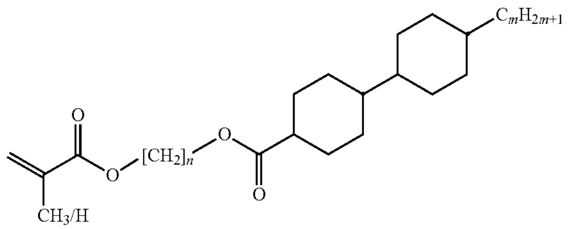

wherein n is an integer, preferably an even integer, in the range from 1 to 16, preferably from 2 to 8, m is an integer in the range from 1 to 15, preferably from 2 to 7, are especially preferred.

Particular preference is given to an LC medium, an LC display, a process or the use as described above and below in which the LC medium or the polymerisable or polymerised component present therein comprises one or more compounds of the following formula:

M10-A

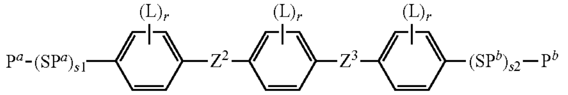

in which $P^a$, $P^b$, $Sp^a$, $Sp^b$, s1, s2 and L have the meanings indicated above and below, r denotes 0, 1, 2, 3 or 4, and $Z^2$ and $Z^3$ each, independently of one another, denote —$CF_2$—O— or —O—$CF_2$—, preferably $Z^2$ is —$CF_2$—O— and $Z^3$ is —O—$CF_2$— or vice versa, and, most preferably, $Z^2$ is —$CF_2$—O— and $Z^3$ is —O—$CF_2$—.

The polymer stabilized blue phase LC medium comprises one or more chiral compounds which have preferably a mesogenic structure and exhibit preferably one or more meso-phases themselves, particularly at least one cholesteric phase. Preferred chiral compounds being comprised in the mesogenic media are, amongst others, well known chiral dopants like cholesteryl-nonanoate (CN), R/S-811, R/S-1011, R/S-2011, R/S-3011, R/S-4011, R/S-5011, CB-15 (Merck KGaA, Darmstadt, Germany). Preferred are chiral dopants having one or more chiral moieties and one or more mesogenic groups or having one or more aromatic or alicyclic moieties forming, together with the chiral moiety, a mesogenic group. More preferred are chiral moieties and mesogenic chiral compounds disclosed in DE 34 25 503, DE 35 34 777, DE 35 34 778, DE 35 34 779, DE 35 34 780, DE 43 42 280, EP 01 038 941 and DE 195 41 820 that disclosure is incorporated within this application by way of reference. Particular preference is given to chiral binaphthyl derivatives as disclosed in EP 01 111 954.2, chiral binaphthol derivatives as disclosed in WO 02/34739, chiral TADDOL derivatives as disclosed in WO 02/06265 as well as chiral dopants having at least one fluorinated linker and one end chiral moiety or one central chiral moiety as disclosed in WO 02/06196 and WO 02/06195.

All herein mentioned compounds are accessible by the usual methods known to the expert. Starting materials are either commercially available or accessible by published methods such as, for example, in Houben-Weyl, Methoden der organischen Chemie [Methods of Organic Chemistry], Thieme-Verlag, Stuttgart.

Preferably polymer stabilized blue phase LC medium according to the instant invention contains a component A comprising, preferably predominantly consisting of and most preferably entirely consisting of compounds of formula I.

Comprising in this application means in the context of compositions that the entity referred to, e.g. the medium or the component, contains the compound or compounds in question, preferably in a total concentration of 10% or more and most preferably of 20% or more.

Predominantly consisting, in this context, means that the entity referred to contains 80% or more, preferably 90% or more and most preferably 95% or more of the compound or compounds in question.

Entirely consisting, in this context, means that the entity referred to contains 98% or more, preferably 99% or more and most preferably 100.0% of the compound or compounds in question.

The concentration of the compounds of formula I, preferably selected from the compounds of formulae I-1 and/or I-2 are contained in the media according to the present application preferably is in the range from 0.5% or more to 70% or less, more preferably in the range from 1% or more to 60% or less and most preferably in the range from 5% or more to 50% or less.

In a preferred embodiment the blue phase LC medium according to the instant invention, comprise

- one compound or more compounds selected from the group of compounds of formula II, preferably in a total concentration of 1% to 25% by weight, more preferably in a concentration of 1% to 20% by weight, and most preferably
  - in a concentration of case of 1% to 10% by weight for each single compound present, and/or
- one compound or more compounds of formula III-1, preferably in a total concentration of 1% to 40% by weight, more preferably in a concentration of 1% to 30% by weight, and most preferably
  - in a concentration of case of 1% to 20% by weight for each single compound present, and/or
- one compound or more compounds of formula III-2, preferably in a total concentration of 1% to 25% by weight, more preferably in a concentration of 1% to 10% by weight, and most preferably
  - in a concentration of case of 1% to 15% by weight for each single compound present, and/or
- one compound or more compounds selected from the group of compounds of formula IV, preferably in a concentration of 1% to 25% by weight, and/or
- optionally, preferably obligatorily, one or more compounds selected from the group of compounds of formulae V and VI preferably in a concentration of 1% to 25% by weight, and/or
- optionally, preferably obligatorily, one or more compounds selected from the group of compounds of formula VII preferably in a concentration of 1% to 25% by weight, and/or
- of one or more chiral compounds with a HTP of ≥20 $\mu m^{-1}$, preferably in a concentration of 1% to 20% by weight, and
- a polymer precursor, comprising reactive compounds, preferably comprising reactive mesogens, which, upon polymerisation, are able to, and preferably do stabilize the phase range of the blue phase and/or decrease the temperature dependence of the electro-optical effect, preferably in a concentration in the range from 5% or more to 15% or less, preferably from 7% or more to 12% or less and most preferably from 8% or more toll % or less.

In this application, unless explicitly stated otherwise concentrations of the constituents of the host mixtures are given with respect to the total host mixture, i.e. excluding the chiral dopant(s) and the polymer precursor, concentrations of the chiral dopant(s) are given with respect to the total host including mixture the chiral dopant(s) but excluding the polymer precursor, concentrations of polymer precursor and its constituents are given with respect to the total mixture total, i.e. the mixture consisting of the host mixture, the chiral dopant(s) and the polymer precursor, Suitable blue phase LC medium preferably comprises one or more compounds selected from the group of compounds of formulae I and II and optionally III, preferably in a total concentration in the range from 40% or more to 80% or less, preferably from 45% or more to 75% or less and most preferably from 50% or more to 70% or less.

In particular, the blue phase LC medium preferably comprises one or more compounds of formula I in a total concentration in the range from 40% or more to 80% or less, preferably from 45% or more to 75% or less and most preferably from 50% or more to 70% or less.

In case the blue phase LC medium comprises one or more compounds formula II, the total concentration of these compounds preferably is in the range from 1% or more to 15% or less, preferably from 2% or more to 10% or less and most preferably from 4% or more to 8% or less.

In case the blue phase LC medium comprises one or more compounds formula III, the total concentration of these compounds preferably is in the range from 1% or more to 20% or less, preferably from 2% or more to 15% or less and most preferably from 3% or more to 10% or less.

In case the blue phase LC medium comprises one or more compounds formula IV the total concentration of these compounds preferably is in the range from 1% or more to 15% or less, preferably from 2% or more to 10% or less and, most preferably, from 4% or more to 8% or less.

In case the blue phase LC medium comprises one or more compounds formula V the total concentration of these compounds preferably is in the range from 5% or more to 45% or less, preferably from 15% or more to 40% or less and most preferably from 25% or more to 35% or less.

In case the blue phase LC medium comprises one or more compounds formula VII the total concentration of these compounds preferably is in the range from 1% or more to 15% or less, preferably from 3% or more to 12% or less and most preferably from 5% or more to 10% or less.

Suitable chiral compounds are those, which have an absolute value of the helical twisting power of 20 $\mu m^{-1}$ or more, preferably of 40 $\mu m^{-1}$ or more and most preferably of 60 $\mu m^{-1}$ or more. The HTP is measured in the liquid crystalline medium MLC-6260 at a temperature of 20° C.

A suitable blue phase LC medium in accordance with the present invention has a characteristic temperature, preferably a clearing point, in the range from about −30° C. to about 90° C., especially up to about 70° C. or even 80° C.

A suitable blue phase LC medium in accordance with the present invention preferably contains one or more (two, three, four or more) chiral compounds in the range of 1-25 wt. %, preferably 2-20 wt. %, each. Especially preferred are mixtures containing 3-15 wt.-% total of one or more chiral compounds.

Preferred embodiments are indicated below:

The medium comprises one, two, three, four or more compounds of formula I, preferably of formulae I-1 and I-2, and/or the medium comprises one, two or more compounds of formula II, preferably of formulae II-3 and II-4, more preferably of formulae II-3a, II-3c and II-4d, and/or the medium comprises one or more compounds of formula III preferably of formulae III-1 and III-2, more preferably of formulae III-1 b and III-2a and/or the medium comprises one, two or more compounds of formula IV, and/or the medium comprises one, two, three or more compounds of formula V, and/or the medium comprises one, two, three or more compounds of formula VI, preferably of formula VI-1 and/or the medium comprises one, two, three or more compounds of formula VII, preferably of formula VII-2 and/or the medium comprises one, two, three or more chiral compounds, preferably having a helical twisting power of 20 $\mu m^{-1}$ or more, and/or the medium comprises one, two or more reactive compounds, preferably one two or more reactive mesogenic compounds, preferably of formulae P, preferably of one or more of its sub-formulae, and/or one or more reactive mesogenic compounds selected from the group of formulae M1 to M29, preferably of formulae M16-A and/or M17-A, more preferably of formula M17-A'.

It has been found that even a relatively small proportion of compounds of the formula I mixed with conventional liquid-crystal materials, but in particular with one or more compounds of the formulae II and III, leads to a lower operating voltage and a broader operating temperature range. Preference is given, in particular, to blue phase LC medium, which, besides one or more compounds of the formula I, comprise one or more compounds of the formula III, in particular compounds of the formula III in which $R^{31}$ is n-butyl.

The compounds of the formulae I to VII are colourless, stable, and readily miscible with one another and with other liquid-crystalline materials.

The optimum mixing ratio of the compounds of the formulae I and II and III depends substantially on the desired properties, on the choice of the components of the formulae I, II and/or III, and on the choice of any other components that may be present. Suitable mixing ratios within the range given above can easily be determined from case to case.

The total amount of compounds of the formulae I and II and optionally III in a suitable blue phase LC medium in accordance with the present invention is in many cases not crucial. The mixtures can therefore comprise one or more further components for the purposes of optimisation of various properties. However, the observed effect on the operating voltage and the operating temperature range is generally greater, the higher the total concentration of compounds of the formulae I and II and optionally III.

In a particularly preferred embodiment, a suitable blue phase LC medium in accordance with the present invention comprises one or more compounds each of the formulae I and II and optionally III. A favourable synergistic effect with the compounds of the formula I results in particularly advantageous properties. In particular, mixtures comprising compounds of formula I and of formula II and/or of formula III are distinguished by their low operating voltages.

The individual compounds of the formulae I, II to VII, which can be used in the media according to the invention, either are known or can be prepared analogously to the known compounds.

The polymer stabilized blue phase LC medium in accordance with the present invention is prepared in a manner conventional per se. In general, the components are dissolved in one another, advantageously at elevated temperature. By means of suitable additives, the liquid-crystalline phases in accordance with the invention can be modified in such a way that they can be used in all types of liquid crystal display elements that have been disclosed hitherto. Additives of this type are known to the person skilled in the art and are described in detail in the literature (H. Kelker and R. Hatz, Handbook of Liquid Crystals, Verlag Chemie, Weinheim, 1980). For example, pleochroic dyes can be added for the preparation of coloured guest-host systems or substances can be added in order to modify the dielectric anisotropy, the viscosity, and/or the alignment of the nematic phases. Furthermore, stabilisers and antioxidants can be added.

The polymer stabilized blue phase LC medium of the present invention has a characteristic temperature, preferably a clearing point, in the range from about +30° C. to about 90° C., especially up to about 70° C. to 80° C.

The operating temperature of the lens element is preferably above the characteristic temperature of the polymer stabilized blue phase LC medium said temperature being usually the transition temperature of the controlling medium to the blue phase; generally the operating temperature is in the range of about 0.1° to about 50°, preferably in the range of about 0.1° to about 10° above said characteristic temperature. It is highly preferred that the operating temperature is in the range from the transition temperature of the LC medium to the blue phase up to the transition temperature of the LC medium to the isotropic phase which is the clearing point. The lens elements, however, may also be operated at temperatures at which the LC medium is in the isotropic phase.

For the purposes of the present invention, the term "characteristic temperature" is defined as follows:

- If the characteristic voltage as a function of temperature has a minimum, the temperature at this minimum is denoted as characteristic temperature.
- If the characteristic voltage as a function of temperature has no minimum and if the controlling medium has one or more blue phases, the transition temperature to the blue phase is denoted as characteristic temperature; in case there is more than one blue phase, the lowest transition temperature to a blue phase is denoted as characteristic temperature.
- If the characteristic voltage as a function of temperature has no minimum, and if the controlling medium has no blue phase, the transition temperature to the isotropic phase is denoted as characteristic temperature.

The dielectrics may also comprise further additives known to the person skilled in the art and described in the literature. For example, 0 to 5% of pleochroic dyes, antioxidants, or stabilizers can be added.

C denotes a crystalline phase, S a smectic phase, $S_C$ a smectic C phase, N a nematic phase, I the isotropic phase and BP the blue phase.

$V_X$ denotes the voltage for X % transmission. Thus, e.g., $V_{10}$ denotes the voltage for 10% transmission and $V_{100}$ denotes the voltage for 100% transmission (viewing angle perpendicular to the plate surface). $t_{on}$ (respectively $\tau_{on}$) denotes the switch-on time and $t_{off}$ (respectively $\tau_{off}$) the switch-off time at an operating voltage corresponding the value of $V_{100}$, respectively of $V_{max}$, $t_{on}$ is the time for the change of the relative transmission from 10% to 90% and $t_{off}$ is the time for the change of the relative transmission from 90% to 10%. The response times are determined with the measurement instrument DMS from Autronic Melchers, Germany, just as the electro-optical characteristics.

Δn denotes the optical anisotropy. Δ∈ denotes the dielectric anisotropy ($\Delta\in=\in_{\|}-\in_{\perp}$, where $\in_{\|}$ denotes the dielectric constant parallel to the longitudinal molecular axes and $\in_{\|}$ denotes the dielectric constant perpendicular thereto). The electro-optical data are measured in a TN cell at the $1^{St}$ minimum of transmission (i.e. at a (d·Δn) value of 0.5 μm) at 20° C., unless expressly stated otherwise. The optical data are measured at 20° C., unless expressly stated otherwise.

Optionally, a suitable blue phase LC medium in accordance with the present invention can comprise further liquid crystal compounds in order to adjust the physical properties. Such compounds are known to the expert. Their concentration in the media according to the instant invention is preferably 0% to 30%, more preferably 0% to 20%, and most preferably 5% to 15%.

Preferably, a suitable blue phase LC medium in accordance with the present invention has a range of the blue phase or, in case of the occurrence of more than one blue phase, a combined range of the blue phases, with a width of 20° or more, preferably of 40° or more, more preferably of 50° or more and most preferably of 60° or more.

In a preferred embodiment this phase range at least from 10° C. to 30° C., most preferably at least from 10° C. to 40° C. and most preferably at least from 0° C. to 50° C., wherein at least means, that preferably the phase extends to temperatures below the lower limit and at the same time, that it extends to temperatures above the upper limit.

In another preferred embodiment this phase range at least from 20° C. to 40° C., most preferably at least from 30° C. to 80° C. and most preferably at least from 30° C. to 90° C. This embodiment is particularly suited for displays with a strong backlight, dissipating energy and thus heating the display.

Preferably a suitable polymer stabilized blue phase LC medium in accordance with the present invention has a dielectric anisotropy of 150 or more, more preferably of 200 or more, even more preferably of 300 or more and most preferably of 400 or more. In particular, the value of dielectric anisotropy of the inventive media is preferably 700 or less, more preferably 550 or less and, most preferably 500 or less.

In the present application the term dielectrically positive compounds describes compounds with Δ∈>1.5, dielectrically neutral compounds are compounds with −1.5≤Δ∈≤1.5 and dielectrically negative compounds are compounds with Δ∈<−1.5. The same holds for components. Δ∈ is determined at 1 kHz and 20° C. The dielectric anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%.

Components having a nematic phase at the measurement temperature of 20° C. are measured as such, all others are treated like compounds.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm. The dielectric anisotropy (Δ∈) is determined at a frequency of 1 kHz. The threshold voltages, as well as all other electro-optical properties have been determined with test cells prepared at Merck KGaA, Germany. The test cells for the determination of Δ∈ had a cell gap of 22 μm. The electrode was a circular ITO electrode with an area of 1.13 $cm^2$ and a guard ring. The orientation layers were lecithin for homeotropic orientation ($\in_{\|}$) and polyimide AL-1054 from Japan Synthetic Rubber for homogenous orientation ($\in_{\perp}$). The capacities were determined with a frequency response analyser Solatron 1260 using a sine wave with a voltage of 0.3 or 0.1 $V_{rms}$. The light used in the electro-optical measurements was white light. The set up used was a commercially available equipment of Otsuka, Japan. The characteristic voltages have been determined under perpendicular observation. The threshold voltage ($V_{10}$), mid-grey voltage ($V_{50}$) and saturation voltage ($V_{90}$) have been determined for 10%, 50% and 90% relative contrast, respectively.

The mesogenic modulation material has been filled into an electro optical test cell prepared at the respective facility of Merck KGaA. The test cells had inter-digital electrodes on one substrate side. The electrode width was 10 μm, the distance between adjacent electrodes was 10 μm and the cell gap was also 10 μm. This test cell has been evaluated electro-optically between crossed polarisers.

At low temperatures, the filled cells showed the typical texture of a chiral nematic mixture, with an optical transmission between crossed polarisers without applied voltage. Upon heating, at a first temperature ($T_1$) the mixtures turned optically isotropic, being dark between the crossed polarisers. This indicated the transition from the chiral nematic phase to the blue phase at that temperature. Up to a second temperature ($T_2$) the cell showed an electro-optical effect under applied voltage, typically of some tens of volts, a certain voltage in that range leading to a maximum of the optical transmission. Typically at a higher temperature the voltage needed for a visible electro-optical effect increased strongly, indicating the transition from the blue phase to the isotropic phase at this second temperature ($T_2$).

The temperature range (ΔT(BP)), where the mixture can be used electro-optically in the blue phase most beneficially has been identified as ranging from $T_1$ to $T_2$. This temperature range (ΔT(BP)) is the temperature range given in the examples of this application. The electro-optical displays can also be operated at temperatures beyond this range, i.e. at temperatures above $T_2$, albeit only at significantly increased operation voltages.

The liquid crystal media can contain further additives and chiral dopants in usual concentrations. The total concentration of these further constituents is in the range of 0% to 10%, preferably 0.1% to 6%, based in the total mixture. The concentrations of the individual compounds used each are preferably in the range of 0.1 to 3%. The concentration of these and of similar additives is not taken into consideration for the values and ranges of the concentrations of the liquid crystal components and compounds of the liquid crystal media in this application.

The polymer stabilized blue phase LC medium according to the present invention consist of several compounds, preferably of 3 to 30, more preferably of 5 to 20 and most preferably of 6 to 14 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so-called pre-mixtures, which can be e.g. homologous or eutectic mixtures of compounds or using so-called multi-bottle-systems, the constituents of which are ready to use mixtures themselves.

The melting point: T(K,N), T(K,S) or T(K,I), respectively, the transition temperature from one smectic phase ($S_x$) to another smectic phase ($S_y$): T($S_x$,$S_y$), the transition temperature from the smectic (S) to the nematic (N) phase: T(S,N), the clearing point: T (N,I), and the glass transition temperature: $T_g$ of the liquid crystals, as applicable, as well as any other temperature throughout this application, are given in degrees centi-grade (i.e. Celsius).

The compounds of the formula P and the sub-formulae thereof can be prepared analogously to the process known to the person skilled in the art and described in standard works of organic chemistry, such as, for example, in Houben-Weyl, Methoden der organischen Chemie [Methods of Organic Chemistry], Thieme-Verlag, Stuttgart.

Particularly suitable and preferred processes for the preparation of compounds of the formula P and the sub-formulae thereof are shown by way of example in the following schemes and preferably comprise one or more of the steps described below.

The person skilled in the art will be able to modify the synthesis in a suitable manner and thus obtain further compounds according to the invention. The particularly preferred compounds containing an alkoxy spacer or acrylates bonded directly to the ring are obtained, for example, by reaction of phenol derivatives, such as, for example, compound 12, with the dithianylium salts 13. The compounds 14 formed initially here are converted into the compounds 15. The hydroxyl group can subsequently be functionalised in a suitable manner, for example by esterification using methacrylic acid (cf. Scheme 1).

The compounds of formula P wherein the rings are linked by an —$CF_2$—O— group and the reactive groups are attached to the rings via an alkylene spacer group, which are used according to the present invention in a particularly preferred embodiment, can be prepared according to the following scheme.

Scheme 1: Exemplary synthesis of compounds of formula P with spacers linked by C-C-single bonds

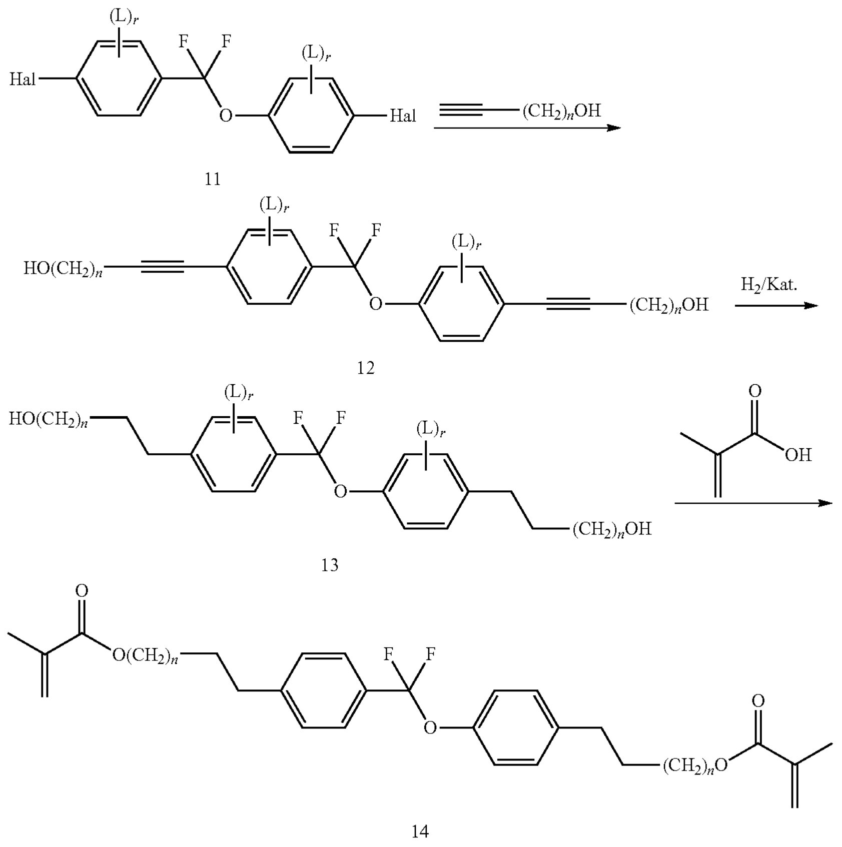

The general methods for the preparation of the lens element according to this invention are known to the ordinary expert and can be performed, for example, by a method of production comprising the steps of filling a LC blue phase medium into a suitable inverse lens structure or replica structure, covering the inverse lens structure with a suitable substrate comprising a suitable transparent electrode structure, and optionally, polymerization of the polymerizable compounds of the LC blue phase medium.

The lens element according to the present invention can be used in a wide variety of electro optical devices such as cameras, displays, microscopes, etc.

The polymer stabilized blue phase LC medium can be switched between its isotropic state i.e. for the 2D mode of an autostereoscopic display and its birefringent state i.e. for the 3D mode of an autostereoscopic display. In the isotropic state, the refractive index of the polymer stabilized blue phase LC medium preferably matches the refractive index of the isotropic material of the replica structure.

Accordingly, in a preferred embodiment, the lens element is used in an autostereoscopic display device. Such device according to the present invention comprises a display panel on top of which is provided a lens arrangement comprising switchable lens elements.

A suitable display panel according to the present invention is a liquid crystal (LCD), a plasma (PDP), an organic light emitting diode (OLED) or cathode ray tube (CRT) display panel, preferably a liquid crystal display. However, it will be apparent to those skilled in the art that alternative types of display panels may also be employed.

The display panel has an array of display pixels for producing a display image and the display pixels are arranged in rows and columns. In a preferred embodiment, the preferred display pixel pitch is in the range 50 μm to 1000 μm.

In a preferred embodiment of the present invention, a transparent coupling film is laminated between the front side of the display panel and said lens arrangement, which substantially couples the incident light of the display panel at an oblique angle to the lens arrangement. Preferably, this transparent coupling film has a prismatic grid structure.

However, in the preferred embodiment, a plane transparent spacer sheet is laminated between the front side of the display panel and said lens arrangement.

The lens arrangement enables an autostereoscopic image to be viewed. Therefore, each lens arrangement overlies a small group of display pixels in each row or column or at least one display pixel. The lens arrangement projects each display pixel or a group of display pixels in a different direction, to form the several different views. As the user's head moves from left to right, his/her eyes will receive different ones of the several views, in turn.

In a preferred embodiment of the present invention, the lens arrangement in is a lenticular screen plate. A lenticular screen plate is defined by a one-dimensional periodic arrangement of a plurality of lens elements, preferably a row of lens elements extending parallel to one another. In this connection, the lenticular screen plate according to the present invention can be a cylindrical lens grid disc, elliptical lens grid disc or prismatic lens grid disc, preferably a cylindrical lens grid disc.

In another embodiment, it is also possible to switch different regions or single pixels of the display to 2D and 3D modes. This of course requires segmented electrodes for driving the switchable lens arrangement. Therefore, the lens arrangement can also be an arrangement of isolated switchable lens elements arranged in a matrix wherein each lens element allows directing the output from each corresponding pixel or group of pixels to different spatial positions.

In the preferred embodiment, the lens arrangement is a lenticular screen plate.

The preferred electrode structure in the lens element used for an autostereoscopic display device depends on the angle of the incident light provided by the display panel with regards to the main plane of the lens element.

If the incident light is provided at an angle which is perpendicular to the main plane of the lens element, the inventive lens element preferably utilizes in-plane switching (IPS) electrodes on the transparent substrate of the lens element, in which the electric field is mainly in lateral direction and the Kerr effect-induced birefringence is along the electric field if the employed polymer stabilized blue phase LC medium has a positive dielectric anisotropy and if the incident light is provided at an angle which is perpendicular to the transparent cover sheet of the lens element.

However, if the incident light is provided at an oblique angle to the lens element by using a transparent prismatic coupling film between the display panel and the lens arrangement as described above, the inventive lens element preferably utilizes opposed vertical field switching (VFS) electrodes, one provided on the transparent substrate and the other on the inner side of the inverse lens structure formed by the isotropic material of the replica structure. The electric field in the VFS lens structure is in longitudinal direction and the Kerr effect-induced birefringence is along the electric field if the employed polymer stabilized blue phase LC medium has a positive dielectric anisotropy.

Most preferably, the lens element according to the present invention utilizes transparent in-plane switching electrodes.

The display device comprises also a corresponding controller, which is adapted to switch each switchable lens elements in the corresponding lens arrangement.

The term "liquid crystal (LC)" relates to materials having liquid crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid crystalline phase (or mesophase) behaviour.

The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxyl, etc., or polymerisable groups.

The term "reactive mesogen" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive or non-polymerisable" compounds.

The term "chiral" in general is used to describe an object that is non-super imposable on its mirror image. "Achiral" (non-chiral) objects are objects that are identical to their mirror image.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l-1}$ or $C_nH_{2n-1}$, $C_mH_{2m-1}$ and $C_lH_{2l-1}$ denote straight-chain alkyl or alkenyl, preferably 1E-alkenyl, each having n, m and I C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| C | 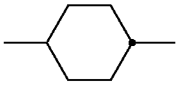 |
| P | 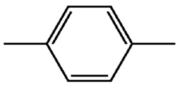 |
| D | 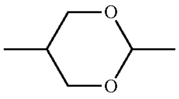 |
| DI | 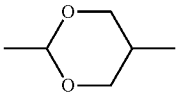 |

TABLE A-continued
| Ring elements | |
|---|---|
| A | 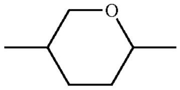 |
| AI | 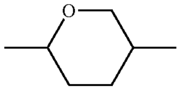 |
| G | 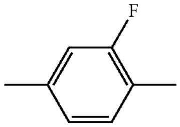 |
| GI | 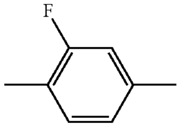 |
| U | 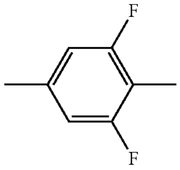 |
| UI | 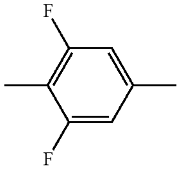 |
| Y | 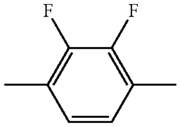 |
| M | 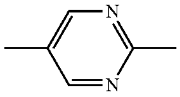 |
| MI | 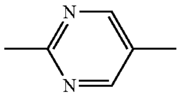 |
| N | 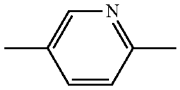 |
| NI | 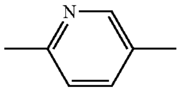 |
| Np | 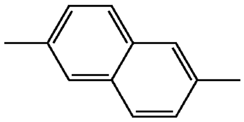 |
TABLE A-continued
| Ring elements | |
|---|---|
| dH | 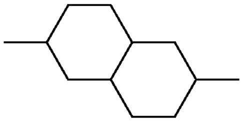 |
| N3f | 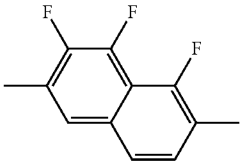 |
| N3fl | 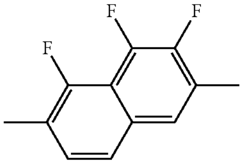 |
| tH | 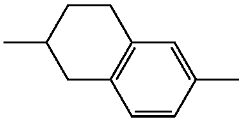 |
| tHI | 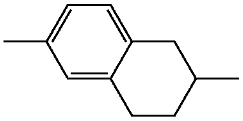 |
| tH2f | 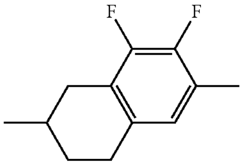 |
| tH2fl | 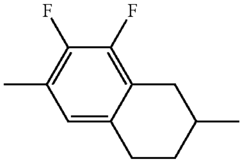 |
| K | 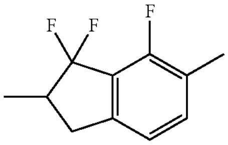 |

TABLE A-continued

| Ring elements | |
|---|---|
| KI | 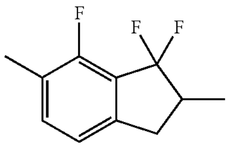 |
| L | 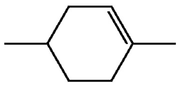 |
| LI | 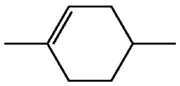 |
| F | 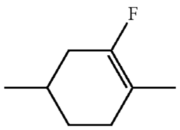 |
| FI | 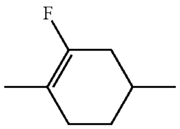 |

TABLE B

| Linking groups | | | |
|---|---|---|---|
| E | $—CH_2CH_2—$ | Z | —CO—O— |
| V | —CH═CH— | ZI | —O—CO— |
| X | —CF═CH— | O | $—CH_2—O—$ |
| XI | —CH═CF— | OI | $—O—CH_2—$ |
| B | —CF═CF— | Q | $—CF_2—O—$ |
| T | —C≡C— | QI | $—O—CF_2—$ |
| W | $—CF_2CF_2—$ | T | —C≡C— |

TABLE C

| End groups | | | |
|---|---|---|---|
| Left-hand side | | Right-hand side | |
| Use alone | | | |
| -n- | $C_nH_{2n+1}—$ | -n | $—C_nH_{2n+1}$ |
| -nO- | $C_nH_{2n+1}—O—$ | -nO | $—O—C_nH_{2n+1}$ |
| -V- | $CH_2═CH—$ | -V | $—CH═CH_2$ |
| -nV- | $C_nH_{2n+1}—CH═CH—$ | -nV | $—C_nH_{2n}—CH═CH_2$ |
| -Vn- | $CH_2═CH—C_nH_{2n+1}—$ | -Vn | $—CH═CH—C_nH_{2n+1}$ |
| -nVm- | $C_nH_{2n+1}—CH═CH—C_mH_{2m}—$ | -nVm | $—C_nH_{2n}—CH═CH—C_mH_{2m+1}$ |
| -N- | N≡C— | -N | —C≡N |
| -S- | S═C═N— | -S | —N═C═S |
| -F- | F— | -F | —F |
| -CL- | Cl— | -CL | —Cl |
| -M- | $CFH_2—$ | -M | $—CFH_2$ |
| -D- | $CF_2H—$ | -D | $—CF_2H$ |
| -T- | $CF_3—$ | -T | $—CF_3$ |
| -MO- | $CFH_2O—$ | -OM | $—OCFH_2$ |
| -DO- | $CF_2HO—$ | -OD | $—OCF_2H$ |
| -TO- | $CF_3O—$ | -OT | $—OCF_3$ |
| -OXF- | $CF_2═CH—O—$ | -OXF | $—O—CH═CF_2$ |
| -A- | H—C≡C— | -A | —C≡C—H |
| -nA- | $C_nH_{2n+1}—C≡C—$ | -An | $—C≡C—C_nH_{2n+1}$ |
| -NA- | N≡C—C≡C— | -AN | —C≡C—C≡N |
| Use together with one another and/or with others | | | |
| -...A...- | —C≡C— | -...A... | —C≡C— |
| -...V...- | CH═CH— | -...V... | —CH═CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF═CF— | -...W... | —CF═CF— |

in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds, which are preferably used.

TABLE D

| Illustrative structures |
|---|

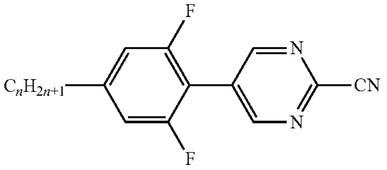

UM-n-N

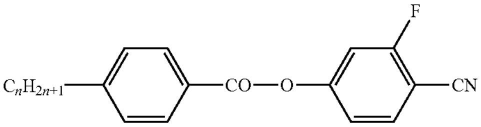

PZG-n-N

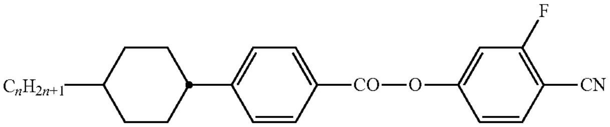

CPZG-n-N

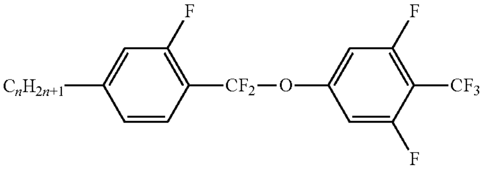

GQU-n-T

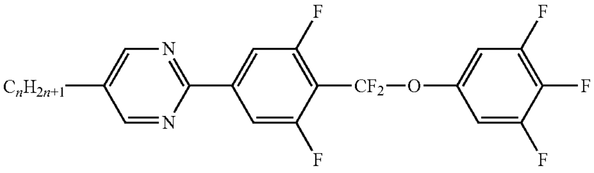

MGQU-n-F

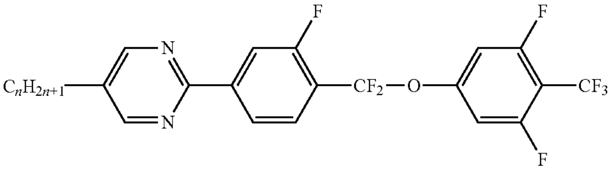

MGQU-n-T

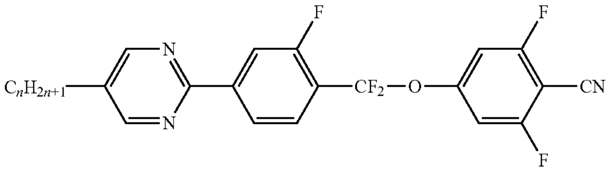

MGQU-n-N

TABLE D-continued
| Illustrative structures |
| --- |
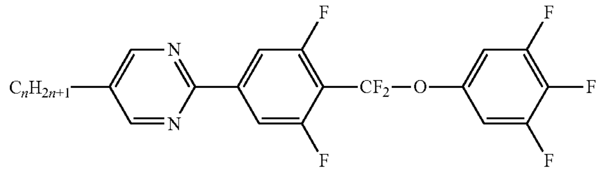
MUQU-n-F
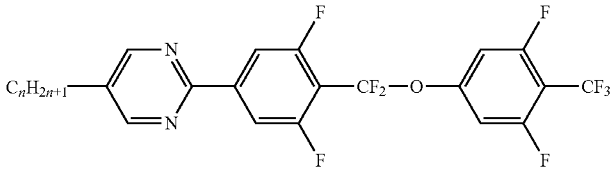
MUQU-n-T
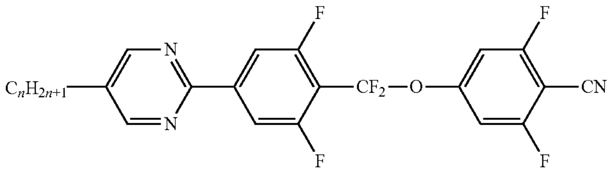
MUQU-n-N
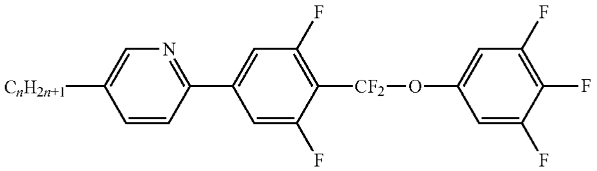
NGQU-n-F
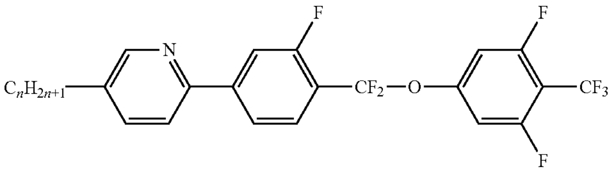
NGQU-n-T
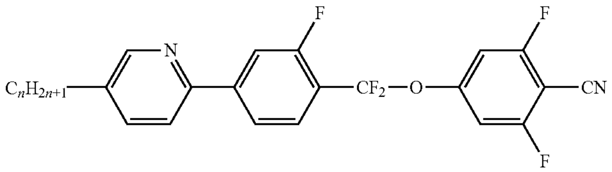
NGQU-n-N
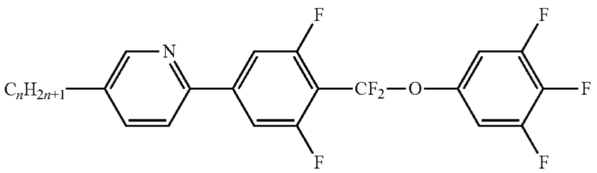
NUQU-n-F TABLE D-continued
Illustrative structures
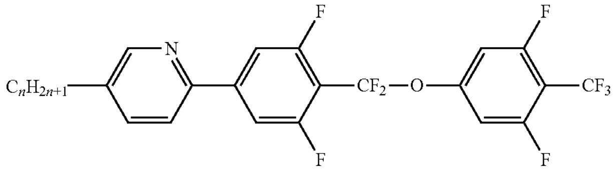
NUQU-n-T
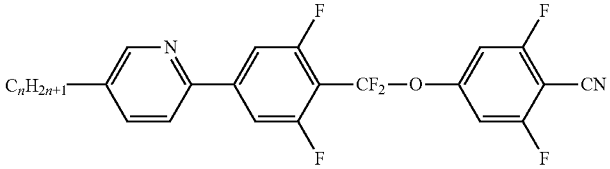
NUQU-n-N
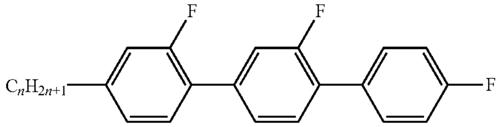
GGP-n-F
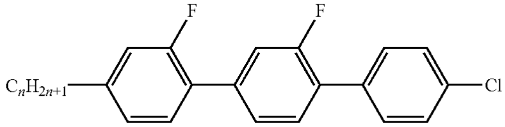
GGP-n-CL
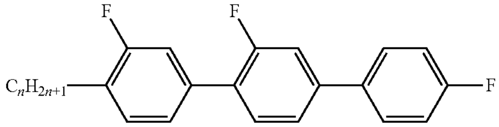
PGIGI-n-F
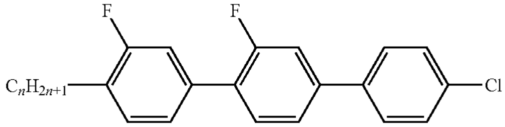
PGIGI-n-CL
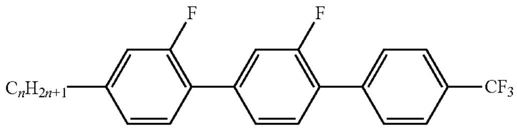
GGP-n-T
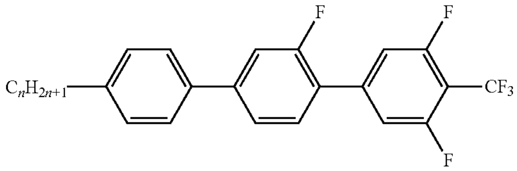
PGU-n-T TABLE D-continued
| Illustrative structures |
| --- |
| 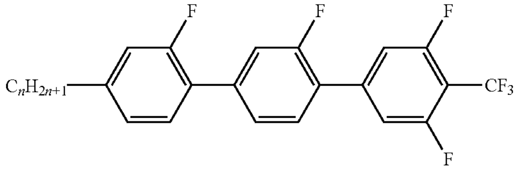 GGU-n-T |
| 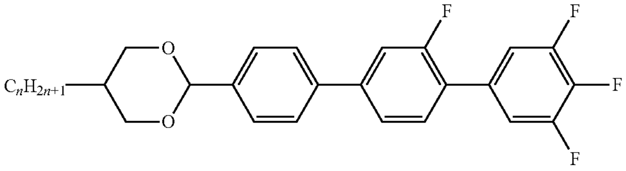 DPGU-n-F |
| 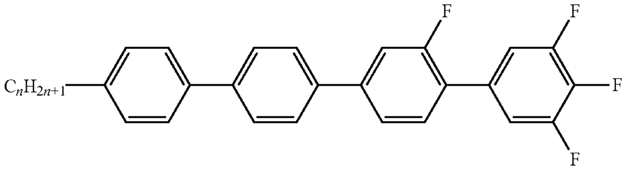 PPGU-n-F |
| 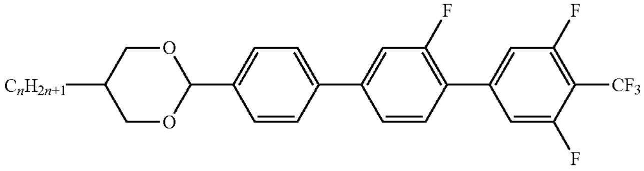 DPGU-n-T |
| 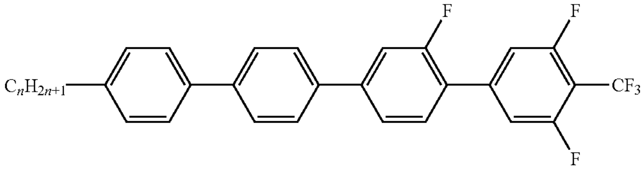 PPGU-n-T |
| 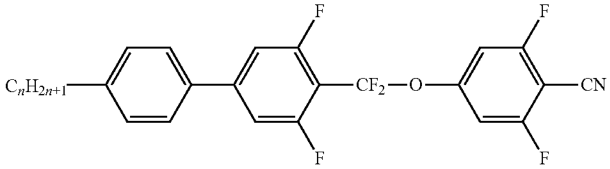 PUQU-n-N |
| 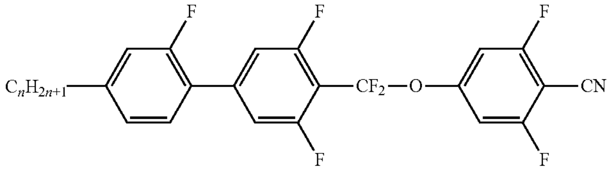 GUQU-n-N |

TABLE D-continued
| Illustrative structures |
|---|
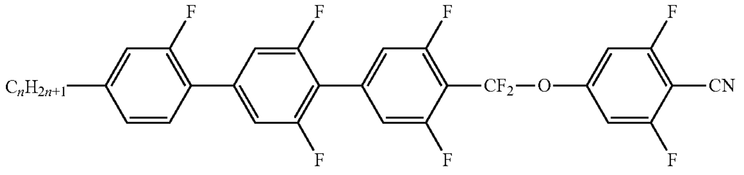
GUUQU-n-N
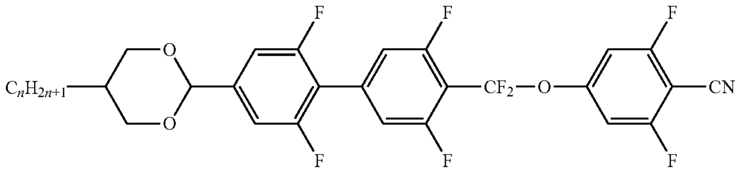
GUUQU-n-N
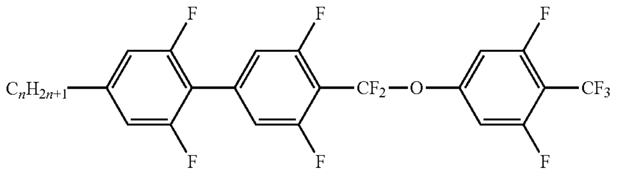
GUQU-n-F
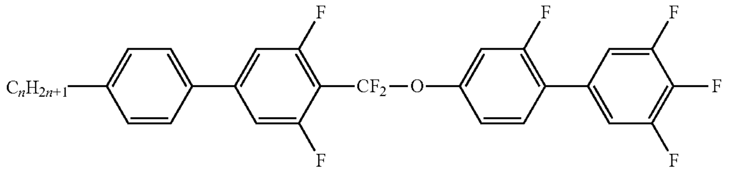
PUQGU-n-F
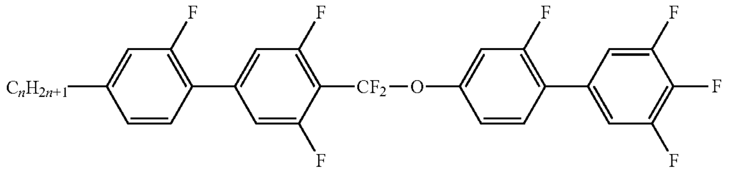
GUQGU-n-F
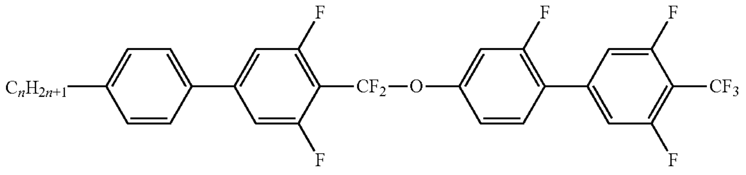
PUQGU-n-T
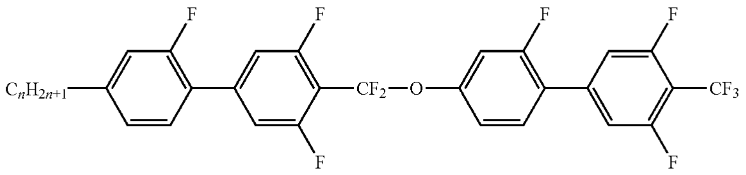
GUQGU-n-T TABLE D-continued
Illustrative structures
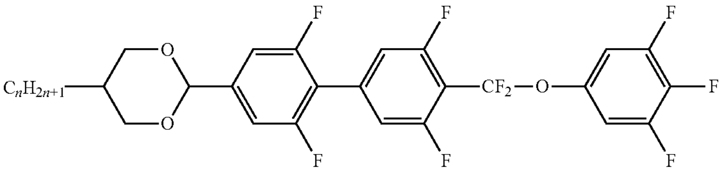
DUUQU-n-F
in which n (m and l) preferably, independently of one another, denote(s) an integer from 1 to 7, preferably from 2 to 6.
The following table, Table E, shows illustrative compounds that can be used as stabiliser in the mesogenic media according to the present invention.
TABLE E
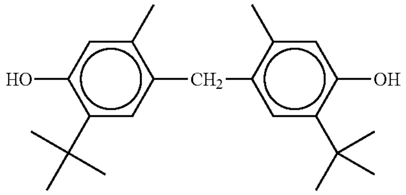
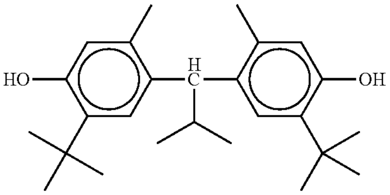
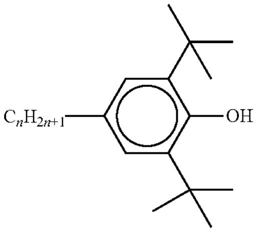
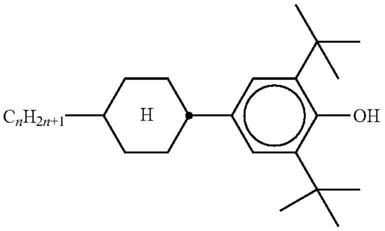
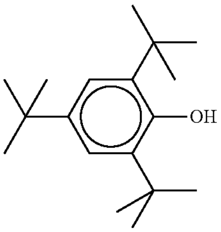
TABLE E-continued
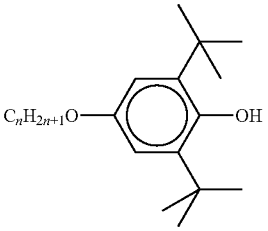
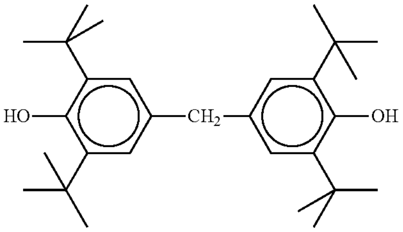
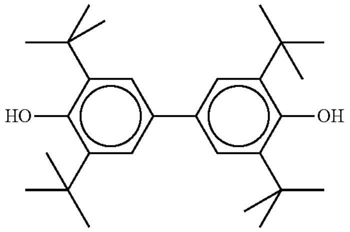
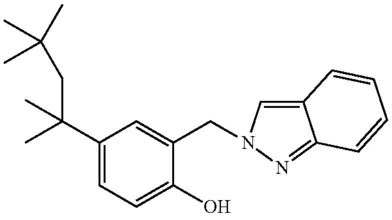 [SMILES: CC(C)(C)CC(C)(C)c1ccc(O)c(Cn2cc3ccccc3n2)c1]
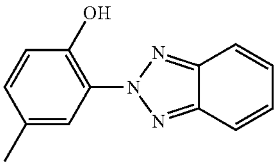 [SMILES: Cc1ccc(O)c(-n2nc3ccccc3n2)c1]

TABLE E-continued
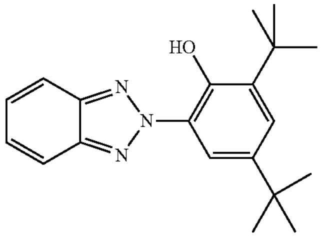 [SMILES: CC(C)(C)c1cc(-n2nc3ccccc3n2)c(O)c(C(C)(C)C)c1]
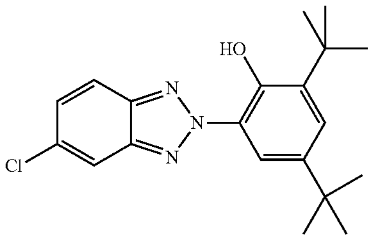 [SMILES: CC(C)(C)c1cc(-n2nc3ccc(Cl)cc3n2)c(O)c(C(C)(C)C)c1]
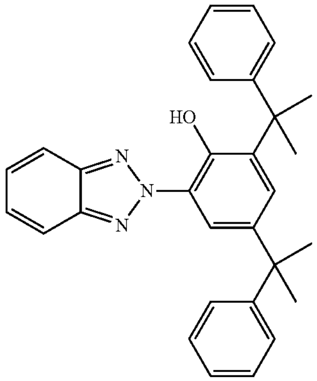 [SMILES: CC(C)(c1ccccc1)c1cc(-n2nc3ccccc3n2)c(O)c(C(C)(C)c2ccccc2)c1]
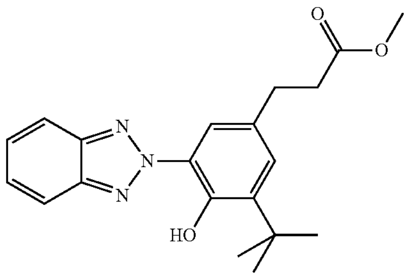 [SMILES: COC(=O)CCc1cc(-n2nc3ccccc3n2)c(O)c(C(C)(C)C)c1]
TABLE E-continued
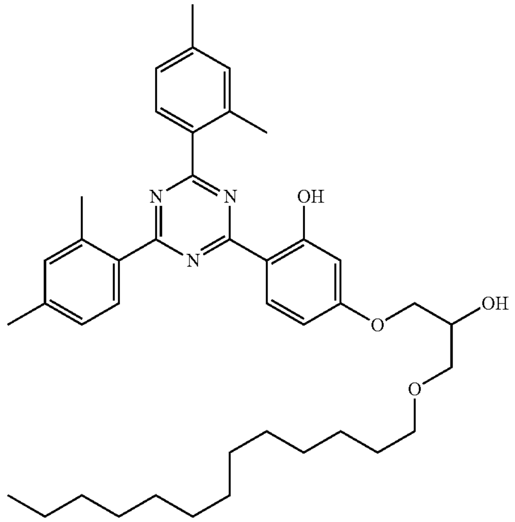 [SMILES: CCCCCCCCCCCCCOCC(O)COc1ccc(-c2nc(-c3ccc(C)cc3C)nc(-c3ccc(C)cc3C)n2)c(O)c1]
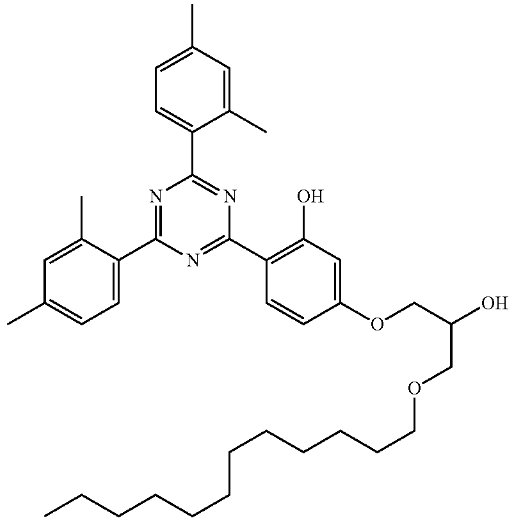 [SMILES: CCCCCCCCCCCCOCC(O)COc1ccc(-c2nc(-c3ccc(C)cc3C)nc(-c3ccc(C)cc3C)n2)c(O)c1]
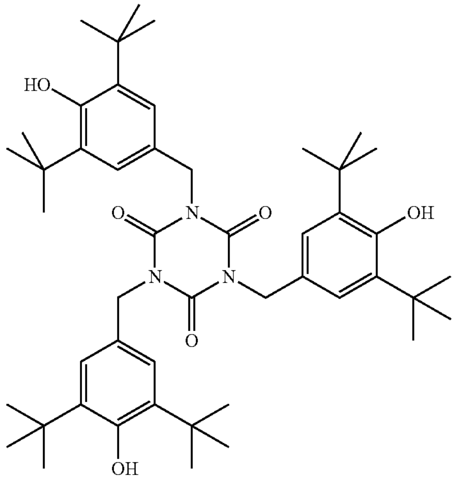 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE E-continued

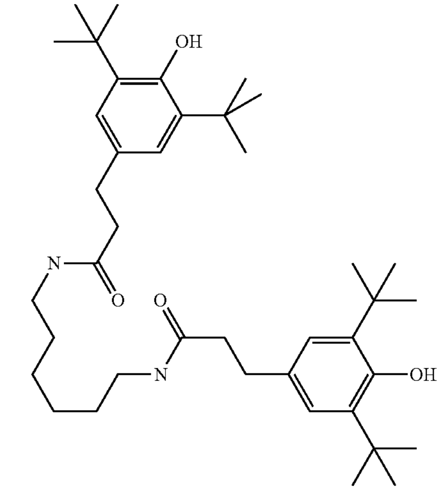 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

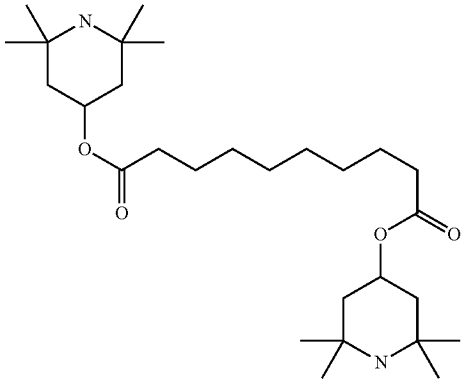

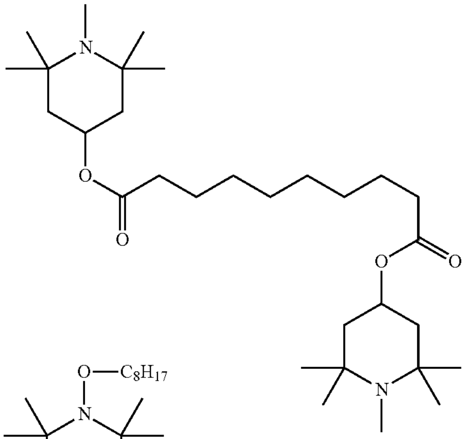

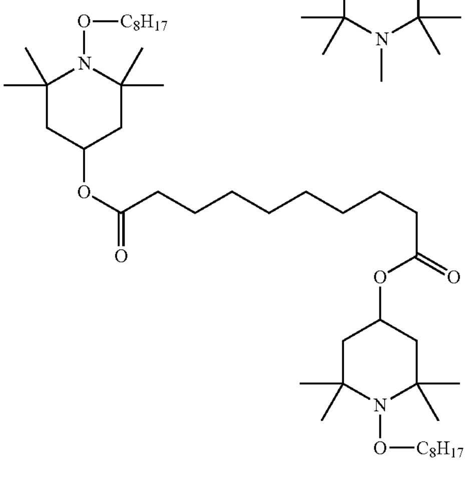

TABLE E-continued

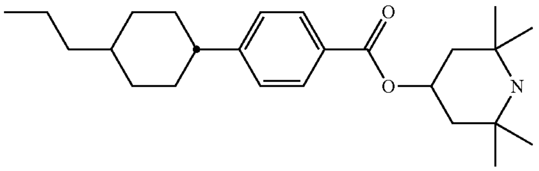

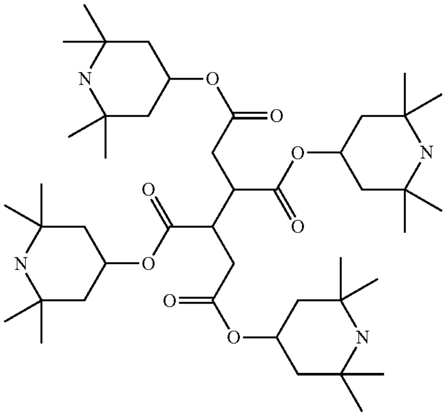

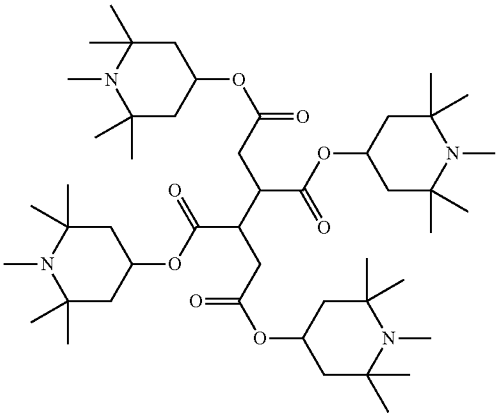

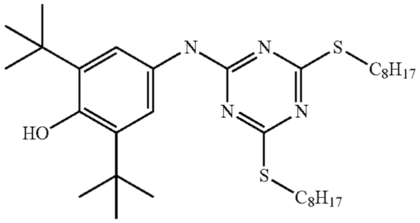

In a preferred embodiment of the present invention, the blue phase LC medium comprises one or more compounds selected from the group of the compounds from Table E.

The following table, Table F, shows illustrative compounds that can preferably be used as chiral dopants in the mesogenic media according to the present invention.

TABLE F
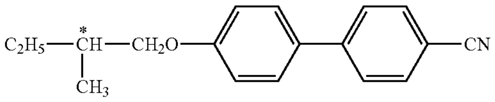
C 15
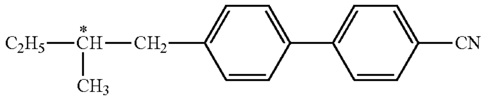
CB 15
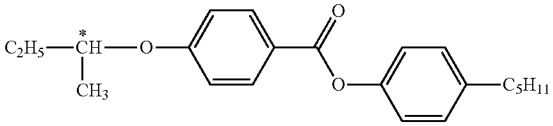
CM 21
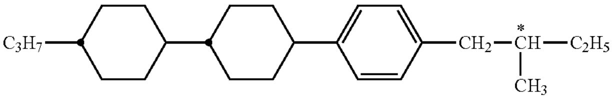
CM 44
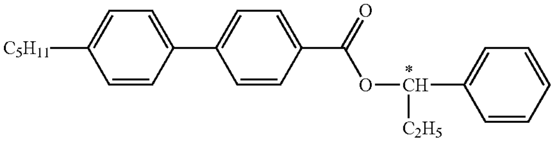
CM 45
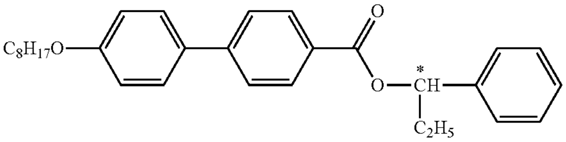
CM 47
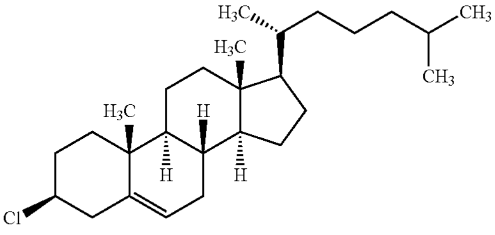
CC
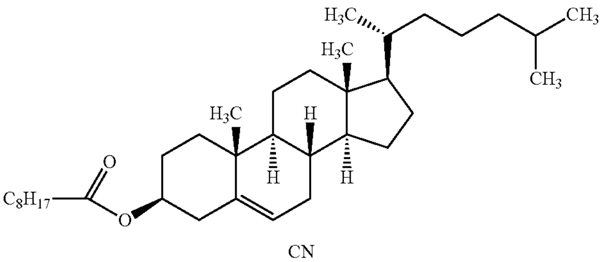
CN TABLE F-continued

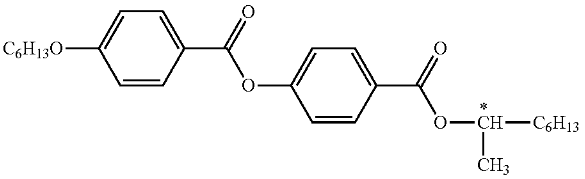

R/S-811

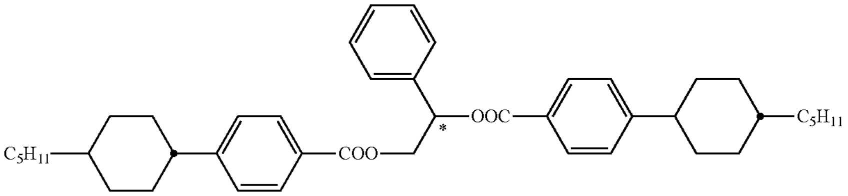

R/S-1011

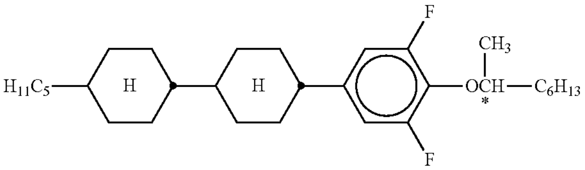

R/S-2011

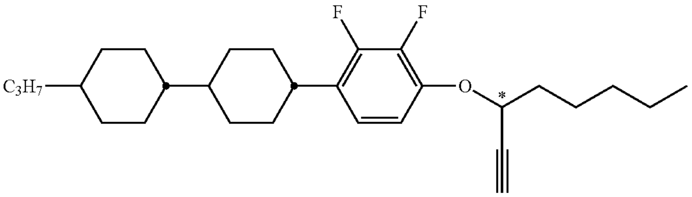

R/S-3011

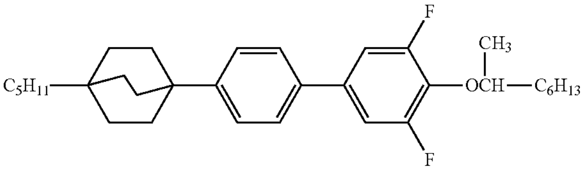

R/S-4011

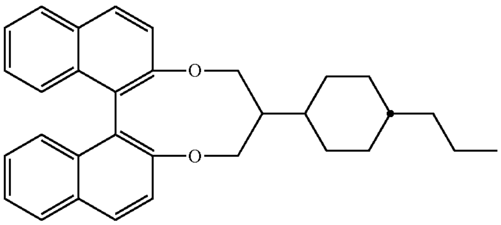

R/S-5011

In a preferred embodiment of the present invention, the blue phase LC medium comprises one or more compounds selected from the group of the compounds from Table F.

The media according to the present application preferably comprise two or more, preferably four or more, compounds selected from the group consisting of the compounds from the above tables.

It will be clear that there are various examples of switchable 2D/3D autostereoscopic display device that can take advantage of blue phase LC media to provide the switching function, and the invention is not limited to the main example described in detail.

The manufacture and materials used to fabricate an autostereoscopic display device according to the present invention have not been described in detail so far, as these will be conventional and well known to those skilled in the art.

EXAMPLES

The examples below illustrate the present invention without limiting it in any way.

However, the physical properties show the person skilled in the art what properties can be achieved and in what ranges they can be modified. In particular, the combination of the various properties that can preferably be achieved is thus well defined for the person skilled in the art.

Liquid-crystal mixtures having the composition and properties as indicated in the following tables are prepared and investigated.

The so-called "HTP" denotes the helical twisting power of an optically active or chiral substance in an LC medium (in $\mu m^{-1}$). Unless indicated otherwise, the HTP is measured in the commercially available nematic LC host mixture MLD-6260 (Merck KGaA) at a temperature of 20° C.

Synthesis Example 1

6-(4-{[4-(6-Acryloyloxyhexyl)phenoxy]-difluoromethyl}-3,5-difluorophenyl)hexyl acrylate 1.1: 5-Bromo-2-[(4-bromophenoxy)difluoromethyl]-1,3-difluorobenzene

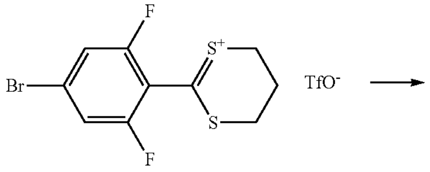

-continued

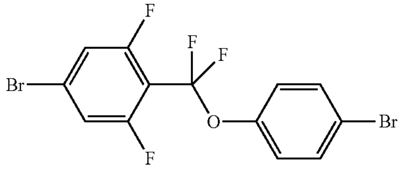

92.0 g (0.200 mol) of 2-(4-bromo-2,6-difluorophenyl)-5,6-dihydro-4H-1,3-dithiyn-1-ylium triflate are initially introduced in 600 ml of dichloromethane, and a solution of 52.0 g (0.300 mol) of 4-bromophenol in 200 ml of dichloromethane and 45 ml of triethylamine is added at −70° C. When the addition is complete, the mixture is stirred at −70° C. for a further 1 h, 160 ml (1.00 mol) of triethylamine trishydrofluoride are added, and a solution of 51.0 ml (0.996 mol) of bromine in 200 ml of dichloromethane is subsequently added drop wise. After 1 h, the cooling is removed, and, after warming to −10° C., the batch is added to a solution of 310 ml of 32 per cent sodium hydroxide solution in 2 l of ice-water. The org. phase is separated off and washed with water. The aqueous phase is extracted with dichloromethane, and the combined org. phases are dried over sodium sulfate. The solvent is removed in vacuum, and the residue is filtered through silica gel with heptane, giving 5-bromo-2-[(4-bromophenoxy)-difluoromethyl]-1,3-difluorobenzene as a yellow oil. $^{19}$F-NMR ($CDCl_3$, 235 MHz)

δ=−63.1 ppm (t, J=26.7 Hz, 2F, —$CF_2O$—), −112 (dt, J=9.7 Hz, J=26.7 Hz, 2F, Ar—F).

1.2: 6-(4-{Difluoro[4-(6-hydroxyhex-1-ynyl)phenoxy]methyl}-3,5-difluorophenyl)hex-5-yn-1-ol

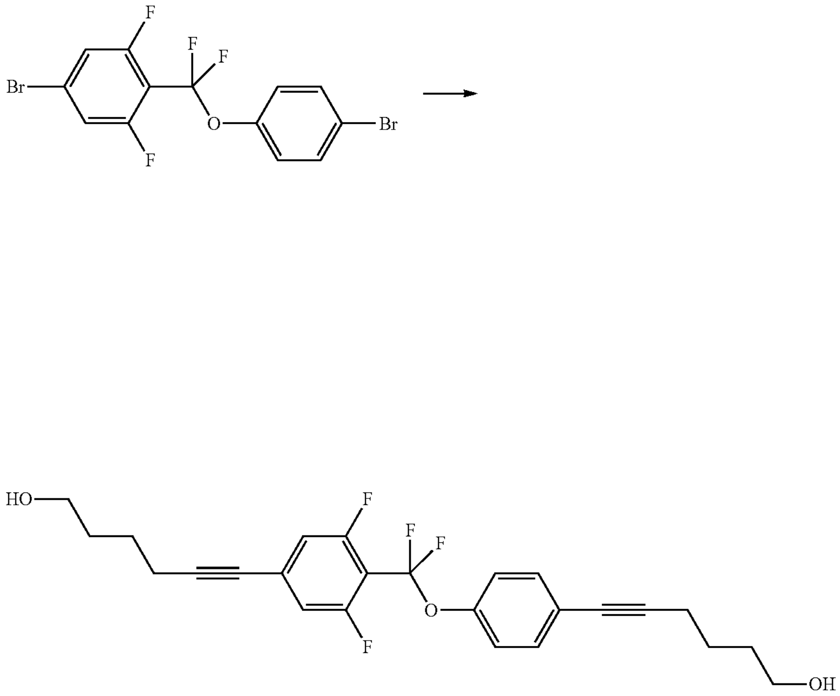

10.7 g (25.8 mmol) of 5-bromo-2-[(4-bromophenoxy)difluoromethyl]-1,3-difluorobenzene and 8.00 g (81.5 mmol) of hex-5-yn-1-ol are initially introduced in 11.3 ml of triethylamine and 500 ml of toluene, 1.50 g (2 mmol) of bis(triphenylphosphine)palladium(II) chloride and 0.700 g (3.68 mmol) of copper(I) iodide are added, and the mixture is heated under reflux overnight. The batch is subsequently added to water, neutralised using 2 N hydrochloric acid and extracted three times with toluene. The combined org. phases are dried over sodium sulfate, the solvent is removed in vacuum, and the residue is chromatographed on silica gel firstly with toluene and then with toluene/ethyl acetate (4:1), giving 6-(4-{difluoro[4-(6-hydroxyhex-1-ynyl)phenoxy]methyl}-3,5-difluorophenyl)hex-5-yn-1-ol as a colourless solid.

1.3: 6-(4-{Difluoro[4-(6-hydroxyhexyl)phenoxy]methyl}-3,5-difluorophenyl)hexan-1-ol

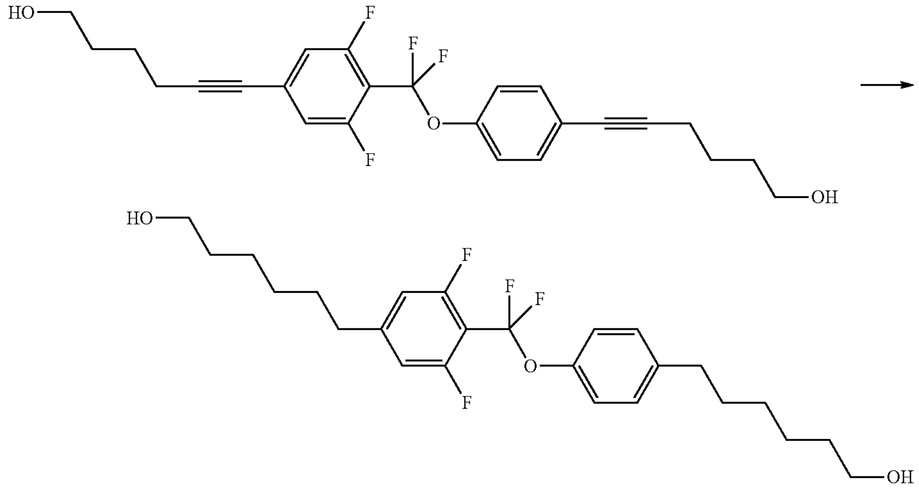

6-(4-{Difluoro[4-(6-hydroxyhex-1-ynyl)phenoxy]methyl}-3,5-difluorophenyl)-hex-5-yn-1-ol is hydrogenated to completion on palladium/active carbon catalyst in THF. The catalyst is filtered off, the solvent is removed in vacuum, and the crude product is chromatographed on silica gel with toluene/ethyl acetate (1:2), giving 6-(4-{difluoro[4-(6-hydroxyhexyl)phenoxy]methyl}-3,5-difluorophenyl)hexan-1-ol as a colourless solid.

$^{19}$F-NMR ($CDCl_3$, 235 MHz)

δ=−60.8 ppm (t, J=26.3 Hz, 2F, —$CF_2O$—), −112 (dt, J=10.0 Hz,

J=26.3 Hz, 2F, Ar—F).

1.4: 6-(4-{[4-(6-Acryloyloxyhexyl)phenoxyl]difluoromethyl}-3,5-difluorophenyl)hexyl acrylate

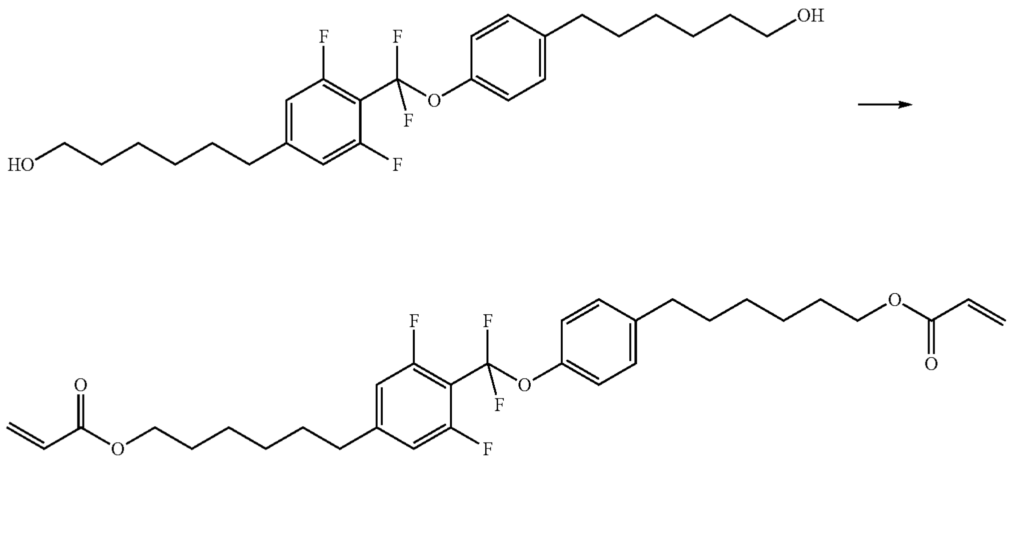

17.0 g (37.2 mmol) of 6-(4-{difluoro[4-(6-hydroxyhexyl)phenoxy]methyl}-3,5-difluorophenyl)hexan-1-ol, 8.05 g (112 mmol) of acrylic acid and 0.5 g of DMAP are initially introduced in 300 ml of dichloromethane, and a solution of 17.3 g (112 mmol) of EDC in 75 ml of dichloromethane is added drop wise with ice cooling. After 1 h, the cooling is removed, and the batch is left to stir overnight at room temperature. The vast majority of the solvent is removed in vacuum, and the residue is chromatographed on silica gel with dichloromethane, giving 6-(4-{[4-(6-acryloyloxyhexyl)phenoxy]difluoromethyl}-3,5-difluorophenyl)hexyl acrylate as a colourless oil.

Phase behaviour: $T_g$ −71° C. 13 I.

$^1$H-NMR ($CDCl_3$, 250 MHz)

δ=1.25-1.48 ppm (m, 8 H, $CH_2$), 1.50-1.74 ppm (m, 8 H, $CH_2$), 2.60 (m, 4 H, 2 -Ar—$CH_2$—), 4.13 (t, J=6.7 Hz, 2 H, —$CH_2O$—), 4.15 (t, J=6.7 Hz, 2 H, —$CH_2O$—), 5.81 (dt, J=10.4 Hz, J=1.8 Hz, 2 H, 2 CHH═CH—COO—), 6.11 ($m_c$, 2 H, 2 $CH_2$═CH—OCO—), 6.39 (2 CHH═CH—OCO—), 6.78 (d, J=10.0 Hz, 2 H, Ar—H), 7.15 ($m_c$, 4 H, Ar—H).

$^{19}$F-NMR ($CDCl_3$, 235 MHz)

δ=−60.9 ppm (t, J=26.4 Hz, 2 F, —$CF_2O$—), −112.0 (dt, J=26.4,

J=10.0 Hz, 2 F, Ar—F).

Analogously the following reactive compounds are obtained

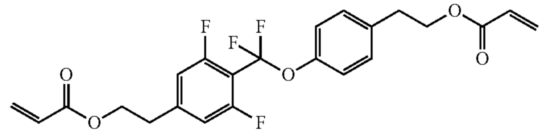 [SMILES: C=CC(=O)OCCc1ccc(OC(F)(F)c2c(F)cc(CCOC(=O)C=C)cc2F)cc1]

Phase behaviour: to be determined.

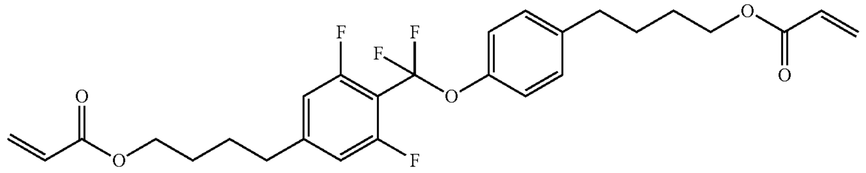 [SMILES: C=CC(=O)OCCCCc1ccc(OC(F)(F)c2c(F)cc(CCCCOC(=O)C=C)cc2F)cc1]

Phase behaviour: $T_g$ −66° C. I.

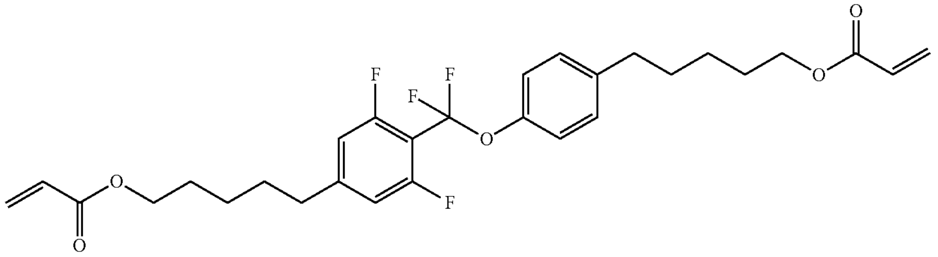 [SMILES: C=CC(=O)OCCCCCc1ccc(OC(F)(F)c2c(F)cc(CCCCCOC(=O)C=C)cc2F)cc1]

Phase behaviour: $T_g$ −69° C. I.

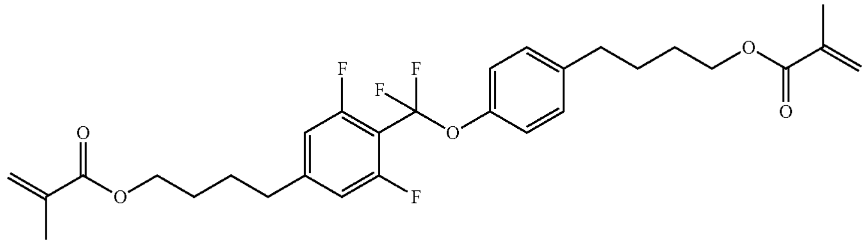 [SMILES: C=C(C)C(=O)OCCCCc1ccc(OC(F)(F)c2c(F)cc(CCCCOC(=O)C(=C)C)cc2F)cc1]

Phase behaviour: to be determined.
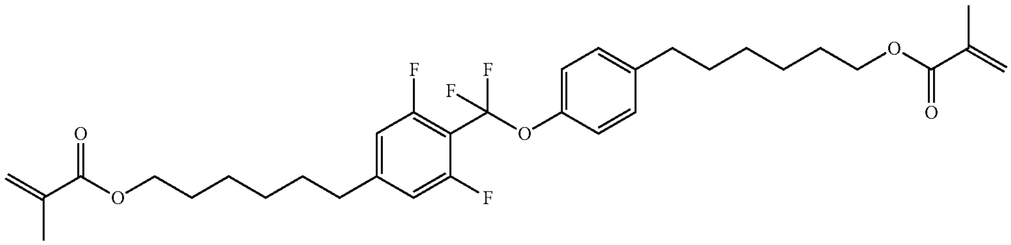 [SMILES: C=C(C)C(=O)OCCCCCCc1ccc(OC(F)(F)c2c(F)cc(CCCCCCOC(=O)C(=C)C)cc2F)cc1]
Phase behaviour: to be determined.
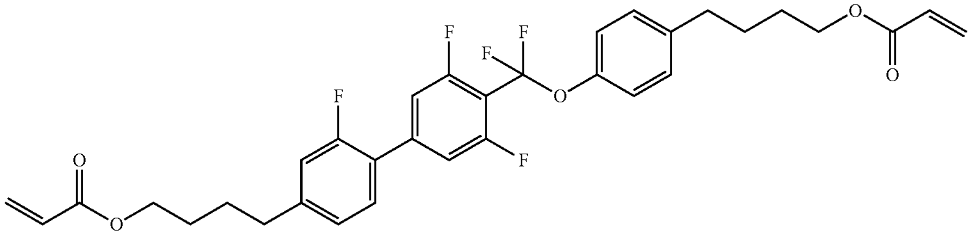 [SMILES: C=CC(=O)OCCCCc1ccc(OC(F)(F)c2c(F)cc(-c3ccc(CCCCOC(=O)C=C)cc3F)cc2F)cc1]
Phase behaviour: to be determined.
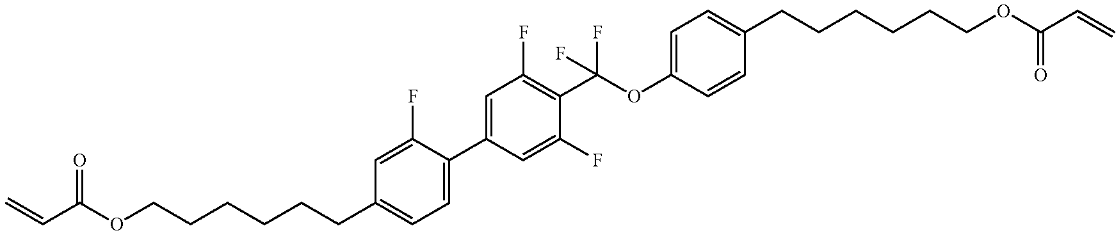 [SMILES: C=CC(=O)OCCCCCCc1ccc(OC(F)(F)c2c(F)cc(-c3ccc(CCCCCCOC(=O)C=C)cc3F)cc2F)cc1]
Phase behaviour: to be determined.
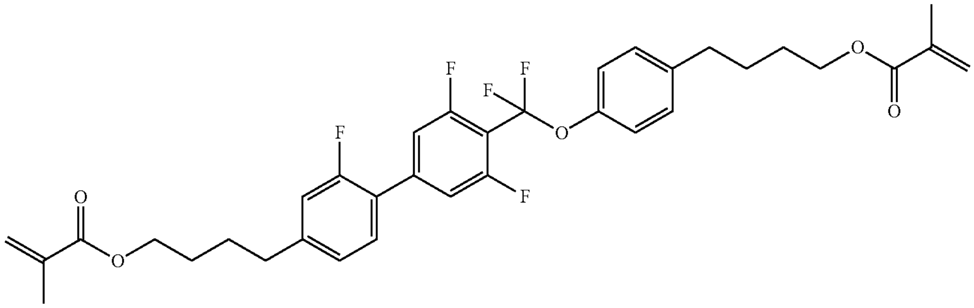 [SMILES: C=C(C)C(=O)OCCCCc1ccc(OC(F)(F)c2c(F)cc(-c3ccc(CCCCOC(=O)C(=C)C)cc3F)cc2F)cc1]

Phase behaviour: C 128° C. I.

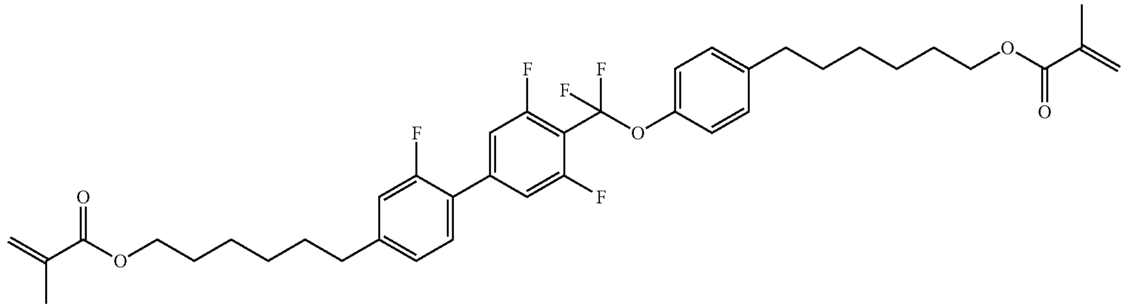 [SMILES: C=C(C)C(=O)OCCCCCCc1ccc(OC(F)(F)c2c(F)cc(-c3ccc(CCCCCCOC(=O)C(=C)C)cc3F)cc2F)cc1]

Phase behaviour: $T_g$ −59° C. N −28.5° C. I.

Comparative Example 1

The following liquid crystalline mixture C-1 which corresponds to mixture Comparative Use-example 2 in WO 2007/147516 is prepared and investigated with respect to its general physical properties. The composition and properties are given in the following table.

| Composition and properties liquid crystal mixture C-1 | | |
|---|---|---|
| Composition | | |
| Compound No. | Abbreviation | Conc./ mass-% |
| 1 | CCU-2-F | 12.0 |
| 2 | CCU-3-F | 13.0 |
| 3 | CCU-5-F | 8.0 |
| 4 | CCP-2-OT | 10.0 |
| 5 | CCP-3-OT | 8.0 |
| 6 | CCP-4-OT | 7.0 |
| 7 | CCP-5-OT | 8.0 |
| 8 | CGU-2-F | 12.0 |
| 9 | CGU-3-F | 12.0 |
| 10 | CGU-5-F | 10.0 |
| Σ | | 100.0 |
| Physical Properties | | |
| T(N, I) = 74.5° C. | | |
| $n_o$(20° C., 589 nm) = 1.4778 | | |
| $n_e$(20° C., 589 nm) = 1.5708 | | |
| Δn(20° C., 589 nm) = 0.0930 | | |
| $\epsilon_{\|}$(20°, 1 kHz) = 14.6 | | |
| Δε(20°, 1 kHz) = 10.5 | | |

Example 1

The following liquid crystalline mixture M-1 is prepared and investigated with respect to its general physical properties. The composition and properties are given in the following table.

| Composition and properties liquid crystal mixture M-1 | | |
|---|---|---|
| Composition | | |
| Compound No. | Abbreviation | Conc./ mass-% |
| 1 | GQU-3-T | 2.0 |
| 2 | GUQU-3-F | 5.0 |
| 3 | GUQU-4-F | 5.0 |
| 4 | PUQGU-3-T | 11.0 |
| 5 | PUQGU-5-T | 11.0 |
| 6 | GUQGU-2-T | 12.0 |
| 7 | GUQGU-3-T | 12.0 |
| 8 | GUQGU-4-T | 12.0 |
| 9 | GUQGU-5-T | 12.0 |
| 10 | DPGU-4-F | 2.0 |
| 11 | GUQU-3-N | 5.0 |
| 12 | GUUQU-3-N | 11.0 |
| Σ | | 100.0 |
| Physical Properties | | |
| T(N, I) = 72° C. | | |
| $n_o$(20° C., 589 nm) = 1.4832 | | |
| $n_e$(20° C., 589 nm) = 1.6763 | | |
| Δn(20° C., 589 nm) = 0.1931 | | |
| $n_{iso}$(20° C., 589 nm) = 1.550 | | |
| $\epsilon_{\perp}$(20°, 1 kHz) = 12 | | |
| Δε(20°, 1 kHz) = 314 | | |

3.8% of the chiral agent R-5011 is solved in the achiral liquid crystal mixture and the electro-optical response of resultant mixture in an IPS-type cell is investigated. The mixture is filled into an electro optical test cell with inter-digital electrodes on one substrate side. The electrode width is 10 μm, the distance between adjacent electrodes is 10 μm and the cell gap is 10 μm. This test cell is evaluated electro-optically between crossed polarisers.

Appropriate Concentrations a) of the chiral dopant R-5011 (Merck KGaA, Germany), b) of the reactive mesogen of the formula RM-C

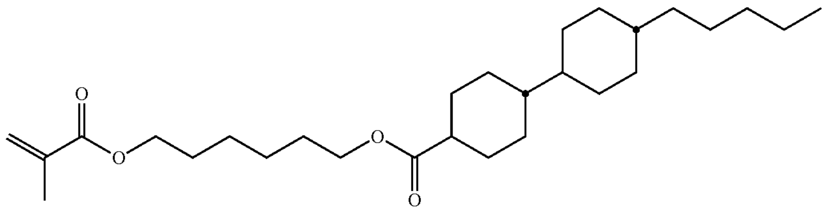

and c) alternatively of one of the two reactive mesogenic compounds of the formulae RM-1

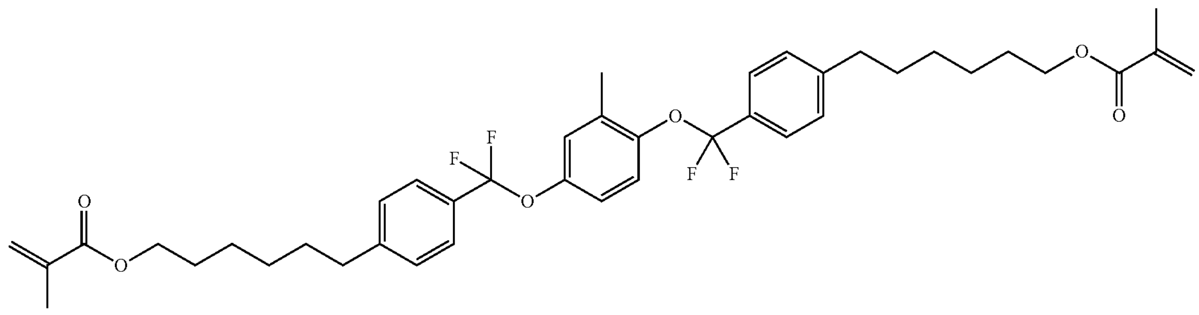 [SMILES: C=C(C)C(=O)OCCCCCCc1ccc(C(F)(F)Oc2ccc(OC(F)(F)c3ccc(CCCCCCOC(=O)C(=C)C)cc3)c(C)c2)cc1]

and RM-2

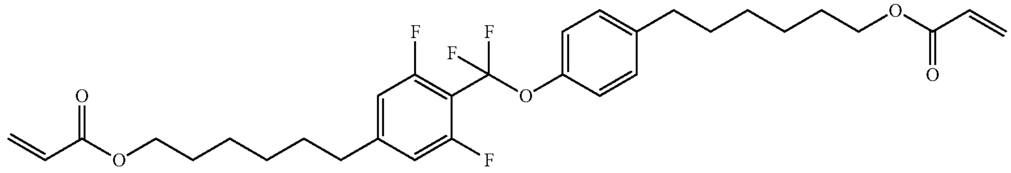 [SMILES: C=CC(=O)OCCCCCCc1ccc(OC(F)(F)c2c(F)cc(CCCCCCOC(=O)C=C)cc2F)cc1]

respectively, are added to the mixture of interest, here mixture M-1. The resultant mixture is introduced into test cells and heated to an appropriate temperature, at which the mixture is in the blue phase. Then it is exposed to UV.

The mixtures are characterised as described below before the polymerisation. The reactive components are then polymerised in the blue phase by irradiation once (180 s), and the resultant media are re-characterised.

Detailed Description of the Polymerisation

Before the polymerisation of a sample, the phase properties of the medium are established in a test cell having a thickness of about 10 microns and an area of 2×2.5 $cm^2$. The filling is carried out by capillary action at a temperature of 75° C. The measurement is carried out under a polarising microscope with heating stage with a temperature change of 1° C./min.

The polymerisation of the media is carried out by irradiation with a UV lamp (Dymax, Bluewave 200, 365 nm interference filter) having an effective power of about 3.0 $mW/cm^2$ for 180 seconds. The polymerisation is carried out directly in the electro-optical test cell.

The polymerisation is carried out initially at a temperature at which the medium is in the blue phase I (BP-I). The polymerisation is carried out in a plurality of part-steps, which gradually result in complete polymerisation. The temperature range of the blue phase generally changes during the polymerisation. The temperature is therefore adapted between each part-step so that the medium is still in the blue phase. In practice, this can be carried out by observing the sample under the polarising microscope after each irradiation operation of about 5 s or longer. If the sample becomes darker, this indicates a transition into the isotropic phase. The temperature for the next part-step is reduced correspondingly.

The entire irradiation time, which results in maximum stabilisation is typically, 180 s at the irradiation power indicated. Further polymerisations can be carried out in accordance with an optimised irradiation/temperature programme.

Alternatively, the polymerisation can also be carried out in a single irradiation step, in particular if a broad blue phase is already present before the polymerisation.

Electro-optical Characterisation

After the above-described polymerisation and stabilisation of the blue phase, the phase width of the blue phase is determined. The electro-optical characterisation is carried out subsequently at various temperatures within and if desired outside this range.

The test cells used are fitted on one side with interdigital electrodes on the cell surface. The cell gap, the electrode separation and the electrode width are typically each 10 microns. This uniform dimension is referred to below as the gap width. The area covered by electrodes is about 0.4 $cm^2$. The test cells do not have an alignment layer.

For the electro-optical characterisation, the cell is located between crossed polarising filters, where the longitudinal direction of the electrodes adopts an angle of 45° to the axes of the polarising filter. The measurement is carried out using a DMS301 (Autronic-Melchers, Germany) at a right angle to the cell plane, or by means of a highly sensitive camera on the polarising microscope. In the voltage-free state, the arrangement described gives an essentially dark image (definition 0% transmission).

Firstly, the characteristic operating voltages and then the response times are measured on the test cell. The operating voltage is applied to the cell electrodes in the form of rectangular voltage having an alternating sign (frequency 100 Hz) and variable amplitude, as described below.

The transmission is measured while the operating voltage is increased. The attainment of the maximum value of the transmission defines the characteristic quantity of the operating voltage $V_{100}$. Equally, the characteristic voltage $V_{10}$ is determined at 10% of the maximum transmission. These values are measured at various temperatures in the range of the blue phase.

Relatively high characteristic operating voltages $V_{100}$ are observed at the upper and lower end of the temperature range of the blue phase. In the region of the minimum operating voltage, $V_{100}$ generally only increases slightly with increasing temperature. This temperature range, limited by $T_1$ and $T_2$, is referred to as the usable, flat temperature range (FR). The width of this "flat range" (FR) is ($T_2$−$T_1$) and is known as the width of the flat range (WFR). The precise values of $T_1$ and $T_2$ are determined by the intersections of tangents on the flat curve section FR and the adjacent steep curve sections in the $V_{100}$/temperature diagram.

In the second part of the measurement, the response times during switching on and off ($\tau_{on}$, $\tau_{off}$) are determined. The response time $\tau_{on}$ is defined by the time to achievement of 90% intensity after application of a voltage at the level of $V_{100}$ at the selected temperature. The response time $\tau_{off}$ is defined by the time until the decrease by 90% starting from maximum intensity at $V_{100}$ after reduction of the voltage to 0 V. The response time is also determined at various temperatures in the range of the blue phase.

As further characterisation, the transmission at continuously increasing and falling operating voltage between 0 V and $V_{100}$ is measured at a temperature within the FR. The difference between the two curves is known as hysteresis. The difference in the transmissions at $0.5 \cdot V_{100}$ and the difference in the voltages at 50% transmission are, for example, characteristic hysteresis values and are known as $\Delta T_{50}$ and $\Delta V_{50}$ respectively.

As a further characteristic quantity, the ratio of the transmission in the voltage-free state before and after passing through a switching cycle can be measured. This transmission ratio is referred to as the "memory effect". The value of the memory effect is 1.0 in the ideal state. Values above 1 mean that a certain memory effect is present in the form of excessively high residual transmission after the cell has been switched on and off. This value is also determined in the working range of the blue phase (FR). Typical concentrations of the polymer precursors are as follows.

| Constituent | Sample 1 | Sample 2 | Sample 3 |
|---|---|---|---|
| | Concentration/% | | |
| M-1 | 87.0 | 88.0 | 89.0 |
| R-5011 | 3.8 | 3.8 | 3.8 |
| RM-C | 5.0 | 5.0 | 4.0 |
| RM-2 | 4.0 | 3.0 | 3.0 |
| IRG-651 ® | 0.2 | 0.2 | 0.2 |
| Σ | 100.0 | 100.0 | 100.0 |

| | Mixture M-1-1 | Mixture M-1-2 | Mixture M-1-3 |
|---|---|---|---|
| Host | | M-1 | |
| Reactive mesogen | RM-2 | RM-2 | RM-2 |
| Transition point before the polymerisation/° C. | — | 34.4 | — |
| Polymerisation temperature/° C. | — | 34.9 | — |
| Measurement values (20° C.) | | | |
| $V_{10}$ (20° C.)/V | — | 17.7 | — |
| $V_{90}$ (20° C.)/V | — | 34.7 | — |
| $V_{100}$ (20° C.)/V | — | 39.2 | — |
| $\Delta V_{50}$ (20° C.)/V | — | 2.17 | — |
| Memory effect | — | 1.17 | — |

Remarks:
t.b.d.: to be determined

The polymerisable mixture is polymerised in a single irradiation step at a temperature of about 30-50° C. at the lower end of the temperature range of the blue phase. The polymer-stabilised liquid-crystalline media exhibit a blue phase over a broad temperature range.

The polymer-stabilised medium M-1, prepared using the monomer (1) according to the invention, exhibits a reduction in hysteresis ($\Delta V_{50}$) and good contrast on switching on and on switching off compared with conventional media from the prior art. In particular, the contrast on switching on and the contrast on switching off are close together in the medium M1 according to the invention, which means very good stabilisation of the blue phase.

It can be seen from this that the monomers according to the invention are particularly suitable for the stabilisation of blue phases, in particular in the case of media having a high concentration of chiral dopant.

The polymer-stabilised medium M-1-1 is combined with Makrolon® as corresponding isotropic material of the replica structure having a refractive index of 1.587 and covered by a cover sheet of the same material. The cover sheet thereby is covered with an IPS electrode structure. By applying an electrical field to the polymer stabilized blue phase material a birefringence is induced.

Example 2

The following liquid crystalline mixture M-2 is prepared and investigated with respect to its general physical properties. The composition and properties are given in the following table.

Composition and properties liquid crystal mixture M-2

| Compound No. | Abbreviation | Conc./mass-% |
|---|---|---|
| Composition | | |
| 1 | GQU-3-T | 5.0 |
| 2 | GUQU-3-F | 4.0 |
| 3 | GUQU-4-F | 4.0 |
| 4 | PUQGU-3-T | 11.0 |
| 5 | PUQGU-5-T | 11.0 |
| 6 | GUQGU-2-T | 12.0 |
| 7 | GUQGU-3-T | 12.0 |
| 8 | GUQGU-4-T | 12.0 |
| 9 | GUQGU-5-T | 12.0 |

-continued

| Composition and properties liquid crystal mixture M-2 | | |
|---|---|---|
| 10 | DPGU-4-F | 2.0 |
| 11 | GUQU-3-N | 4.0 |
| 12 | GUUQU-3-N | 11.0 |
| Σ | | 100.0 |

| Physical Properties |
|---|
| T(N, I) = 67° C. |
| $n_o$(20° C., 589 nm) = 1.4830 |
| $n_e$(20° C., 589 nm) = 1.6741 |
| $n_{iso}$(20° C., 589 nm) = 1.5493 |
| Δn(20° C., 589 nm) = 0.1911 |
| $\epsilon_\perp$(20°, 1 kHz) = 12.7 |
| Δε(20°, 1 kHz) = 279 |

Typical concentrations of the polymer precursors are as follows.

| Constituent | Sample M-2-1 Concentration % |
|---|---|
| M-2 | 88 |
| R-5011 | 3.8 |
| RM-C | 5.0 |
| RM-1 | 0.0 |
| RM-2 | 3.0 |
| IRG-651 ® | 0.2 |
| Σ | 100.0 |

The mixture M-2-1 is combined with Makrolon® as corresponding isotropic material of the replica structure having a refractive index of 1.587 in order to form a lens element according to the present invention.

Example 3

The following liquid crystalline mixture M-3 is prepared and investigated with respect to its general physical properties. The composition and properties are given in the following table.

| Composition and properties liquid crystal mixture M-3 | | |
|---|---|---|
| Composition | | |
| Compound No. | Abbreviation | Conc./ mass-% |
| 1 | PZU-2-N | 10.0 |
| 2 | MUQU-3-F | 10.0 |
| 3 | PUQGU-3-T | 10.0 |
| 4 | PUQGU-4-T | 8.0 |
| 5 | PUQGU-5-T | 8.0 |
| 6 | GUQGU-2-T | 10.0 |
| 7 | GUQGU-3-T | 10.0 |
| 8 | GUQGU-4-T | 10.0 |
| 9 | GUQGU-5-T | 9.0 |
| 10 | GUQU-3-N | 5.0 |
| 11 | GUUQU-3-N | 10.0 |
| Σ | | 100.0 |

| Physical Properties |
|---|
| T(N, I) = 61.5° C. |
| $n_o$(20° C., 589 nm) = 1.4888 |
| $n_e$(20° C., 589 nm) = 1.6824 |
| $n_{iso}$(20° C., 589 nm) = 1.5560 |
| Δn(20° C., 589 nm) = 0.1936 |
| $\epsilon_\perp$(20°, 1 kHz) = 15.9 |
| Δε(20°, 1 kHz) = 369.7 |

Typical concentrations of the polymer precursors are as follows.

| Constituent | Sample M-3-1 Concentration % |
|---|---|
| M-4 | 88 |
| R-5011 | 3.8 |
| RM-C | 5.0 |
| RM-1 | 0.0 |
| RM-2 | 3.5 |
| IRG-651 ® | 0.2 |
| Σ | 100.0 |

The results are summarised in the following table.

| | Mixture M-3-1 |
|---|---|
| Host | M-3 |
| Reactive mesogen | RM-1 |
| Measurement values (20° C.) | |
| Transition point before the polymerisation/° C. | 33.5 |
| Polymerisation temperature/° C. | 34.0 |
| $V_{10}$ (20° C.)/V | 16.9 |
| $V_{90}$ (20° C.)/V | 33.1 |
| $V_{100}$ (20° C.)/V | 37.4 |
| $\Delta V_{50}$ (20° C.)/V | 1.72 |
| Memory effect | 1.03 |
| $V_{100}$ (30° C.)/V | 49 |
| $V_{op.}$ (30° C.)/V | 40 |
| $t_{on}$ (30° C.)/ms | 1.5 |
| $t_{off}$ (30° C.)/ms | 1.3 |
| Memory effect | 1.23 |

The mixture M-3-1 is combined with Makrolon® as corresponding isotropic material of the replica structure having a refractive index of 1.587 in order to form a lens element according to the present invention.

Example 4

The following liquid crystalline mixture M-4 is prepared and investigated with respect to its general physical properties. The composition and properties are given in the following table.

| Composition and properties liquid crystal mixture M-4 | | |
|---|---|---|
| Composition | | |
| Compound No. | Abbreviation | Conc./ mass-% |
| 1 | DPGU-4-F | 8.0 |
| 2 | DUUQU-3-F | 3.0 |
| 3 | DUUQU-4-F | 10.0 |
| 4 | DUUQU-5-F | 7.0 |
| 5 | GUQGU-2-T | 7.0 |
| 6 | GUQGU-3-T | 8.0 |

-continued

| Composition and properties liquid crystal mixture M-4 | | |
|---|---|---|
| 7 | GUQU-2-N | 13.0 |
| 8 | GUQU-3-N | 12.0 |
| 9 | GUUQU-3-N | 10.0 |
| 10 | GUUQU-4-N | 10.0 |
| 11 | ME2N.F | 12.0 |
| Σ | | 100.0 |
| Physical Properties | | |
| T(N, I) = 76.5° C. | | |
| $n_o$(20° C., 589 nm) = 1.4843 | | |
| $n_e$(20° C., 589 nm) = 1.7023 | | |
| $n_{iso}$(20° C., 589 nm) = 1.5604 | | |
| Δn(20° C., 589 nm) = 0.218 | | |
| $\epsilon_\perp$(20°, 1 kHz) = — | | |
| Δε(20°, 1 kHz) = — | | |

Typical concentrations of the polymer precursors are as follows.

| Constituent | Sample M-4-1 Concentration % |
|---|---|
| M-4 | 84.6 |
| R-5011 | 4.2 |
| RM-C | 7.5 |
| RM-1 | 0.0 |
| RM-2 | 3.5 |
| IRG-651 ® | 0.2 |
| Σ | 100.0 |

The mixture M-4-1 is combined with Makrolon® as corresponding isotropic material of the replica structure having a refractive index of 1.587 in order to form a lens element according to the present invention.

Example 5

The following liquid crystalline mixture M-5 is prepared and investigated with respect to its general physical properties. The composition and properties are given in the following table.

| Composition and properties liquid crystal mixture M-5 | | |
|---|---|---|
| Composition | | |
| Compound No. | Abbreviation | Conc./ mass-% |
| 1 | DPGU-4-F | 3.0 |
| 2 | DUUQU-3-F | 3.0 |
| 3 | DUUQU-4-F | 8.0 |
| 4 | DUUQU-5-F | 7.0 |
| 5 | GUQGU-2-T | 7.0 |
| 6 | GUQGU-3-T | 8.0 |
| 7 | GUQU-2-N | 13.0 |
| 8 | GUQU-3-N | 12.0 |
| 9 | GUUQU-3-N | 10.0 |
| 10 | GUUQU-4-N | 10.0 |
| 11 | ME2N.F | 10.0 |
| 12 | ME3N.F | 9.0 |
| Σ | | 100.0 |
| Physical Properties | | |
| T(N, I) = 65.5° C. | | |
| $n_o$(20° C., 589 nm) = 1.4843 | | |
| $n_e$(20° C., 589 nm) = 1.6991 | | |
| $n_{iso}$(20° C., 589 nm) = 1.5592 | | |
| Δn(20° C., 589 nm) = 0.213 | | |
| $\epsilon_\perp$(20°, 1 kHz) = — | | |
| Δε(20°, 1 kHz) = — | | |

Typical concentrations of the polymer precursors are as follows.

| Constituent | Sample M-5-1 Concentration % |
|---|---|
| M-5 | 84.6 |
| R-5011 | 4.2 |
| RM-C | 7.5 |
| RM-1 | 0.0 |
| RM-2 | 3.5 |
| IRG-651 ® | 0.2 |
| Σ | 100.0 |

The mixture M-5-1 is combined with Makrolon® as corresponding isotropic material of the replica structure having a refractive index of 1.587 in order to form a lens element according to the present invention.

Example 6

The following liquid crystalline mixture M-6 is prepared and investigated with respect to its general physical properties. The composition and properties are given in the following table.

| Composition and properties liquid crystal mixture M-6 | | |
|---|---|---|
| Composition | | |
| Compound No. | Abbreviation | Conc./ mass-% |
| 1 | DPGU-4-F | 4.0 |
| 2 | GUQGU-2-T | 6.0 |
| 3 | GUQGU-3-T | 7.0 |
| 4 | GUQU-2-N | 12.0 |
| 5 | GUQU-3-N | 12.0 |
| 6 | GUUQU-3-N | 10.0 |
| 7 | GUUQU-4-N | 10.0 |
| 8 | ME2N.F | 13.0 |
| 9 | ME3N.F | 11.0 |
| 10 | PPGU-3-F | 4.0 |
| 11 | PUQGU-3-T | 11.0 |
| Σ | | 100.0 |
| Physical Properties | | |
| T(N, I) = 65.6° C. | | |
| $n_o$(20° C., 589 nm) = 1.4985 | | |
| $n_e$(20° C., 589 nm) = 1.7010 | | |
| $n_{iso}$(20° C., 589 nm) = 1.5689 | | |

-continued

| Composition and properties liquid crystal mixture M-6 |
| --- |
| $\Delta n$(20° C., 589 nm) = 0.2025 |
| $\epsilon_{\perp}$(20°, 1 kHz) = — |
| $\Delta\epsilon$(20°, 1 kHz) = — |

Typical concentrations of the polymer precursors are as follows.

| Constituent | Sample M-6-1 Concentration % |
| --- | --- |
| M-6 | 84.6 |
| R-5011 | 4.2 |
| RM-C | 7.5 |
| RM-1 | 0.0 |
| RM-2 | 3.5 |
| IRG-651 ® | 0.2 |
| Σ | 100.0 |

The mixture M-6-1 is combined with Makrolon® as corresponding isotropic material of the replica structure having a refractive index of 1.587 in order to form a lens element according to the present invention.

Example 7

The following liquid crystalline mixture M-7 is prepared and investigated with respect to its general physical properties. The composition and properties are given in the following table.

| Composition and properties liquid crystal mixture M-7 | | |
| --- | --- | --- |
| Composition | | |
| Compound No. | Abbreviation | Conc./ mass-% |
| 1 | PGQU-2-N | 15.0 |
| 2 | PGQU-3-N | 15.0 |
| 3 | PGQU-4-N | 15.0 |
| 4 | GUQGU-2-T | 10.0 |
| 5 | GUQGU-3-T | 10.0 |
| 6 | GUQGU-4-T | 10.0 |
| 7 | GUQGU-5-T | 10.0 |
| 8 | PPGU-4-F | 10.0 |
| 9 | UM-3-N | 5.0 |
| Σ | | 100.0 |
| Physical Properties | | |
| T(N, I) = 58.5° C. | | |
| $n_o$(20° C., 589 nm) = 1.4999 | | |
| $n_e$(20° C., 589 nm) = 1.6784 | | |
| $n_{iso}$(20° C., 589 nm) = 1.5617 | | |
| $\Delta n$(20° C., 589 nm) = 0.1785 | | |
| $\epsilon_{\perp}$(20°, 1 kHz) = — | | |
| $\Delta\epsilon$(20°, 1 kHz) = — | | |

Typical concentrations of the polymer precursors are as follows.

| Constituent | Sample M-7-1 Concentration % |
| --- | --- |
| M-9 | 84.6 |
| R-5011 | 4.2 |
| RM-C | 7.5 |
| RM-1 | 0.0 |
| RM-2 | 3.5 |
| IRG-651 ® | 0.2 |
| Σ | 100.0 |

The mixture M-7-1 is combined with Makrolon® as corresponding isotropic material of the replica structure having a refractive index of 1.587 in order to form a lens element according to the present invention.

Example 8

The following liquid crystalline mixture M-8 is prepared and investigated with respect to its general physical properties. The composition and properties are given in the following table.

| Composition and properties liquid crystal mixture M-8 | | |
| --- | --- | --- |
| Composition | | |
| Compound No. | Abbreviation | Conc./ mass-% |
| 1 | GUQU-3-N | 9.0 |
| 2 | GUUQU-3-N | 12.0 |
| 3 | GUQU-2-N | 8.0 |
| 4 | PUQGU-3-T | 11.0 |
| 5 | PUQGU-4-T | 11.0 |
| 6 | PUQGU-5-T | 10.0 |
| 7 | DUUQU-4-F | 12.0 |
| 8 | DUUQU-4-F | 12.0 |
| 9 | UM-3-N | 10.0 |
| 10 | PPGU-3-F | 5.0 |
| Σ | | 100.0 |
| Physical Properties | | |
| T(N, I) = 70.5° C. | | |
| $n_o$(20° C., 589 nm) = 1.4887 | | |
| $n_e$(20° C., 589 nm) = 1.6848 | | |
| $n_{iso}$(20° C., 589 nm) = 1.5568 | | |
| $\Delta n$(20° C., 589 nm) = 0.1961 | | |
| $\epsilon_{\perp}$(20°, 1 kHz) = — | | |
| $\Delta\epsilon$(20°, 1 kHz) = — | | |

Typical concentrations of the polymer precursors are as follows.

| Constituent | Sample M-8-1 Concentration % |
| --- | --- |
| M-5 | 84.6 |
| R-5011 | 4.2 |
| RM-C | 7.5 |
| RM-1 | 0.0 |

-continued

| Constituent | Sample M-8-1 Concentration % |
|---|---|
| RM-2 | 3.5 |
| IRG-651 ® | 0.2 |
| Σ | 100.0 |

The mixture M-8-1 is combined with Makrolon® as corresponding isotropic material of the replica structure having a refractive index of 1.587 in order to form a lens element according to the present invention.

Example 9

The following liquid crystalline mixture M-9 is prepared and investigated with respect to its general physical properties. The composition and properties are given in the following table.

| Composition and properties liquid crystal mixture M-9 | | |
|---|---|---|
| Composition | | |
| Compound No. | Abbreviation | Conc./ mass-% |
| 1 | DPGU-4-F | 8.0 |
| 2 | DUUQU-3-F | 3.0 |
| 3 | DUUQU-4-F | 6.0 |
| 4 | DUUQU-5-F | 6.0 |
| 5 | GUQGU-2-T | 7.0 |
| 6 | GUQGU-3-T | 8.0 |
| 7 | GUQU-2-N | 13.0 |
| 8 | GUQU-3-N | 12.0 |
| 9 | GUUQU-3-N | 10.0 |
| 10 | GUUQU-4-N | 10.0 |
| 11 | ME2N.F | 12.0 |
| 12 | UM-3-N | 5.0 |
| Σ | | 100.0 |
| Physical Properties | | |
| T(N, I) = 68.6° C. | | |
| $n_o$(20° C., 589 nm) = 1.4884 | | |
| $n_e$(20° C., 589 nm) = 1.6971 | | |
| $n_{iso}$(20° C., 589 nm) = 1.5610 | | |
| Δn(20° C., 589 nm) = 0.2087 | | |
| $\epsilon_\perp$(20°, 1 kHz) = — | | |
| Δε(20°, 1 kHz) = — | | |

Typical concentrations of the polymer precursors are as follows.

| Constituent | Sample M-9-1 Concentration % |
|---|---|
| M-7 | 84.6 |
| R-5011 | 4.2 |
| RM-C | 7.5 |
| RM-1 | 0.0 |
| RM-2 | 3.5 |
| IRG-651 ® | 0.2 |
| Σ | 100.0 |

The mixture M-7-1 is combined with Makrolon® as corresponding isotropic material of the replica structure having a refractive index of 1.587 in order to form a lens element according to the present invention.

The invention claimed is:

1. A lens element comprising a lens structure, and a replica structure wherein either the lens structure or the replica structure comprises a blue phase LC material comprising one or more compounds of formula I

I

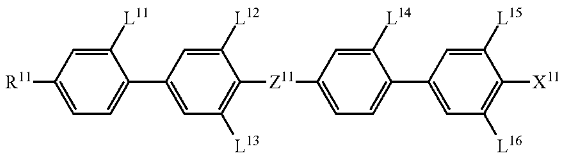

wherein $L^{11}$ to $L^{16}$ are independently of each other H or F, $R_{11}$ is alkyl, which is straight chain or branched, is unsubstituted, mono- or poly-substituted by F, Cl or CN, and in which one or more $CH_2$ groups are optionally replaced, in each case independently from one another, by —O—, —S—, —$NR^{01}$—, —$SiR^{01}R^{02}$—, —CO—, —COO—, —OCO—, —OCO—O—, —S—CO—, —CO—S—, —$CY^{01}$=$CY^{02}$- or —C≡C— in such a manner that O and/or S atoms are not linked directly to one another, $Y^{01}$ and $Y^{02}$ are, independently of each other, F, Cl, or CN, and alternatively one of them may be H, $R^{01}$ and $R^{02}$ are, independently of each other, H, or alkyl with 1 to 12 C-atoms, $Z^{11}$ is —COO— or —$CF_2O$—and $X^{11}$ denotes halogen, a mono- or polyhalogenated alkyl-, or alkoxy having 1 to 6 C-atoms or a mono-, di- or polyhalogenated alkenyl having 2 to 6 C-atoms.

2. A lens element according to claims 1, wherein the replica structure comprises the blue phase LC material, and the lens structure comprises an isotropic material having a constant refractive index.

3. A lens element according to claim 1, wherein the lens structure comprises the blue phase LC material, and the replica structure comprises an isotropic material having a constant refractive index.

4. A lens structure according to claim 1, wherein the isotropic material and the blue phase material in its isotropic state have the same refractive index.

5. A lens element according to claim 1, wherein the blue phase material can be electrically switched into its birefringent state by applying an electric field in the lateral direction regarding the main plane of the lens element.

6. A lens element according to claim 1, wherein the lens element utilizes in-plane switching electrodes.

7. A lens element according to claim 1, wherein a lens effect is associated with the birefringent state or optical anisotropic blue phase of the LC material.

8. A lens element according to claim 1, wherein the blue phase LC material comprises one or more mesogenic compounds, one or more chiral compounds.

9. A lens element according to claim 1, wherein $R^{11}$ is ethyl, n-propyl, n-butyl, n-pentyl, or n-hexyl, $Z^{11}$ is $CF_2O$—, and $X^{11}$ denotes —$CF_3$.

10. A lens element according to claim 1, wherein said blue phase LC material further comprises one or more compounds of formula II

II

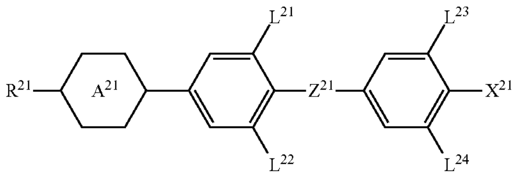

$L^{21}$ to $L^{24}$ are independently of each other H or F, $R^{21}$ has one of the meanings as indicated above for $R^{11}$ in formula I,

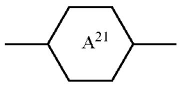

denotes a diradical group selected from the following groups:

a) the group consisting of trans-1,4-cyclohexylene, 1,4-cyclohexenylene and 1,4'-bicyclohexylene, in which, in addition, one or more non-adjacent $CH_2$ groups may be replaced by —O— and/or —S— and in which, in addition, one or more H atoms may be replaced by F, b) the group consisting of 1,4-phenylene and 1,3-phenylene, in which, in addition, one or two CH groups may be replaced by N and in which, in addition, one or more H atoms may be replaced by F, $Z^{21}$ is —COO—or —$CF_2O$—, and $X^{21}$ denotes halogen, CN, mono- or polyhalogenated alkyl-, or alkoxy having 1 to 6 C-atoms or a mono- or polyhalogenated alkenyl having 2 to 6 C-atoms.

11. A lens element according to claim 1, wherein said blue phase LC material further comprises one or more compounds of formula III

III

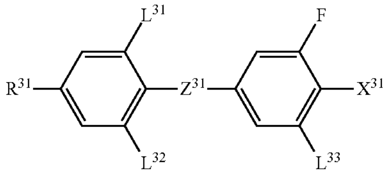

wherein $L^{31}$ to $L^{33}$ are independently of one another H or F, $Z^{31}$ is —COO— or —$CF_2O$—, $R^{31}$ has one of the meanings as indicated above for $R^{11}$ in formula I, and $X^{31}$ denotes halogen, —CN, a mono- or polyhalogenated alkyl-, or alkoxy one or more having 1 to 6 C-atoms or a mono- or polyhalogenated alkenyl having 2 to 6 C-atoms.

12. A lens element according to claim 1, wherein said blue phase LC material further comprises one more compounds of formula IV

IV

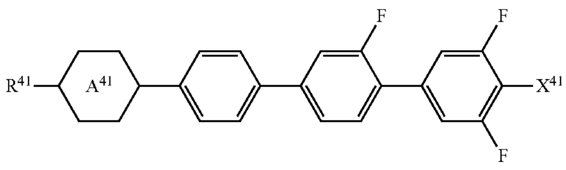

wherein $R^{41}$ has one of the meanings given for $R^{11}$ under formula I above,

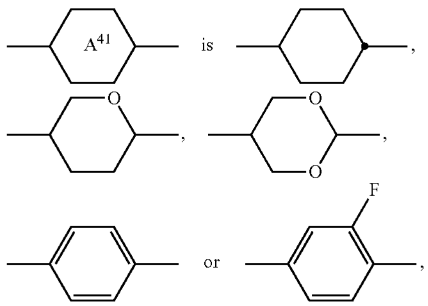

and $X^{41}$ denotes F or $CF_3$.

13. A lens element according to claim 1, wherein said blue phase LC material further comprises one more compounds of formula V,

V

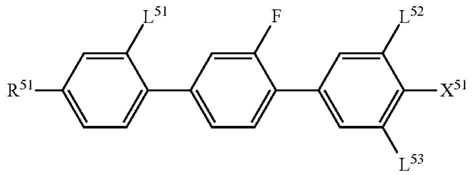

wherein $L^{51}$ to $L^{53}$ are independently of each other, H or F $R^{51}$ has one of the meanings as indicated above for $R^{11}$ in formula I, and $X^{51}$ denotes F or $CF_3$.

14. A lens element according to claim 1, wherein said blue phase LC material further comprises one more compounds of formula VI,

VI

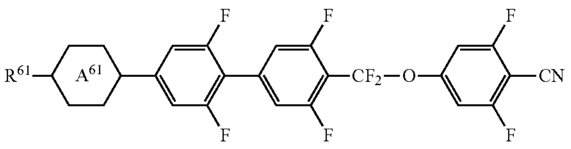

wherein $R^{61}$ has one of the meanings as indicated above for $R^{11}$ in formula I, and

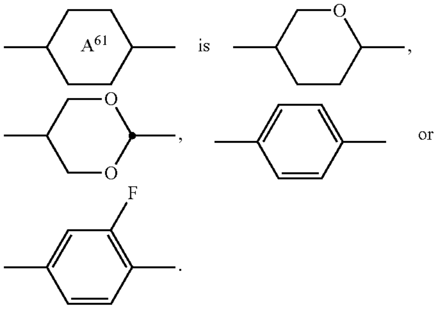

15. A lens element according to claim 1, wherein said blue phase LC material further comprises one more compounds formula VII

VII

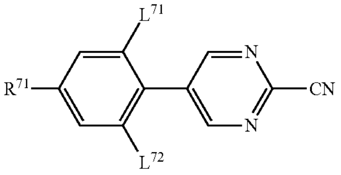

wherein $R^{71}$ is alkyl, which is straight chain or branched, having 1 to 20 C-atoms, is unsubstituted, mono- or poly-substituted by F, Cl or CN, and in which one or more $CH_2$ groups are optionally replaced, in each case independently from one another, by —O—, —S—, —$NR^{01}$—, —$SiR^{01}R^{02}$—, —CO—, —COO—, —OCO—, —OCO—O—, —S—CO—, —CO—S—, —$CY^{01}$=$CY^{02}$— or —C≡C—in such a manner that O and/or S atoms are not linked directly to one another, $L^{71}$ and $L^{72}$ are, independently of each other, H or F, $Y^{01}$ and $Y^{02}$ are, independently of each other, F, Cl or CN, and alternatively one of them may be H, and $R^{01}$ and $R^{02}$ are, independently of each other, H, or alkyl with 1 to 12 C-atoms.

16. A lens element according to claim 1, wherein said blue phase LC material further comprises one or more polymerisable compounds.

17. A lens element according to claim 1, wherein said blue phase LC material further one or more polymerisable compounds of the formula P $$P^a\text{-}(Sp^a)_{s1}\text{-}(A^1\text{-}Z^1)_{n1}\text{-}A^2\text{-}Q\text{-}A^3\text{-}(Z^4\text{-}A^4)_{n2}\text{-}(Sp^b)_{s2}\text{-}P^b \quad P$$

wherein the individual radicals have the following meanings:

$P^a$, $P^b$ each, independently of one another, are a polymerisable group, $Sp^a$, $Sp^b$ each, independently of one another, denote a spacer group, s1, s2 each, independently of one another, denote 0 or 1, n1, n2 each, independently of one another, denote 0 or 1, $Q^1$ denotes —$CF_2O$—, —$OCF_2$—, —$CH_2O$—, —$OCH_2$—, —(CO)O-, —O(CO)—, —$(CH_2)_4$—, —$CH_2CH_2$—, —$CF_2$—$CF_2$—, —$CF_2$-$CH_2$—, —$CH_2$-

$CF_2$—, —CH=CH—, —CF=CF—, —CF=CH—, —$(CH_2)_3O$—, —$O(CH_2)_3$—, —CH=CF—, —C≡C—, —O—, —$CH_2$—, —$(CH_2)_3$—, —$CF_2$ —, $Z^1$, $Z^4$ denote a single bond, —$CF_2O$—, —$OCF_2$—, —$CH_2O$—, —$OCH_2$—, —(CO)O—, —O(CO)—, —$(CH_2)_4$—, —$CH_2CH_2$, —$CF_2$-$CF_2$—, —$CF_2$-$CH_2$—, —$CH_2$-$CF_2$—, —CH=CH—, —CF=CF—, —CF=CH—, —$(CH_2)_3O$—, —$O(CH_2)_3$—, —CH=CF—, —CO=, —O—, —$CH_2$—, —$(CH_2)_3$—, —$CF_2$—, where $Z^1$ and $Q^1$ or $Z^2$ and $Q^1$ do not simultaneously denote a group selected from —$CF_2O$— and —$OCF_2$—, $A^1$, $A^2$, $A^3$, $A^4$ each, independently of one another, denotes a diradical group selected from the following groups:

a) the group consisting of trans-1,4-cyclohexylene, 1,4-cyclohexenylene and 1,4'-bicyclohexylene, in which, in addition, one or more non-adjacent $CH_2$ groups may be replaced by —O—and/or —S—and in which, in addition, one or more H atoms may be replaced by F, b) the group consisting of 1,4-phenylene and 1,3-phenylene, in which, in addition, one or two CH groups may be replaced by N and in which, in addition, one or more H atoms may be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, or

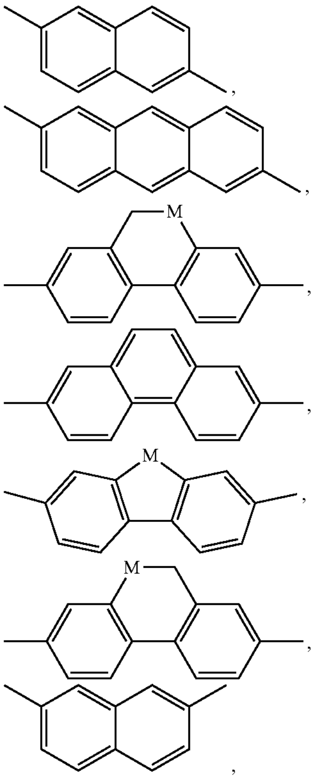

-continued

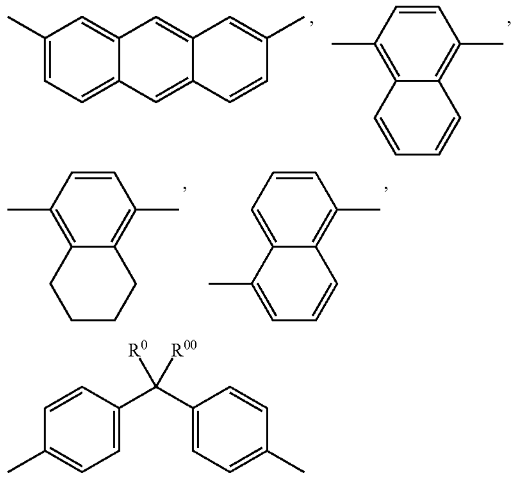

where, in addition, one or more H atoms in these radicals may be replaced by L, and/or one or more double bonds may be replaced by single bonds, and/or one or more CH groups may be replaced by N, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, $R^0$, $R^{00}$ each, independently of one another, denote H, F or straight-chain or branched alkyl having 1 to 12 C atoms, in which, in addition, one or more H atoms may be replaced by F, M denotes —O—, —S—, —$CH_2$—, —$CHY^1$— or —$CY^1Y^2$—, and $Y^1$ and $Y^2$ each, independently of one another, have one of the meanings indicated above for $R^0$, or denote Cl or CN, and one of the groups $Y^1$ and $Y^2$ alternatively denotes —$OCF_3$, H, F, Cl, CN or $CF_3$.

18. A lens element according to claim 1, wherein said blue phase LC material further comprises one or more polymerisable compounds of the formula P selected from the following formula P1 to P24,

P1

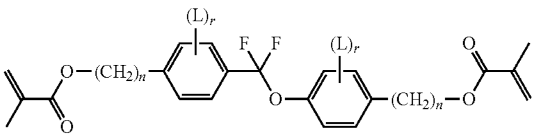

P2

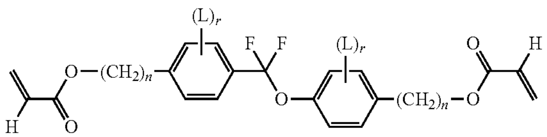

P3

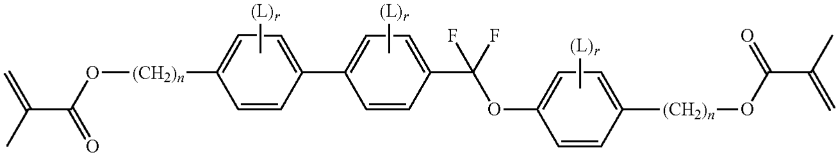

P4

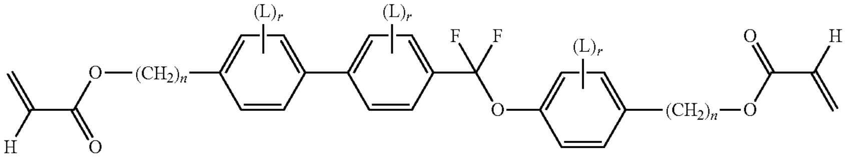

P5

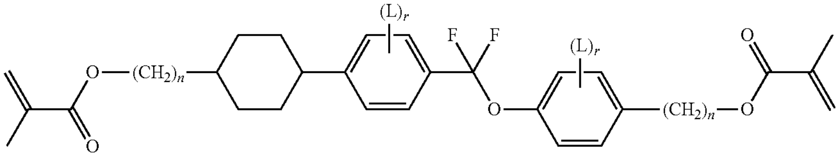

P6

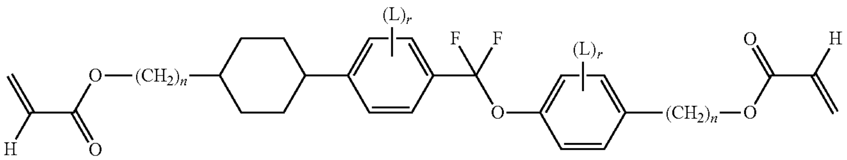

P7

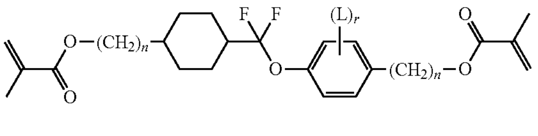

P8

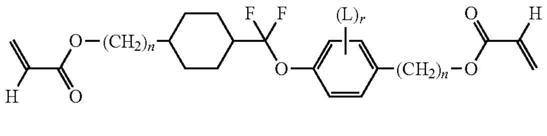

-continued
P9
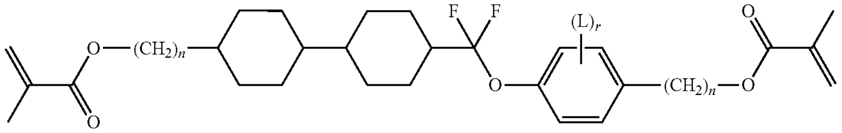
P10
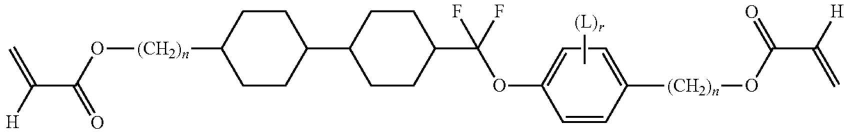
P11
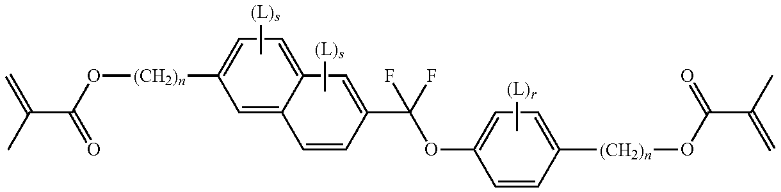
P12
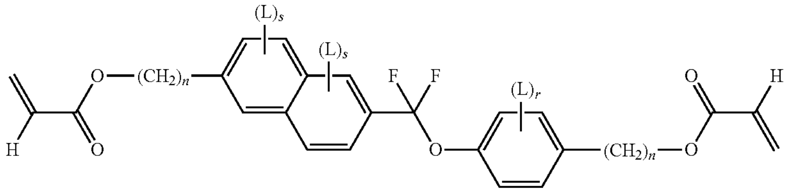
P13
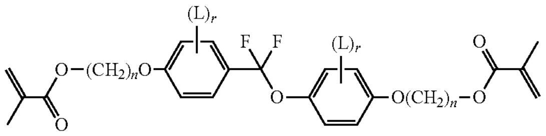
P14
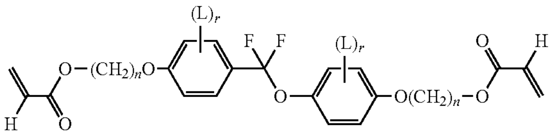
P15
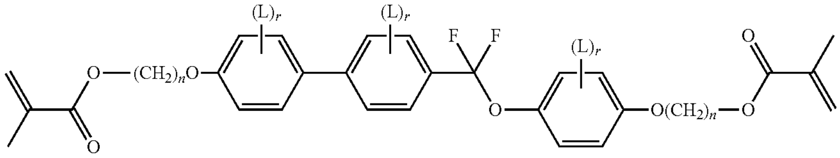
P16
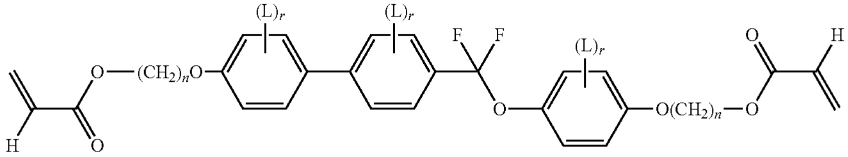
P17
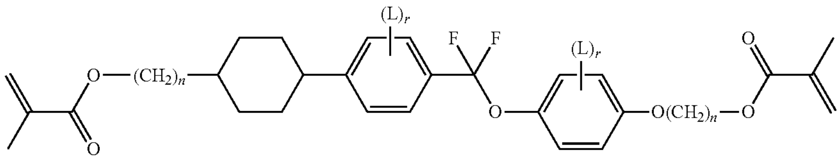
P18
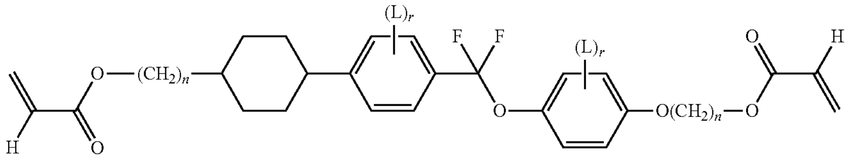

-continued

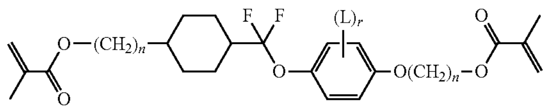

P19

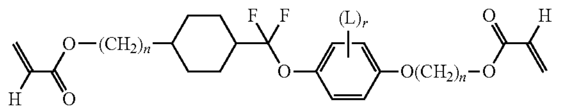

P21

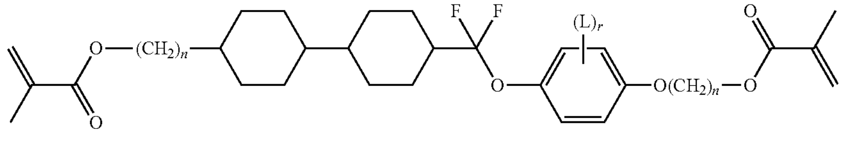

P22

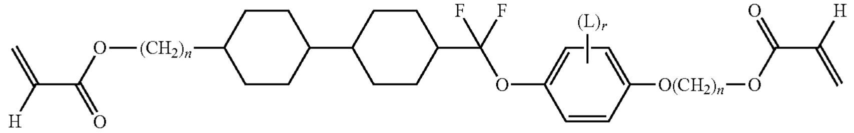

P23

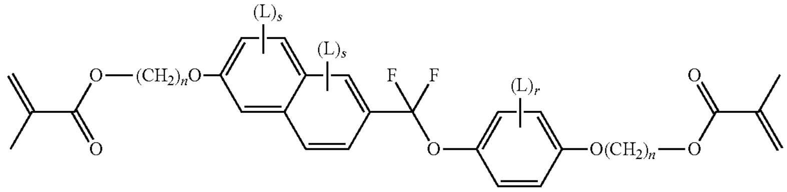

P24

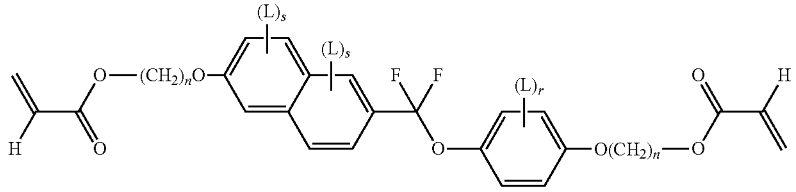

in which

L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, r denotes 0, 1, 2, 3 or 4, s denotes 0, 1, 2 or 3, and n denotes an integer between 1 and 24.

19. A method of preparation for the lens element according to claim 1 comprising the steps of filling the LC blue phase medium into a inverse lens structure or replica structure, covering the inverse lens structure with a suitable substrate, comprising a suitable transparent electrode structure, and optionally, polymerisation of the polymerizable compounds of the LC blue phase medium.

20. A method comprising using the lens element according to claim 1, in an electro-optical device.

21. An electro-optical display device, operable in 2D or a 3D mode, comprising a display panel transparent spacer a lens arrangement in front of the display panel formed by a plurality of switchable lens elements according to claim 1, and a controller, which is adapted to switch each switchable lens element in the lens arrangement.

* * * * *